United States Patent
Maehara et al.

[11] Patent Number: 6,164,838
[45] Date of Patent: Dec. 26, 2000

[54] REMOVABLE FIBER OPTIC MODULE

[75] Inventors: Youichi Maehara, Kasuga; Shin Ishibashi, Fukuoka, both of Japan

[73] Assignee: Matushita Electric Industrial Co., Ltd., Osaka, Japan

[21] Appl. No.: 08/872,199

[22] Filed: Jun. 10, 1997

[30] Foreign Application Priority Data

| Jun. 18, 1996 | [JP] | Japan | 8-156557 |
| Sep. 6, 1996 | [JP] | Japan | 8-236356 |

[51] Int. Cl.[7] ................................................. G02B 6/36
[52] U.S. Cl. ................................ 385/92; 385/88; 385/89; 361/749; 361/752
[58] Field of Search ......................... 385/88–94; 439/67, 439/77, 577; 361/748, 749, 752, 755, 756, 759, 728, 736, 741, 816, 818

[56] References Cited

U.S. PATENT DOCUMENTS

| 4,149,072 | 4/1979 | Smith et al. | 359/113 |
| 4,291,943 | 9/1981 | Binek et al. | 385/56 |
| 4,700,880 | 10/1987 | Glover | 228/180.1 |
| 5,039,194 | 8/1991 | Block et al. | 385/88 |
| 5,289,345 | 2/1994 | Corradetti et al. | 361/752 |
| 5,295,214 | 3/1994 | Card et al. | 385/92 |
| 5,353,200 | 10/1994 | Bodin et al. | 361/816 |
| 5,535,034 | 7/1996 | Taniguchi | 359/152 |
| 5,561,727 | 10/1996 | Akita et al. | 385/88 |
| 5,596,663 | 1/1997 | Ishibashi et al. | 385/92 |
| 5,596,665 | 1/1997 | Kurashima et al. | 385/92 |
| 5,734,558 | 3/1998 | Poplawski et al. | 361/752 |
| 5,784,513 | 7/1998 | Kuribayashi et al. | 385/88 |
| 5,966,487 | 10/1999 | Gilliland et al. | 385/92 |

FOREIGN PATENT DOCUMENTS 3218134  9/1991  Japan.

*Primary Examiner*—Rodney Bovernick
*Assistant Examiner*—Michael J. Stahl
*Attorney, Agent, or Firm*—Stevens, Davis, Miller & Moshner, L.L.P.

[57] ABSTRACT

An optical fiber module for facilitating changing part of an existing electrical signal transmission system to an optical transmission system. The fiber module includes an electric connector, a laser diode (LD) semiconductor IC, an LD module, a photodiode (PD) semiconductor IC, a PD module, an optical connector, a printed circuit board, a cover, and a shielding portion. In one embodiment, the printed circuit board has a constricted portion between first and second areas of the cover. In another embodiment, the circuit board is flexible and can be folded at a central portion. The optical fiber module is easily attachable and detachable from the outside of a computer without requiring a mother board to have optical fibers mounted thereon.

10 Claims, 30 Drawing Sheets

REMOVABLE FIBER OPTIC MODULE

BACKGROUND OF THE INVENTION

This invention relates generally to an optical fiber module for converting an electrical signal into an optical signal and for converting an optical signal into an electrical signal, and more particularly to an optical fiber module for easily converting an electric cable into an optical cable.

There is already known an optical fiber module (disclosed in Japanese Patent Unexamined Publication No. 3-218134) as shown in FIG. 22. FIG. 22 is a plan view showing the conventional optical fiber module, and in the conventional optical fiber module, LD (laser diode) modules 1 for transmitting an optical signal, PD (photodiode) modules 2 for receiving an optical signal, semiconductor ICs 4 and 5 for converting an optical signal into an electrical signal, connectors 6 for feeding electrical signals to a mother board (not shown) and for receiving electrical signals from the mother board, and so on are mounted on a printed circuit board 3 having a width of 76 mm and a length of 75 mm.

FIG. 23 is a cross-sectional view of a main portion of the conventional optical fiber module, showing a lower frame 7b (disclosed in Japanese Patent Unexamined Publication No. 3-218134), and the conventional optical fiber module has been fixed to the mother board (not shown) by spacers 8 and J-clips 9 formed on the lower frame 7b.

However, the prior art technique has the following problems:

1) Recently, with the development and spread of computer systems, a transmission system capable of effecting a low-noise, long-distance transmission has become necessary. An optical signal transmission, using optical fibers, is excellent with respect to noises and a transmission distance as compared with an electrical signal transmission, and has drawn attention. However, from the viewpoint of the cost, a mother board for an optical fiber module has not been mounted on most of the current systems, and a module for electrical signals has been mounted on most of the systems. Therefore, when trying to change a heretofore-used electric cable to an optical cable capable of achieving a low-noise transmission and a long-distance transmission, it is necessary to incorporate a mother board, having an optical fiber module mounted thereon, into the system, and therefore the optical signal transmission, using the optical fibers, could not be easily achieved.

2) In the conventional optical fiber module, when an optical connector portion of the optical module is to be inserted into an opening of the system, and an optical plug is to be inserted reversely, the optical connector portion is limited by the opening of the system, thereby preventing the reverse insertion of the optical plug. A fitting portion of the optical connector of the conventional optical fiber module is constituted by two (upper and lower) resin frames, and when the optical connector is forcibly inserted with its right and left sides reversed, the frames are opened in an upward-downward direction because of the elasticity of the resin, so that the reverse insertion, which should be impossible, occurs, which has invited problems with respect to the function and safety.

3) The conventional optical fiber module has been fixed to a back panel of a host computer or the like through the motherboard, and therefore a frame of the optical fiber module need only to have a sufficient strength to withstand the force of insertion and withdrawal of the optical connector. However, an optical fiber module of the present invention is used alone, and therefore needs to withstand various external forces.

4) The conventional optical fiber module has operated in an extension slot in integrally-connected relation to the mother board, and therefore it has not been necessary to provide a shield on the whole of the optical fiber module. However, the optical fiber module of the present invention operates alone at high speed outside an extension slot, and therefore it is necessary to suppress unnecessary radiation, and a shield needs to be provided over the whole of the optical fiber module.

5) Considerable heat is generated from ICs mounted on the printed circuit board, and a sufficient space has been provided around each semiconductor IC, so that heat radiation due to heat diffusion can be expected. However, a printed circuit board of the optical fiber module of the present invention is confined in a narrow space defined by a cover, and therefore heat radiating means is necessary for enhancing the reliability.

6) The electric connector of the conventional optical fiber module is fixed to the printed circuit board only by soldering, and there has not been provided any fixing means for fixing the electric connector to a box-like member of the optical fiber module, and stresses, developing when inserting and withdrawing the electric connector, concentrate on the soldered portions by which the electric connector and the printed circuit board are connected together, and the reliability has been insufficient with respect to damage to contacts of the electric connector and damage to a land.

Therefore, the present invention seeks to easily achieve an optical signal transmission, using the existing electrical signal transmission system, and an object of the invention is to provide an optical fiber module which is compact, and can be produced at low costs, and has high reliability.

7) In the conventional optical fiber module, the process of adjusting a light-emitting power of the LD, which is harmful to the human body and particularly to the eyes, has been effected in the condition of the finished product, and therefore an opening for adjusting purposes needs to be provided in a cover or other part of the optical fiber module. However, external electromagnetic waves and the like have intruded through this opening to greatly lower the reliability of the optical fiber module. To prevent these electromagnetic waves, a metal seal or the like has been bonded, and this has increased the cost of the optical fiber module.

SUMMARY OF THE INVENTION

An optical fiber module of the invention comprises an electric connector to be connected to a computer or the like; a laser diode (hereinafter abbreviated as "LD") semiconductor IC for converting LD data, fed from the computer or the like, into an LD electrical signal; an LD module for converting the LD electrical signal into an LD optical signal; a photodiode (hereinafter abbreviated as "PD") module for converting a PD optical signal into a PD electrical signal; a PD semiconductor IC for converting the PD electrical signal into PD data; a printed circuit board provided with the electric connector, the LD semiconductor IC and the PD semiconductor IC; shield means for electrically shielding the PD electrical signal; a cover containing the printed circuit board, the LD module and the PD module; and an optical connector to be insertably and withdrawably fitted relative to an optical plug for transmitting and receiving the LD optical signal and the PD optical signal; characterized in that a constricted portion is provided between a first area, having the electric connector, and a second area having the optical connector.

DETAILED DESCRIPTION OF THE INVENTION

Figure 1:
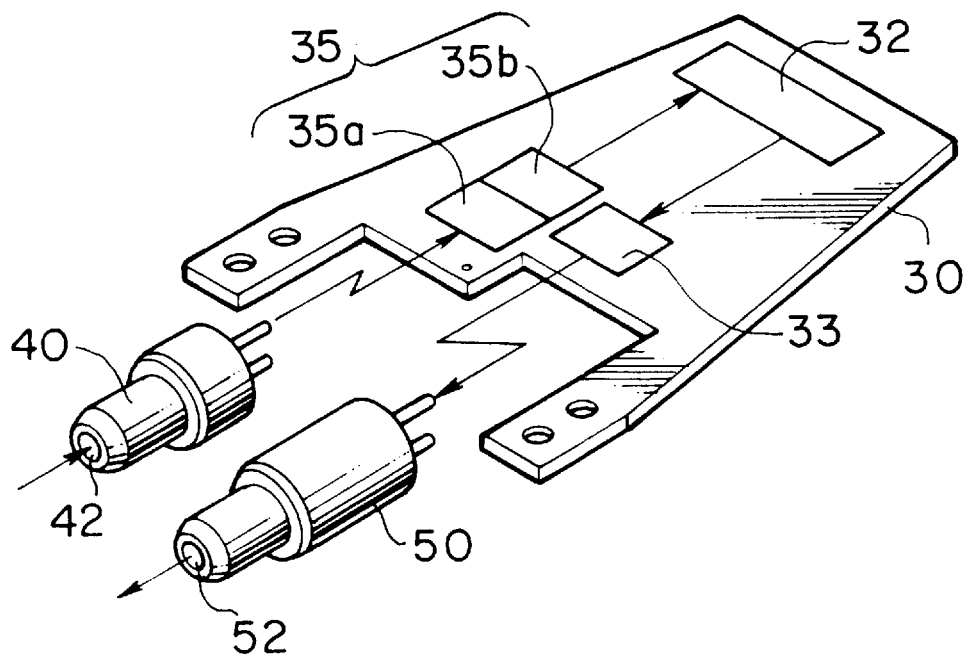
FIG. 1 is a block diagram showing a 1st embodiment of an optical fiber module of the present invention.

The invention provides an optical fiber module comprising an electric connector to be connected to a computer or the like; a laser diode (hereinafter abbreviated as "LD") semiconductor IC for converting LD data, fed from the computer or the like, into an LD electrical signal; an LD module for converting the LD electrical signal into an LD optical signal; a photodiode (hereinafter abbreviated as "PD") module for converting a PD optical signal into a PD electrical signal; a PD semiconductor IC for converting the PD electrical signal into PD data; a printed circuit board provided with the electric connector, the LD semiconductor IC and the PD semiconductor IC; shield means for electrically shielding the PD electrical signal; a cover containing the printed circuit board, the LD module and the PD module; and an optical connector to be insertably and withdrawably fitted relative to an optical plug for transmitting and receiving the LD optical signal and the PD optical signal; characterized in that a constricted portion is provided between a first area, having the electric connector, and a second area having the optical connector. Therefore, there are effects that the optical fiber module can be easily attached to and detached from an existing electrical signal transmission system, such as a computer, with a good handling ability, and that part of an existing electrical signal transmission system can be easily changed to an optical fiber optical signal transmission system.

The invention also provides an optical fiber module comprising an electric connector to be connected to a computer or the like; an LD semiconductor IC for converting LD data, fed from the computer or the like, into an LD electrical signal; an LD module for converting the LD electrical signal into an LD optical signal; a PD module for converting a PD optical signal into a PD electrical signal; a PD semiconductor IC for converting the PD electrical signal into PD data; a printed circuit board provided with the electric connector, the LD semiconductor IC and the PD semiconductor IC; shield means for electrically shielding the PD electrical signal; a cover containing the printed circuit board, the LD module and the PD module; and an optical connector to be insertably and withdrawably fitted relative to an optical plug for transmitting and receiving the LD optical signal and the PD optical signal; characterized in that an inwardly-projected convex portion is formed on that portion of the cover disposed in opposed, closely spaced relation to the LD semiconductor IC or the PD semiconductor IC. Therefore, there are effects that the strength of the optical fiber module is increased, and that heat, generated by the LD semiconductor IC or the PD semiconductor IC, can be transferred to the exterior through the convex portion.

The invention further provides an optical fiber module comprising an electric connector to be connected to a computer or the like; an LD semiconductor IC for converting LD data, fed from the computer or the like, into an LD electrical signal; an LD module for converting the LD electrical signal into an LD optical signal; a PD module for converting a PD optical signal into a PD electrical signal; a PD semiconductor IC for converting the PD electrical signal into PD data; a printed circuit board provided with the electric connector, the LD semiconductor IC and the PD semiconductor IC; shield means for electrically shielding the PD electrical signal; a first frame containing the printed circuit board, the LD module and the PD module; a second frame opposed to the first frame; a first cover containing the first frame; a second cover containing the second frame; and an optical connector to be insertably and withdrawably fitted relative to an optical plug for transmitting the LD optical signal and the PD optical signal; characterized in that the first cover and the second cover are made of metal. Therefore, there is an effect that the strength and appearance of the optical fiber module are improved.

The invention further provides an optical fiber module comprising an electric connector to be connected to a computer or the like; an LD semiconductor IC for converting LD data, fed from the computer or the like, into an LD electrical signal; an LD module for converting the LD electrical signal into an LD optical signal; a PD module for converting a PD optical signal into a PD electrical signal; a PD semiconductor IC for converting the PD electrical signal into PD data; a printed circuit board provided with the electric connector, the LD semiconductor IC and the PD semiconductor IC; shield means for electrically shielding the PD electrical signal; a cover containing the printed circuit board, the LD module and the PD module; and an optical connector to be insertably and withdrawably fitted relative to an optical plug for transmitting and receiving the LD optical signal and the PD optical signal; characterized in that there is further provided fixing means fixing the electric connector. Therefore, there is an effect that the strength of connection between the electric connector and the printed circuit board is enhanced.

The invention further provides an optical fiber module comprising an electric connector to be connected to a computer or the like; an LD semiconductor IC for converting LD data, fed from the computer or the like, into an LD electrical signal; an LD module for converting the LD electrical signal into an LD optical signal; a PD module for converting a PD optical signal into a PD electrical signal; a PD semiconductor IC for converting the PD electrical signal into PD data; a printed circuit board provided with the electric connector, the LD semiconductor IC and the PD semiconductor IC; shield means for electrically shielding the PD electrical signal; a cover containing the printed circuit board, the LD module and the PD module; and an optical connector to be insertably and withdrawably fitted relative to an optical plug for transmitting and receiving the LD optical signal and the PD optical signal; characterized in that there is further provided electrical connection means electrically connecting the LD module and the PD module to the printed circuit board. Therefore, there is an effect that the LD module and the PD module are electrically connected to the printed circuit board.

The invention further provides an optical fiber module comprising an electric connector to be connected to a computer or the like; an LD semiconductor IC for converting LD data, fed from the computer or the like, into an LD electrical signal; an LD module for converting the LD electrical signal into an LD optical signal; a PD module for converting a PD optical signal into a PD electrical signal; a PD semiconductor IC for converting the PD electrical signal into PD data; a printed circuit board provided with the electric connector, the LD semiconductor IC and the PD semiconductor IC; shield means for electrically shielding the PD electrical signal; a cover containing the printed circuit board, the LD module and the PD module; and an optical connector to be insertably and withdrawably fitted relative to an optical plug for transmitting and receiving the LD optical signal and the PD optical signal; characterized in that the printed circuit board is a main flexible printed circuit board. Therefore, there is an effect that stresses, acting on the LD module and the PD module when inserting and withdrawing the optical plug, and stresses, acting on the electric connector when inserting and withdrawing the optical fiber module, are reduced.

The invention further provides an optical fiber module comprising an electric connector to be connected to a computer or the like; an LD semiconductor IC for converting LD data, fed from the computer or the like, into an LD electrical signal; an LD module for converting the LD electrical signal into an LD optical signal; a PD module for converting a PD optical signal into a PD electrical signal; a PD semiconductor IC for converting the PD electrical signal into PD data; a printed circuit board provided with the electric connector, the LD semiconductor IC and the PD semiconductor IC; shield means for electrically shielding the PD electrical signal; a first frame containing the printed circuit board, the LD module and the PD module; a second frame opposed to the first frame; a first cover containing the first frame; a second cover containing the second frame; and an optical connector to be insertably and withdrawably fitted relative to an optical plug for transmitting the LD optical signal and the PD optical signal; characterized in that the first cover and the second cover are made of a resin. Therefore, there is an effect that the appearance of the optical fiber module is enhanced.

The invention further provides an optical fiber module comprising an electric connector to be connected to a computer or the like; an LD semiconductor IC for converting LD data, fed from the computer or the like, into an LD electrical signal; an LD module for converting the LD electrical signal into an LD optical signal; a PD module for converting a PD optical signal into a PD electrical signal; a PD semiconductor IC for converting the PD electrical signal into PD data; a printed circuit board provided with the electric connector, the LD semiconductor IC and the PD semiconductor IC; shield means for electrically shielding the PD electrical signal; a cover containing the printed circuit board, the LD module and the PD module; and an optical connector to be insertably and withdrawably fitted relative to an optical plug for transmitting and receiving the LD optical signal and the PD optical signal; characterized in that the center of the electric connector, the center of the optical connector and the center of the printed circuit board generally coincide with one another. Therefore, there is an effect that the strength of the optical fiber module is enhanced.

The invention further provides an optical fiber module comprising an electric connector to be connected to a computer or the like; an LD semiconductor IC for converting LD data, fed from the computer or the like, into an LD electrical signal; an LD module for converting the LD electrical signal into an LD optical signal; a PD module for converting a PD optical signal into a PD electrical signal; a PD semiconductor IC for converting the PD electrical signal into PD data; a printed circuit board provided with the electric connector, the LD semiconductor IC and the PD semiconductor IC; shield means for electrically shielding the PD electrical signal; a cover containing the printed circuit board, the LD module and the PD module; and an optical connector to be insertably and withdrawably fitted relative to an optical plug for transmitting and receiving the LD optical signal and the PD optical signal; characterized in that there is further provided connector connecting means for connecting the electric connector to the computer or the like. Therefore, there is an effect that the computer or the like and the optical fiber module can be connected together.

The invention further provides an optical fiber module comprising an electric connector to be connected to a computer or the like; an LD semiconductor IC for converting LD data, fed from the computer or the like, into an LD electrical signal; an LD module for converting the LD electrical signal into an LD optical signal; a PD module for converting a PD optical signal into a PD electrical signal; a PD semiconductor IC for converting the PD electrical signal into PD data; a printed circuit board provided with the electric connector, the LD semiconductor IC and the PD semiconductor IC; shield means for electrically shielding the PD electrical signal; a cover containing the printed circuit board, the LD module and the PD module; and an optical connector to be insertably and withdrawably fitted relative to an optical plug for transmitting and receiving the LD optical signal and the PD optical signal; characterized in that an angle between a first area, having the electric connector, and a second area, having the optical connector, is about 90 degrees. Therefore, there is an effect that the computer or the like and the optical fiber module can be easily connected together.

The invention further provides an optical fiber module comprising an electric connector to be connected to a computer or the like; an LD semiconductor IC for converting LD data, fed from the computer or the like, into an LD electrical signal; an LD module for converting the LD electrical signal into an LD optical signal; a PD module for converting a PD optical signal into a PD electrical signal; a PD semiconductor IC for converting the PD electrical signal into PD data; a printed circuit board provided with the electric connector, the LD semiconductor IC and the PD semiconductor IC; shield means for electrically shielding the PD electrical signal; a first frame containing the printed circuit board, the LD module and the PD module; a second frame opposed to the first frame; a first cover containing the first frame; a second cover containing the second frame; and an optical connector to be insertably and withdrawably fitted relative to an optical plug for transmitting the LD optical signal and the PD optical signal; characterized in that cover positioning means for engaging the first cover and the second cover with each other at a desired position is provided at the cover or the frame. Therefore, there is an effect that the assembling efficiency is enhanced.

The invention further provides an optical fiber module comprising an electric connector to be connected to a computer or the like; an LD semiconductor IC for converting LD data, fed from the computer or the like, into an LD electrical signal; an LD module for converting the LD electrical signal into an LD optical signal; a PD module for converting a PD optical signal into a PD electrical signal; a PD semiconductor IC for converting the PD electrical signal into PD data; a printed circuit board provided with the electric connector, the LD semiconductor IC and the PD semiconductor IC; shield means for electrically shielding the PD electrical signal; a first frame containing the printed circuit board, the LD module and the PD module; a second frame opposed to the first frame; a first cover containing the first frame; a second cover containing the second frame; and an optical connector to be insertably and withdrawably fitted relative to an optical plug for transmitting the LD optical signal and the PD optical signal; characterized in that there is provided cover fixing means for fixing the first cover and the second cover together. Therefore, there is an effect that a sufficient force of fastening between the first cover and the second cover is obtained.

The invention further provides an optical fiber module comprising an electric connector to be connected to a computer or the like; an LD semiconductor IC for converting LD data, fed from the computer or the like, into an LD electrical signal; an LD module for converting the LD electrical signal into an LD optical signal; a PD module for converting a PD optical signal into a PD electrical signal; a PD semiconductor IC for converting the PD electrical signal into PD data; a printed circuit board provided with the electric connector, the LD semiconductor IC and the PD semiconductor IC; shield means for electrically shielding the PD electrical signal; a frame containing the printed circuit board, the LD module and the PD module; a cover containing the frame; and an optical connector to be insertably and withdrawably fitted relative to an optical plug for transmitting and receiving the LD optical signal and the PD optical signal; characterized in that the electric connector is mounted on one end portion of the cover, and the optical connector is mounted on the other end portion of the cover, and at least part of the printed circuit board is disposed between the electric connector and the optical connector. Therefore, there are effects that the construction is simple, that the small-size design is obtained, and that the productivity is enhanced.

The invention further provides an optical fiber module comprising an electric connector to be connected to a computer or the like; an LD semiconductor IC for converting LD data, fed from the computer or the like, into an LD electrical signal; an LD module for converting the LD electrical signal into an LD optical signal; a PD module for converting a PD optical signal into a PD electrical signal; a PD semiconductor IC for converting the PD electrical signal into PD data; a printed circuit board provided with the electric connector, the LD semiconductor IC and the PD semiconductor IC; shield means for electrically shielding the PD electrical signal; a first frame containing the printed circuit board, the LD module and the PD module; a second frame opposed to the first frame; a first cover containing the first frame; a second cover containing the second frame; and an optical connector to be insertably and withdrawably fitted relative to an optical plug for transmitting the LD optical signal and the PD optical signal; characterized in that the optical connector is mounted on one end portion of a cover member formed by combining the first cover and the second cover together, and the electric connector is mounted on the other end portion of the cover member, and at least part of the printed circuit board is disposed between the electric connector and the optical connector. Therefore, there are effects that the construction is simple, that the small-size design is obtained, and that the productivity is enhanced.

The invention further provides a method of producing an optical fiber module characterized in that the method has an assembling method comprising a first step of arranging a first frame on a first cover to provide a cover assembly, a second step of mounting an electric connector, an LD semiconductor IC, a PD semiconductor IC, shield means, an LD module and a PD module on a printed circuit board to provide a printed circuit board assembly, a third step of arranging the printed circuit board assembly on the cover assembly to provide a cover printed circuit board assembly, a fourth step of arranging a second frame on the cover printed circuit board assembly to provide a frame printed circuit board assembly, and a fifth step of arranging a second cover on the frame printed circuit board assembly. Therefore, there is an effect that by concentrating soldering operations and the like on the second step, the optical fiber module of high reliability, not having any solder balls or the like therein, can be assembled.

Preferred embodiments of the present invention will now be described with reference to the drawings. Identical reference numerals denote identical parts, respectively, throughout the drawings showing the embodiments.

FIG. 1 is a block diagram showing a 1st embodiment of an optical fiber module of the present invention. In a printed circuit board (hereinafter referred to as "PCB") 30 in FIG. 1, an electrical signal (serial data), fed via an electric connector 32, drives an LD (laser diode) device (not shown), provided in an LD module 50, through an LD driver 33 (comprising a semiconductor IC), and the data is transferred as an optical signal to an optical fiber (ferrule; not shown) inserted in an opening 52 in the LD module. On the other hand, a PD (photodiode) module 40 receives an optical signal from an optical fiber (not shown) inserted in an opening 42 in the PD module, and this optical signal is converted into electric current by a PD device (not shown), and is converted into voltage by a transformation.impedance.amplifier portion 35a of an amplifier 35 (comprising a semiconductor IC). The optical signal, thus converted into voltage, is further converted from an analog signal into a digital signal by a waveform shaping circuit portion 35b, and is transferred as serial data via the electric connector 32.

In this embodiment, although the amplifier 35 comprises one semiconductor IC, the effects of the present invention will not be lost even if the transformation-impedance-amplifier portion 35a and the waveform shaping circuit portion 35b are constituted respectively by two semiconductor ICs.

The effects of the present invention will not be lost even if the transformation-impedance-amplifier portion 35a is incorporated into the PD module 40.

Figure 2:
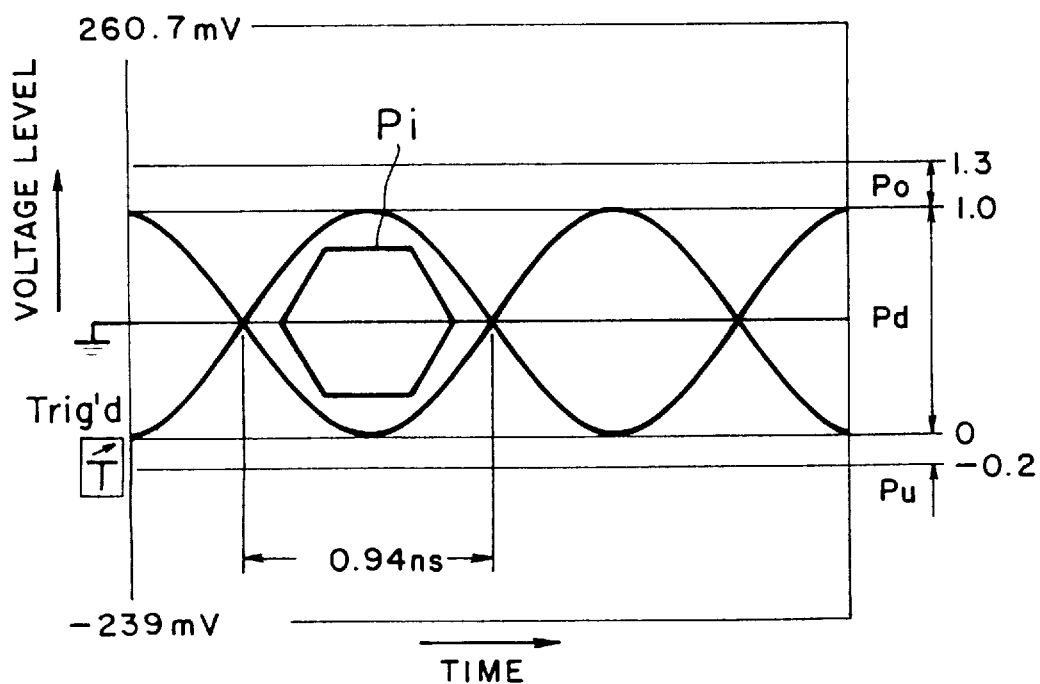
FIG. 2 is an eye pattern showing the response of the 1st embodiment of the optical fiber module of the invention.

More specifically, the high-speed data transfer is achieved using the LD device having a wavelength of 780 nm (nanometer) and the maximum rated output of 5 mW (milliwatts). However, the optical fiber module of the invention is not limited to this wavelength and this rated output. The optical fiber module of the invention is in conformity to ANSI X3T11 Fiber channel standard, and achieves a transfer rate of 133 Mbit/s (megabit/second), a transfer rate of 266 Mbit/s and a transfer rate of 1062 Mbit/s, and its representative example is shown in FIG. 2. FIG. 2 is an eye pattern for the 1st embodiment of the optical fiber module of the invention, and shows the eye pattern obtained when transferring a random pattern having a transfer rate of 1062 Mbit/s.

In FIG. 2, the ordinate axis represents a voltage level obtained by converting the optical signal, emitted from the LD module 50, through an optoelectronic transducer device having a sufficient band, and the abscissa axis represents time, and the optical signal, after passed through a Bessel filter of 800 MHz (megahertz), is observed through an oscilloscope. In FIG. 2, Pd represents a reference amplitude value indicating a light-emitting level, Po represents an allowable overshot amount in ANSI X3T11 when Pd is 100%, and Pu represents an allowable undershot amount when Pd is 100%. As will be appreciated from the allowable overshot Po and the allowable undershot Pu, the optical signal of the optical fiber module of the invention is the good signal having a sufficient margin for these allowable values. Pi is obtained by adapting an eye diagram, shown in ANSI X3T11, to this data, and from the fact that any error is not present in this Pi eye diagram, it will be appreciated that the optical signal of the module of the invention is the good signal having a sufficient margin. For better understanding of the achievement of the rate of 1062 Mbit/s, a period of 0.94 ns(t) is added to FIG. 2.

Figure 3:
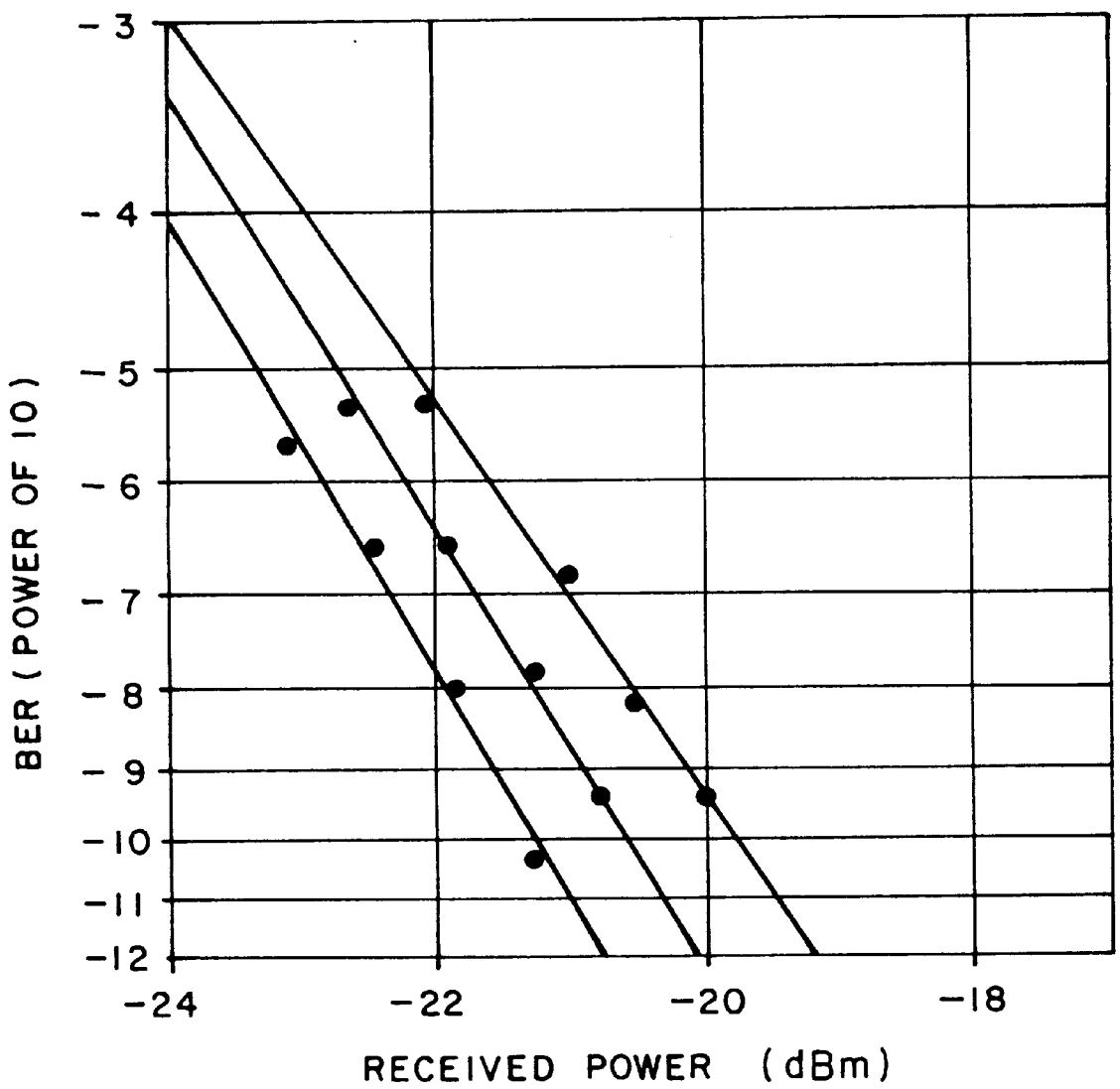
FIG. 3 is a graph of a bit error rate (BER) for the 1st embodiment of the optical fiber module of the invention.

FIG. 3 is a graph of a bit error rate (BER) showing the 1st embodiment of the optical fiber module of the invention. In FIG. 3, the ordinate axis represents a received power, and the value, measured by a bit error rate tester (see FIG. 4) through the optical fiber module of the invention, is plotted.

Figure 4:
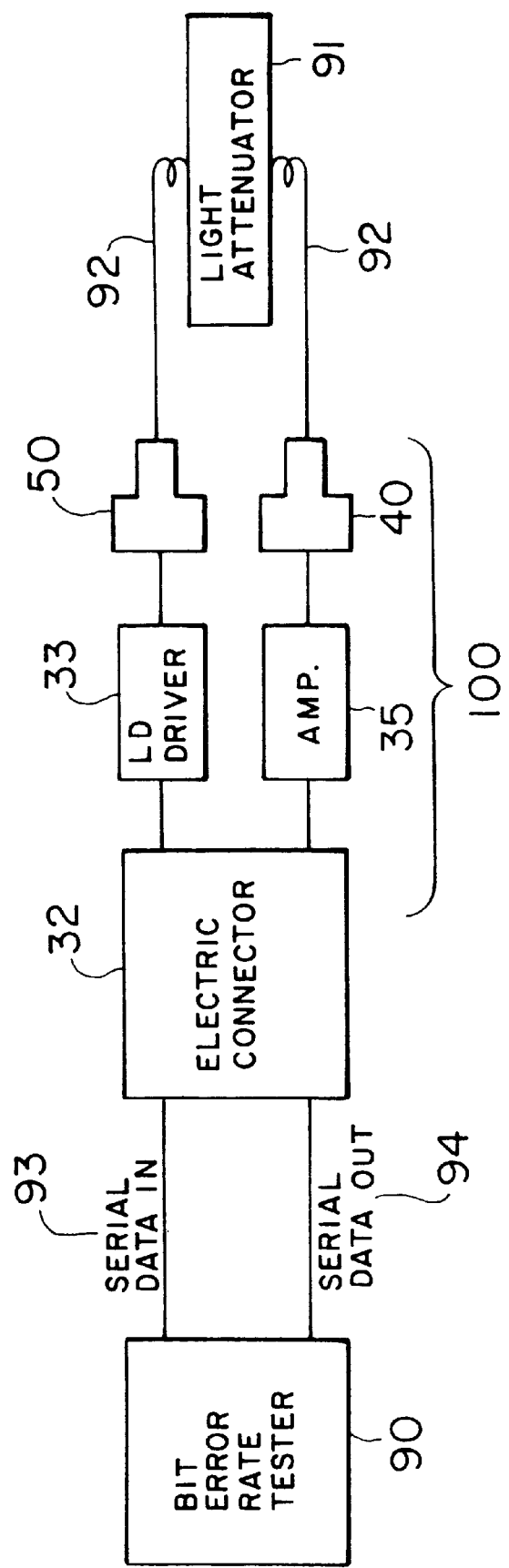
FIG. 4 is a block diagram of a measuring system effecting the measurement in the 1st embodiment of the optical fiber module of the invention.

FIG. 4 is a block diagram of a measuring system effecting the measurement in the 1st embodiment of the optical fiber module of the invention, and shows a specific measuring construction shown in the graph of FIG. 3. Electrical serial data 93, outputted from the bit error rate tester 90, is transferred to the LD driver 33 through the electric connector 32. The LD driver 33 converts this electrical serial data 93 into an optical signal, and causes the LD module 50 to emit light. The optical signal passes through an optical cable 92, and is transferred to the PD module 40 through a light attenuator 91. The optical signal, transferred to the PD module 40, is converted into an electrical signal by the amplifier 35, and is fed as serial data 94 to the bit error rate tester 90 through the electric connector 32. The bit error rate, shown in FIG. 3, indicates a value of comparison between the serial data 93, not yet passed through an optical fiber module assembly 100 of the invention, and the serial data 94 passed through this assembly 100. For example, if an error is 1 bit when 1000 bits of data are transferred, then the rate is the minus third power of 10.

The received power, shown in FIG. 3, indicates the intensity of the optical signal transferred to the LD module 50 shown in FIG. 4. The optical signal, emitted from the LD module 50, is inputted into the light attenuator 91 where the level of the optical signal is reduced, and then the optical signal is fed to the PD module 40. The received power (the intensity of the optical signal) is controlled.

The graph of FIG. 3 is obtained by the measuring system, shown in FIG. 4, and the above method.

In FIG. 3, three optical fiber modules are actually measured, and for example, with respect to measured points of a lowermost straight line, the bit error rate is $1.8 \times 10^{-6}$ when the received power is −22.88 dBm, and the bit error rate is $2.2 \times 10^{-7}$ when the received power is −22.38 dBm, and the bit error rate is $1.0 \times 10^{-8}$ when the received power is −21.88 dBm, and the bit error rate is $2.0 \times 10^{-10}$ when the received power is −21.39 dBm. These four points are actually measured, and when a point of intersection of the straight line, passing through these points, and a line representing the bit error rate of $1.0 \times 10^{-12}$, is measured, the obtained received power is −20.78 dBm. Similarly, the other two straight lines are measured, and as a result the received power of −20.01 dBm and the received power of −19.57 dBm are obtained. These values (from −19.57 dBm to −20.78 dBm) sufficiently clears −16 dBm which is the minimum received power satisfying the bit error rate of $10^{-12}$ defined in ANSI X3T11.

Figure 5:
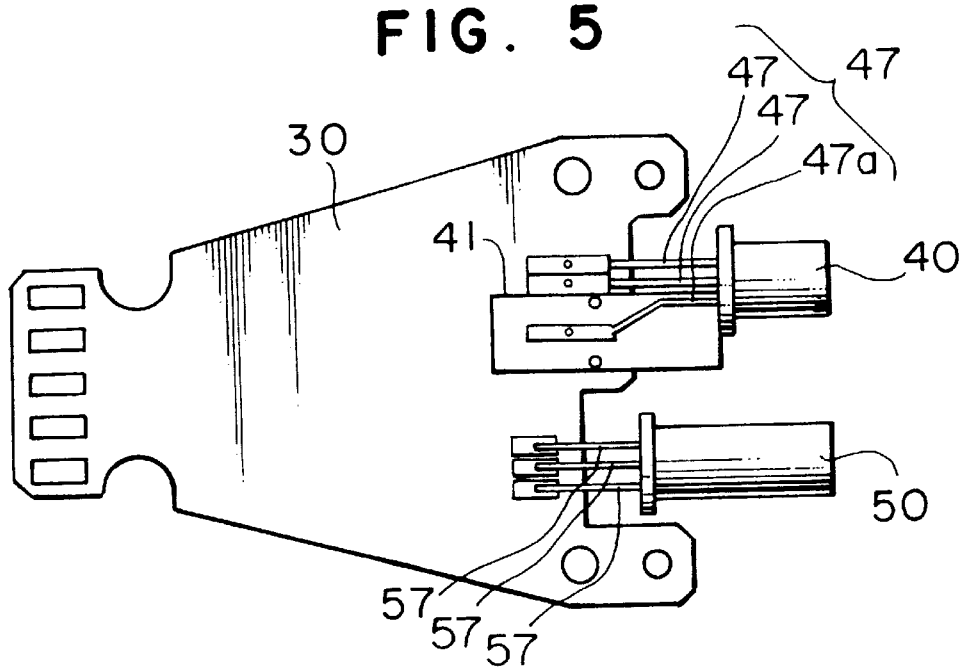
FIG. 5 is a plan view of a PCB used in a 1st embodiment of an optical fiber module of the invention.

FIG. 5 is a plan view of the PCB 30 used in the 1st embodiment of the optical fiber module of the invention. In this embodiment, three LD leads 57 of the LD module 50 and three PD leads 47 of the PD module 40 are soldered directly to the PCB 30. Since the output of the PD module 40 is small, the electromagnetic shielding and electrostatic shielding of the PD output signal lead 47a of the PD module 40 are effected using a shield plate 41.

Figure 6:
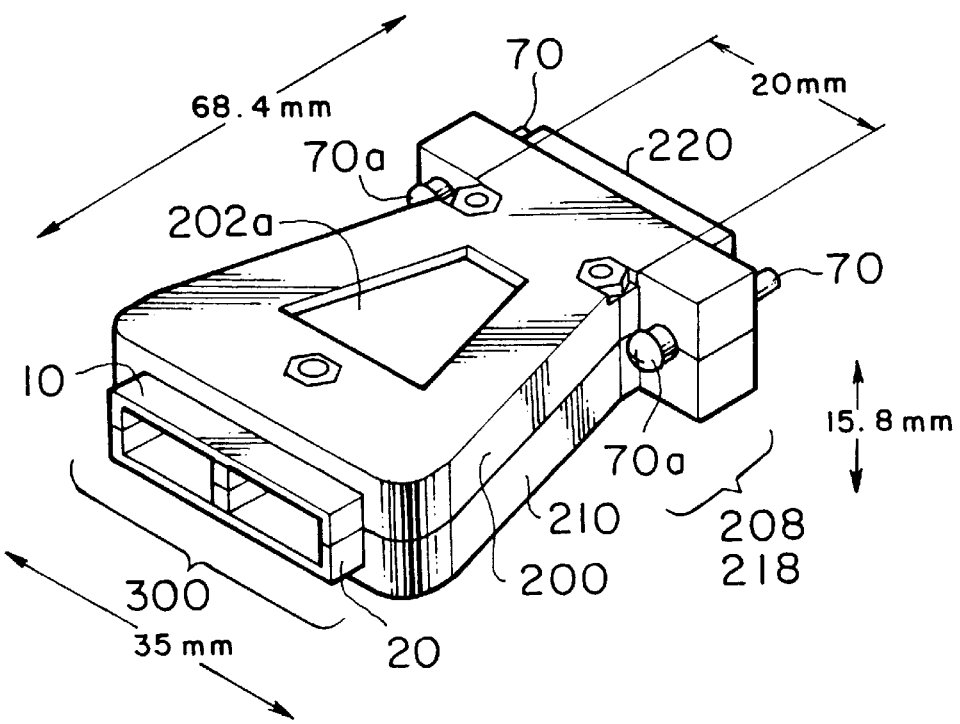
FIG. 6 is a perspective view showing the 2nd embodiment of the optical fiber module of the invention.
Figure 7:
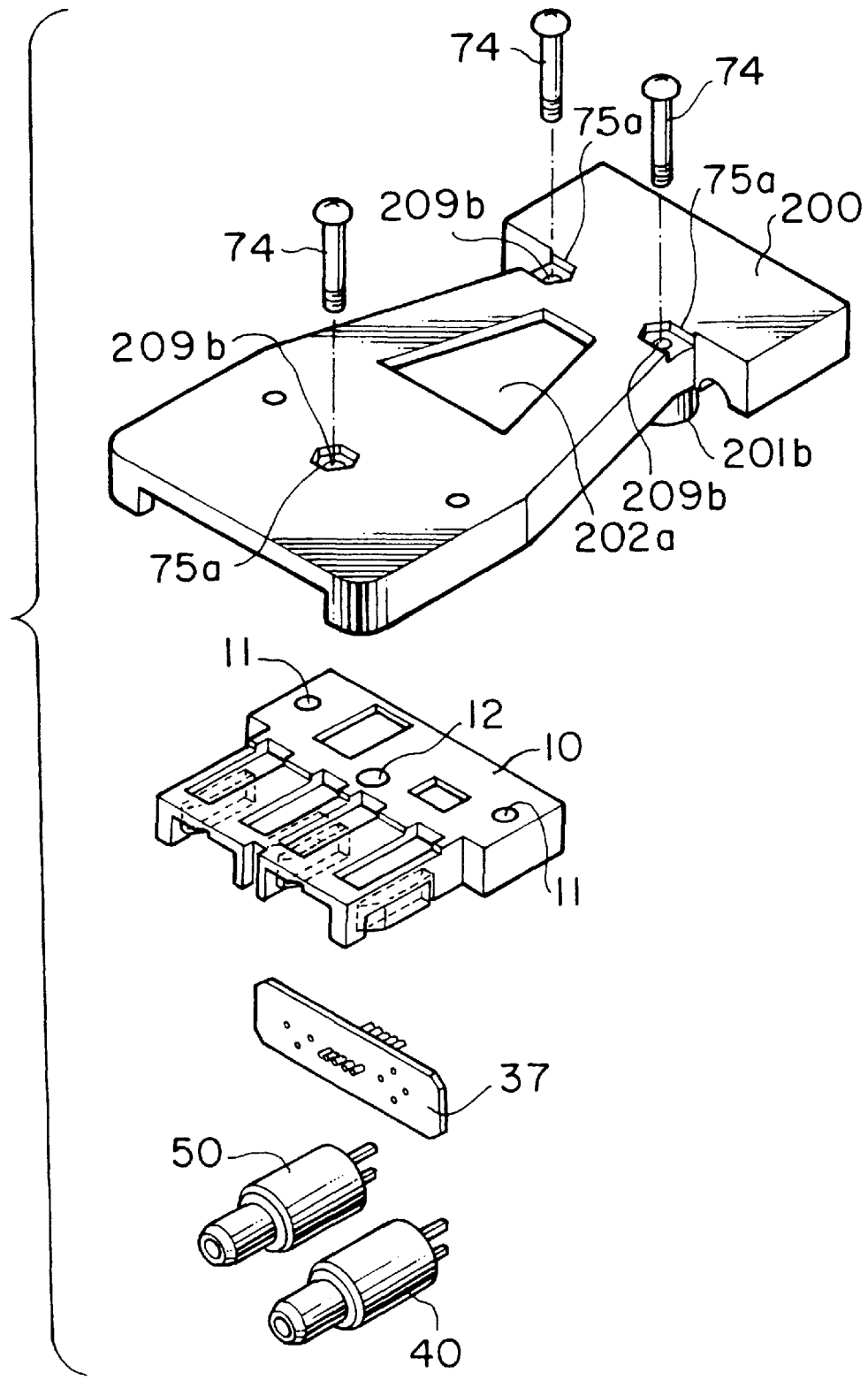
FIG. 7 is an exploded, perspective view showing the 2nd embodiment of the optical fiber module of the invention.
Figure 8:
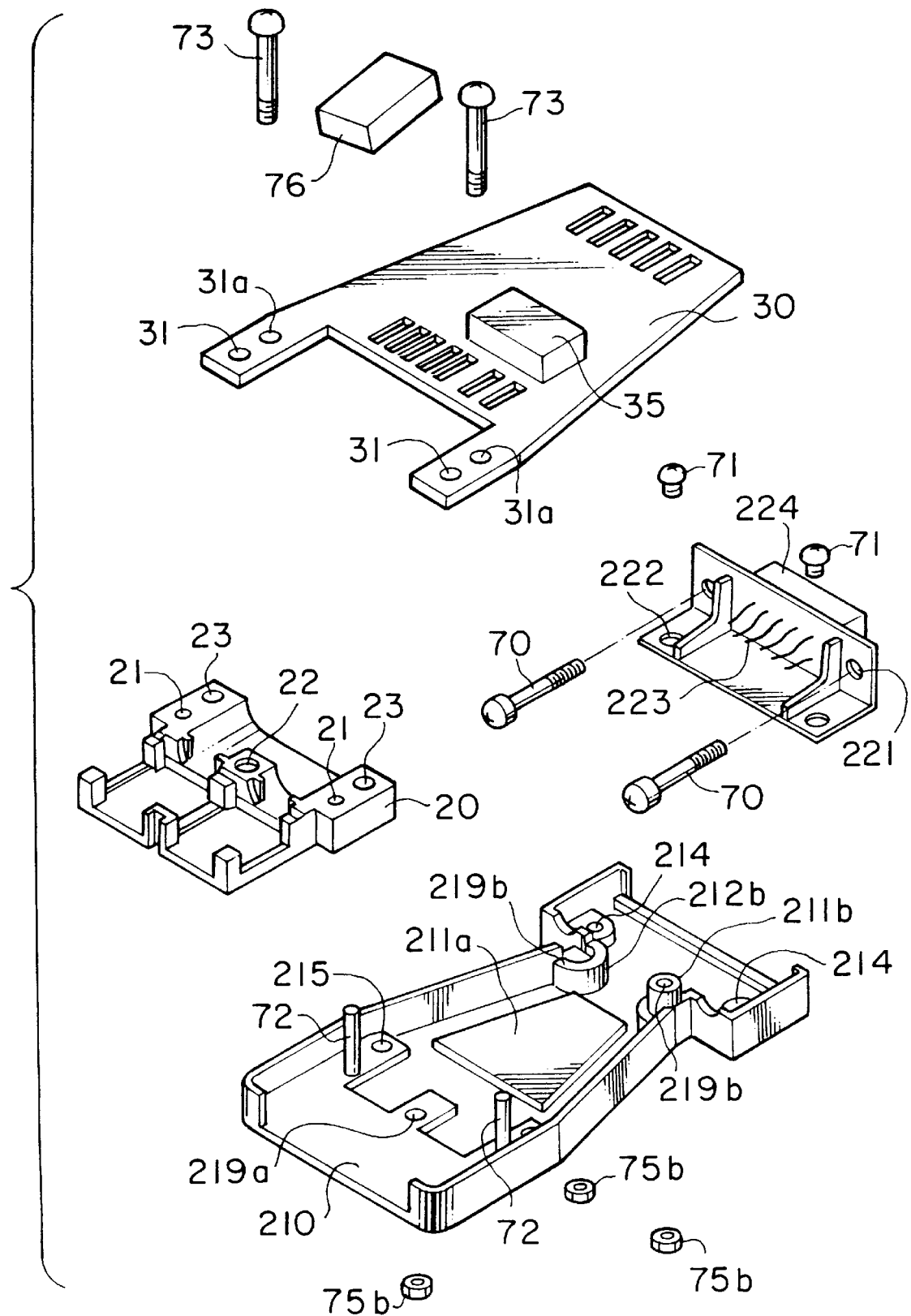
FIG. 8 is an exploded, perspective view showing the 2nd embodiment of the optical fiber module of the invention.
Figure 9:
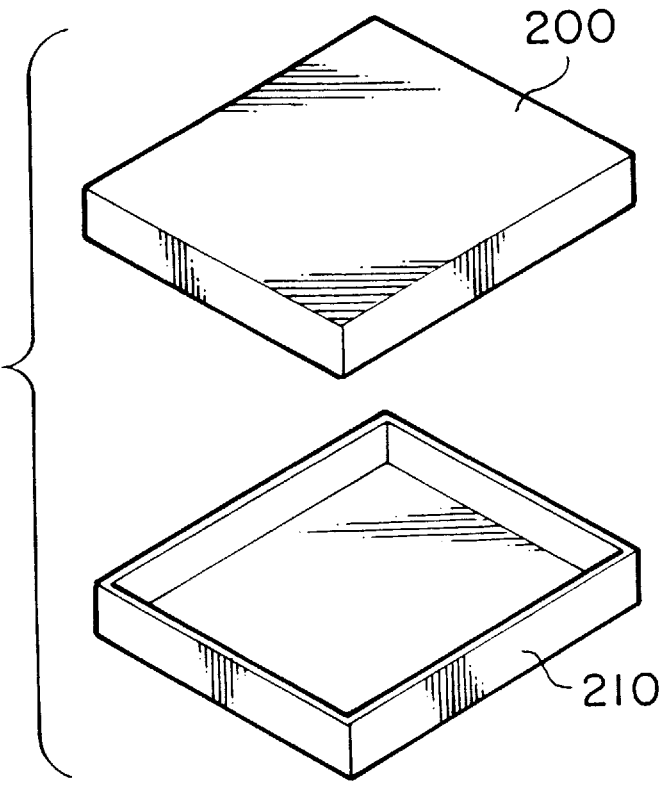
FIG. 9 is a conceptual view showing the 2nd embodiment of the optical fiber module of the invention.
Figure 10:
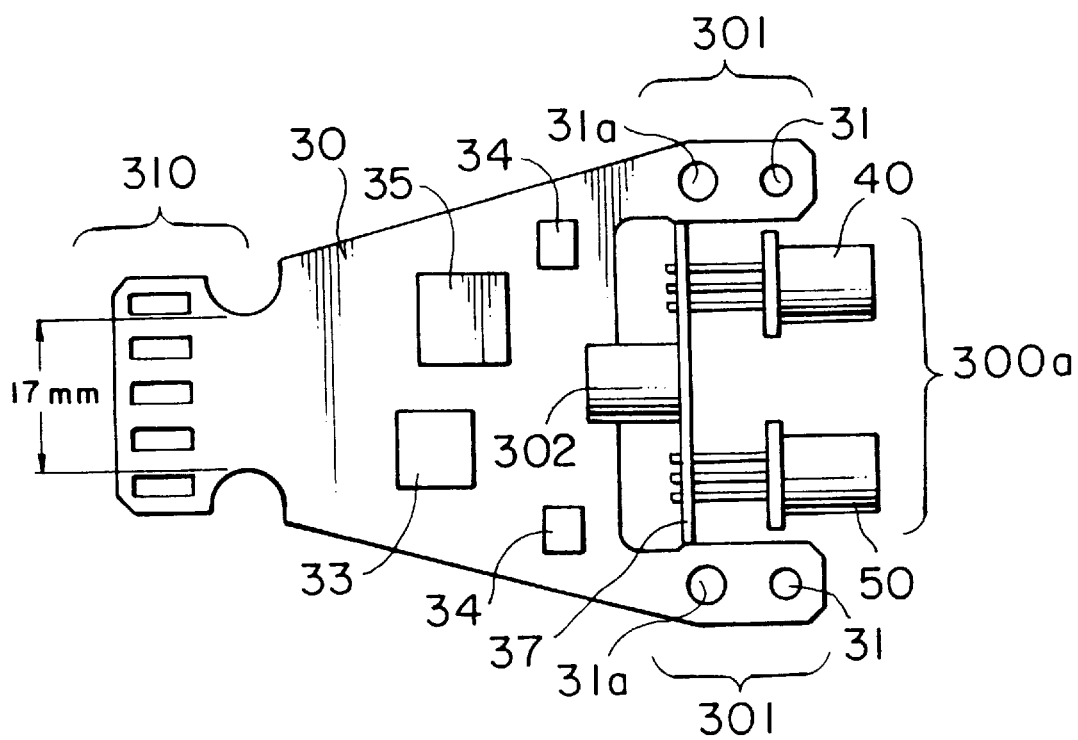
FIG. 10 is a plan view showing the PCB which is a constituent part of the 2nd embodiment of the optical fiber module of the invention.
Figure 11:
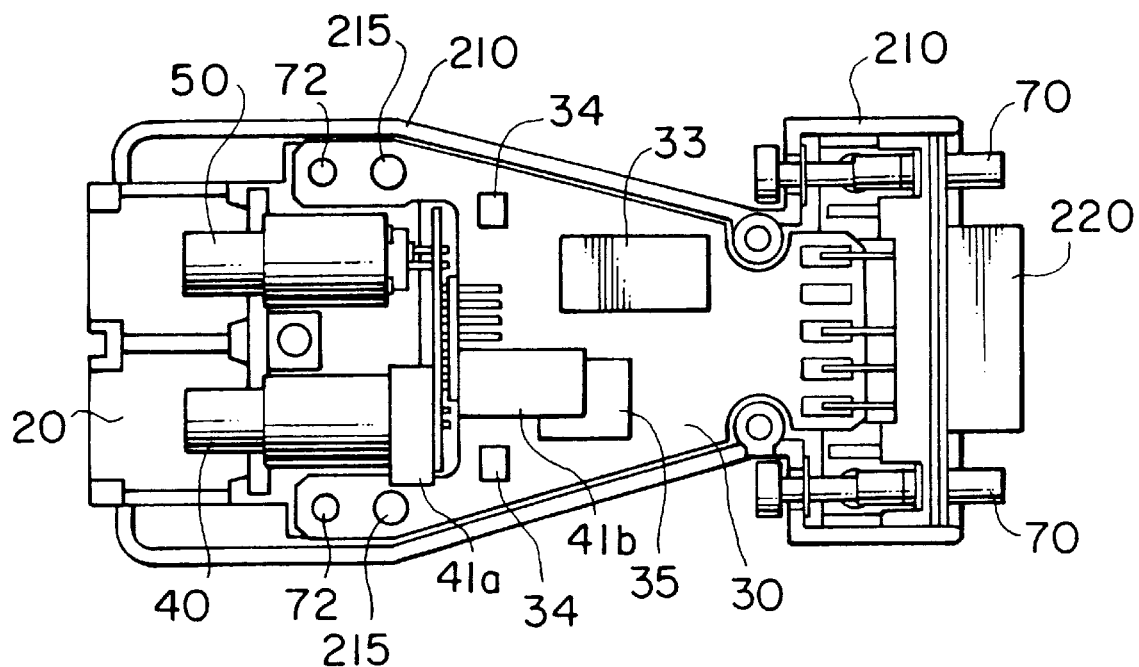
FIG. 11 is a cross-sectional, plan view showing the 2nd embodiment of the optical fiber module of the invention.
Figure 24:
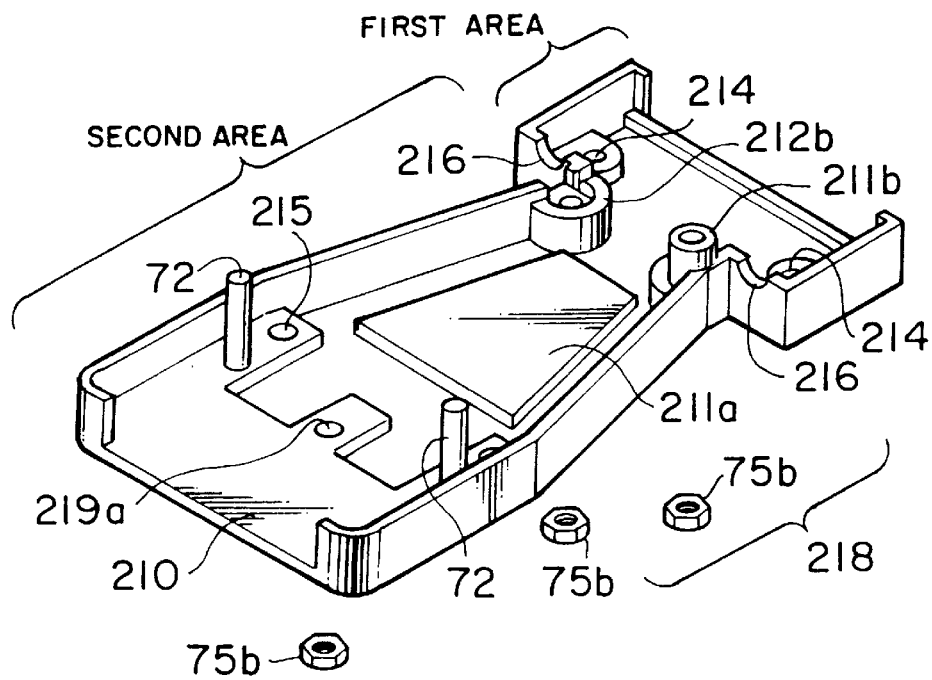
FIG. 24 is a perspective view showing a lower cover which is a constituent part of the 2nd embodiment of the optical fiber module of the invention.
Figure 25:
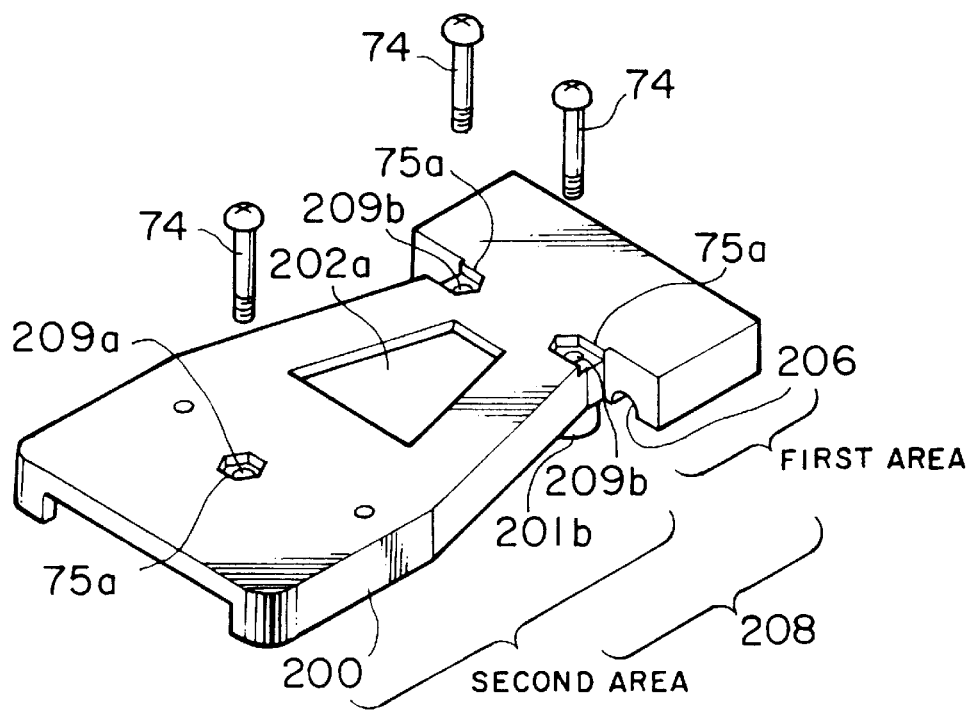
FIG. 25 is a perspective view showing an upper cover which is a constituent part of the 2nd embodiment of the optical fiber module of the invention.
Figure 26:
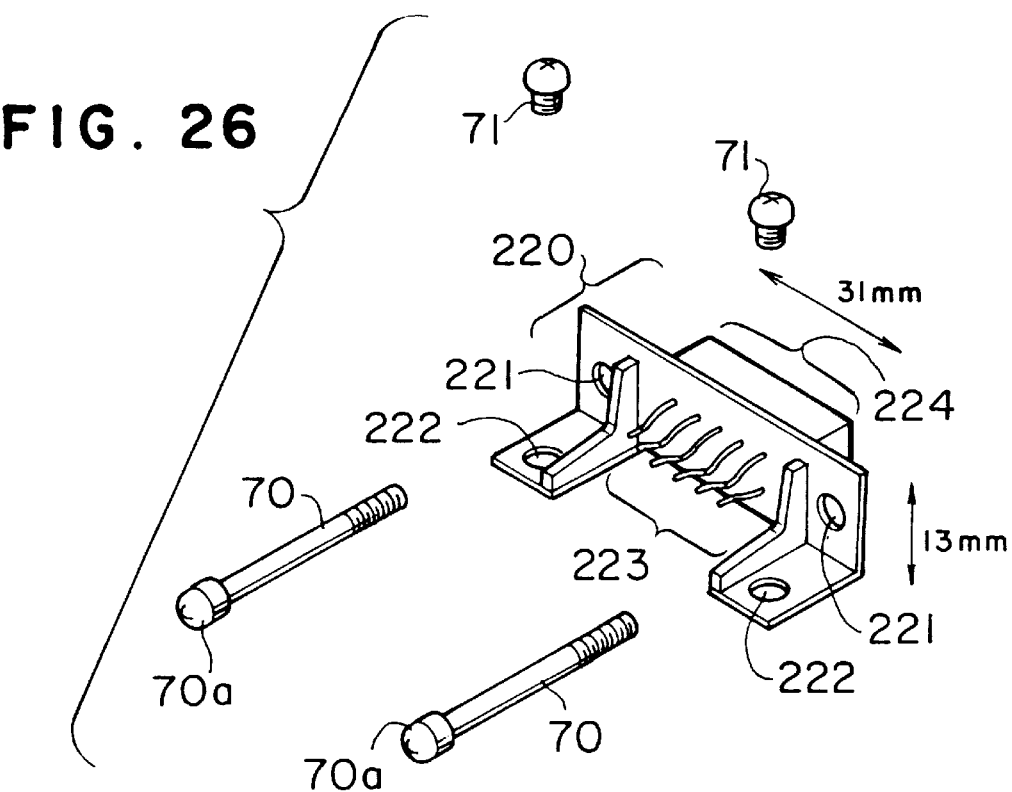
FIG. 26 is a perspective view showing an electric connector which is a constituent part of the 2nd embodiment of the optical fiber module of the invention.
Figure 27:
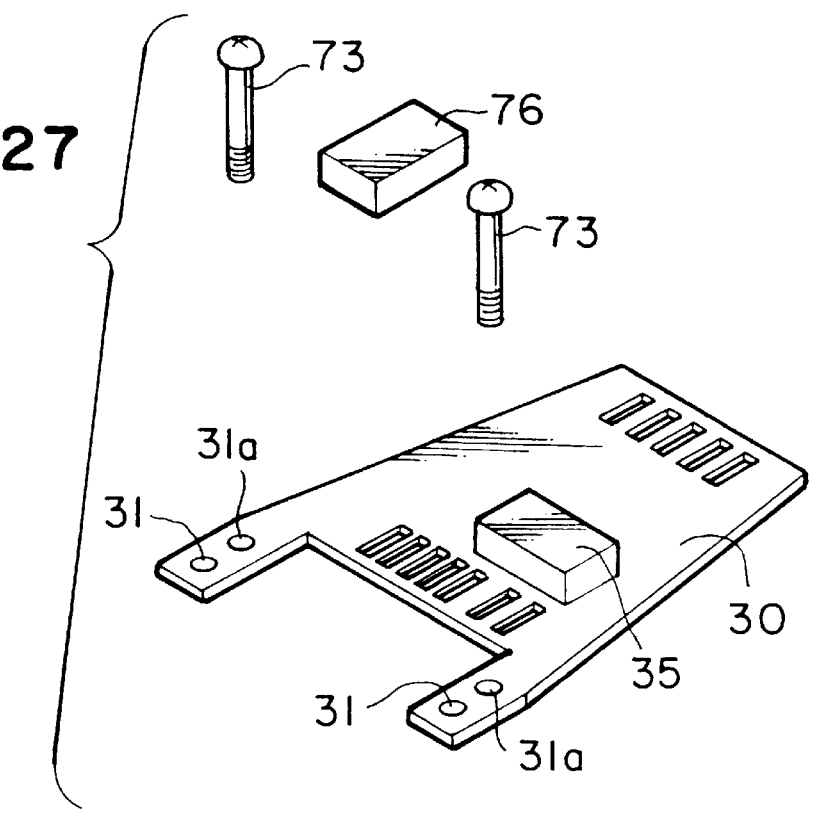
FIG. 27 is a perspective view showing the printed circuit board which is a constituent part of the 2nd embodiment of the optical fiber module of the invention.
Figure 28:
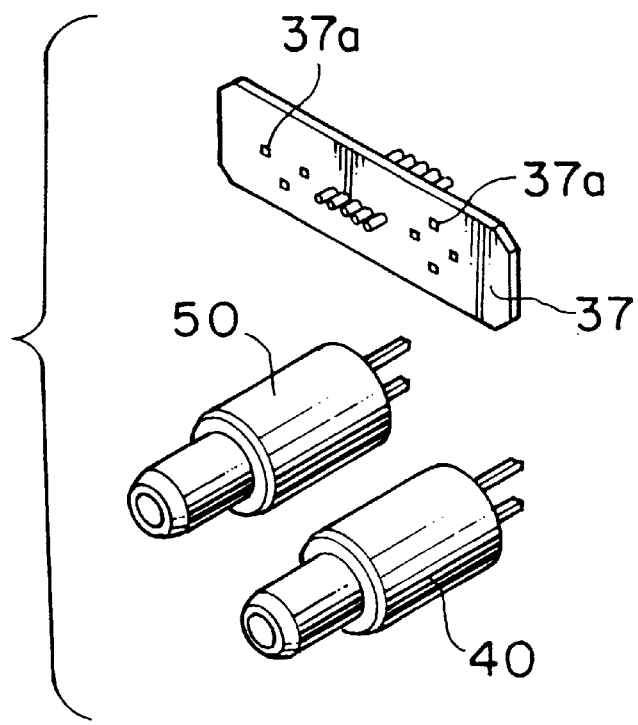
FIG. 28 is a perspective view showing an LD module and a PD module which are constituent parts of the 2nd embodiment of the optical fiber module of the invention.
Figure 29:
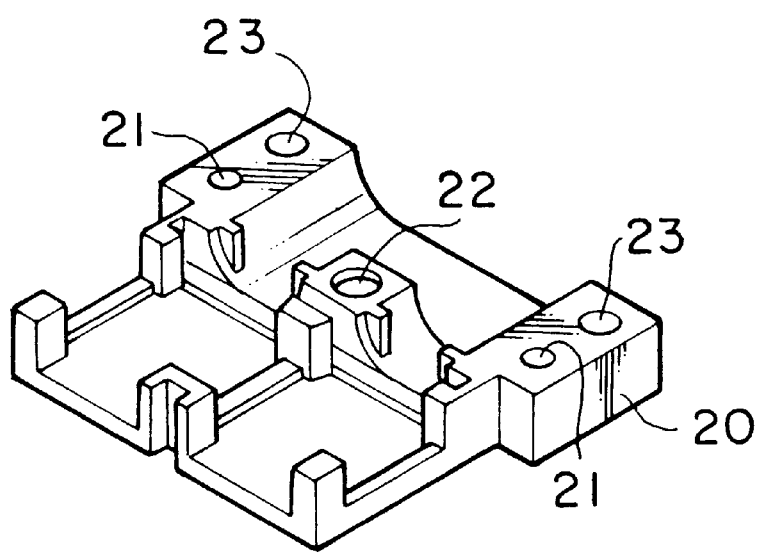
FIG. 29 is a perspective view showing a lower frame which is a constituent part of the 2nd embodiment of the optical fiber module of the invention.
Figure 30:
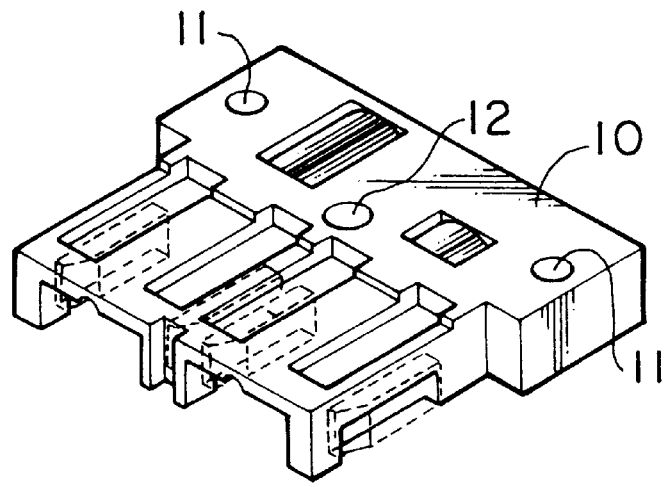
FIG. 30 is a perspective view showing an upper frame which is a constituent part of the 2nd embodiment of the optical fiber module of the invention.

FIG. 6 is a perspective view showing a 2nd embodiment of an optical fiber module of the invention, FIGS. 7 and 8 are exploded, perspective views thereof, FIG. 9 is a conceptual view showing the construction of the 2nd embodiment of the optical fiber module of the invention, FIG. 10 is a plan view showing a PCB which is a constituent part of the 2nd embodiment of the optical fiber module of the invention, FIG. 11 is a cross-sectional, plan view showing the 2nd embodiment of the optical fiber module of the invention, FIG. 24 is a perspective view showing a lower cover which is a constituent part of the 2nd embodiment of the optical fiber module of the invention, FIG. 25 is a perspective view showing an upper cover which is a constituent part of the 2nd embodiment of the optical fiber module of the invention, FIG. 26 is a perspective view showing an electric connector which is a constituent part of the 2nd embodiment of the optical fiber module of the invention, FIG. 27 is a perspective view showing the PCB which is a constituent part of the 2nd embodiment of the optical fiber module of the invention, FIG. 28 is a perspective view showing an LD module and a PD module which are constituent parts of the 2nd embodiment of the optical fiber module of the invention, FIG. 29 is a perspective view showing a lower frame which is a constituent part of the 2nd embodiment of the optical fiber module of the invention, and FIG. 30 is a perspective view of an upper frame which is a constituent part of the 2nd embodiment of the optical fiber module of the invention. The construction of the optical fiber module of the invention will be described using these Figures.

Figure 47:
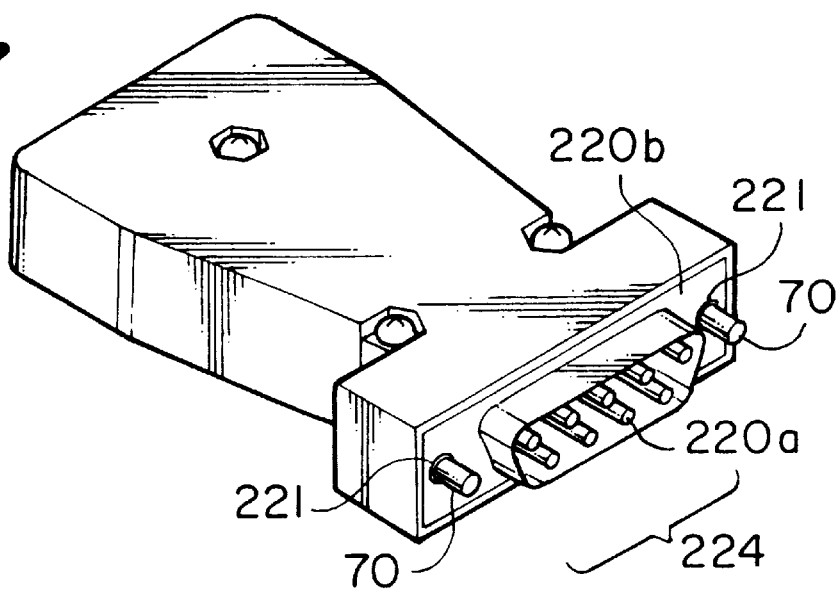
FIG. 47 is a perspective view showing a connector used in each of the embodiments of the optical fiber modules of the invention.

First, the electric connector will be described. In FIGS. 26 and 47, the electric connector 220 includes an electric connector portion 224, pins 220a, a contact portion 223, lock screw openings 221, connector-fixing openings 222, and a panel 220b.

The pins 220a project outwardly from the panel 220b, and are arranged regularly so as to be electrically connected to a mating connector (not shown), and the number of the pins 220a can be selected in accordance with the number of signals to be transmitted. The pins 220a are made of an electrically-conductive material such as a steel alloy plated with gold.

The electric connector portion 224 is fitted relative to the mating connector, and projects outwardly from the panel 220b in surrounding relation to the pins 220a to protect the pins 220a. The electric connector portion 224 has a generally trapezoidal shape as shown in FIG. 47.

The lock screw openings 221 are provided in the panel 220b, and lock screws 70 are passed respectively through these openings so as to fix the fitting relative to the mating connector.

The connector-fixing openings 222 are used for fixing the electric connector 220.

The cover structure, constituting a shell of the optical fiber module of the invention, has a clam-shell construction in which the upper cover 200 and the lower cover 210, each formed by a curved surface or not less than two flat surfaces as shown in FIG. 9, or by using a combination of these surfaces, are combined together to form an enclosed space therein, thus forming the whole of the cover. As shown in FIGS. 7 and 8, in this embodiment, with respect to the shape of the cover, the lower cover 210 and the upper cover 200 have the same shape, and one kind of a mold is used, and therefore the time required for the development of a mass-production mold can be reduced, and also the low-cost production can be achieved. With respect to a material, the upper cover 200 and the lower cover 210 not only constitute the shell but also intend to achieve a shield effect against electromagnetic waves produced from the PCB 30 and so on, and an aluminum alloy, which is an electrically-conductive material having an excellent strength, is used, but copper, zinc or an alloy thereof may be used.

In order to secure a maximum packaging area within the upper cover 200 and the lower cover 210, the PCB 30 has such a configuration that its peripheral edge extends along the inner peripheral surface of the upper cover 200 and the lower cover 210. An opening 31 for positioning the PCB 30, as well as an opening 31a for fixing the PCB 30 and for grounding purposes, is formed in each of projected portions 301. Reference numeral 310 denotes a connector connecting portion, and a land is formed thereon, and the electric connector 220 is connected to this portion (although it is not shown). The electric connector 220 of the surface mounting-type is used. By using the electric connector 220 of the surface mounting-type in the optical fiber module of the invention, the thickness of the optical fiber module of the invention can be reduced, and also the PCB 30 can be positioned near to the center of the optical fiber module, and the upper cover 200 and the lower cover 210 can have the same configuration. By thus arranging an optical connector portion 300, the PCB 30 and the electric connector 220 on the center position of the optical fiber module, there is achieved the optical fiber module having the excellent strength withstanding more various external forces. An LD driver 33 (comprising a semiconductor IC) for driving the LD module 50, a variable resistor 34 for adjusting driving current of the LD module 50 and so on, a variable resistor 34 for adjusting a detection level of a receiving signal from the PD module 40, and so on are mounted on the PCB 30. As shown in FIG. 10, by mounting the variable resistors 34 on an upper surface of the PCB 30, an adjusting process during the assembling of the optical fiber module is made easy. More specifically, after the electric connector 220 is mounted on the connecting portion 310 of the PCB 30 by the use of a jig for assembling and adjusting purposes, the electric connector 220 and the PCB 30 are fixedly secured at the same time to the lower cover 210 by electric connector-fixing screws 71 and PCB-fixing screws 73, and therefore the efficiency of the adjusting operation by the operator, who adjusts the optical fiber module, is higher when the variable resistors 34 are on the upper surface of the PCB 30 than when the variable resistors 34 are mounted on a lower surface of the PCB 30. Moreover, the enhanced efficiency of this adjusting operation achieves the low-cost optical fiber module. A small printed circuit board 37 is provided for transmitting and receiving electrical signals of the LD module 50 and the PD module 40 relative to the PCB 30, and is disposed perpendicularly to the PCB 30. As shown in FIG. 28 and FIG. 10, the small printed circuit board 37 has through holes 37a equal in number to leads of the LD module 50 and the PD module 40, a small connector 302 for achieving the connection to the PCB 30, a chip resistor (not shown), a capacitor (not shown), and so on. The LD module 50 and the PD module 40 are soldered to the small printed circuit board 37 to form a small assembly 300a (see FIG. 10), and the small assembly 300a is soldered to the PCB 30. By forming the small assembly 300a, it can be easily incorporated into the optical fiber module, and besides the LD module 50 or the PD module 40, which has many leads, can be incorporated. By using the small printed circuit board 37, stresses, produced when inserting and withdrawing an optical plug (not shown), can be avoided. The small connector 302 may be either of the through hole-type and the surface mounting-type. Since an output of a PD device of the PD module 40 is small, electromagnetic shielding and electrostatic shielding of a PD lead portion 47 of the PD module 40 are effected by a PD shield plate 41a, and electromagnetic shielding and electrostatic shielding of a transmission path up to an amplifier 35 are effected by a shield plate 41b (see FIG. 11).

The optical fiber module of this embodiment is connected to an electrical signal input-output connector (not shown), such as an extension slot in a host computer, and is used in this condition, and preferably, the thickness of the optical fiber module of the invention is not more than 25.4 mm since the interval between the extension slots in the host computer is 25.4 mm, and in view of the fact that these are arranged in an array-like manner when they are used, it is preferred from the viewpoint of handling that the module be as thin as possible. In this embodiment, a D-subminiature connector (hereinafter referred to as "electric connector") 220 is used as the electric connector. As shown in FIG. 26, the thickness of the electric connector 220 is about 13 mm, and the covers, retaining and fixing the electric connector 220, need to have a wall thickness of at least not less than about 1 mm, and in view of these, it is preferred that the thickness of the optical fiber module of the invention be 15 mm to 16 mm as shown in FIG. 6. From the viewpoint of a small-size design of the optical fiber module, it is also preferred that its width be small, and the width of the electric connector 220 needs to be not less than 31 mm as shown in FIG. 26, and in this embodiment the width of the optical fiber module is 35 mm as shown in FIG. 6, taking the thickness of the cover into consideration. The length of the optical fiber module is not particularly limited since it is used outside the extension slot of the host computer, and although it is preferred that the length be large so that the area of the PCB 30 can be increased, it is preferred in view of the small-size design, the strength and easy use of the optical fiber module that the length be not more than about 70 mm. In this embodiment, in view of the foregoing, the thickness is 15.8 mm, the width is 35 mm, and the length is 68.4 mm. However, in this embodiment, it should be noted that the outside dimensions of the optical fiber module are not limited. Although the electric connector 220 is used in this embodiment, a connector of other configuration can be used.

As shown in FIG. 24, openings 214 for fixing the electric connector 220 are formed in a first area of the lower cover 210, and pins 72 for positioning the upper frame 10, the lower frame 20, the PCB 30 and the upper cover 200 are formed on a second area of the lower cover 210, and PCB-fixing openings 215 for fixing the PCB 30 and for grounding purposes are formed in this second area. In this embodiment, in view of the low-cost design, the mounting strength, effective utilization of the space in the upper cover 200 and the lower cover 210, and so on, the PCB-fixing screws 73, fastened respectively to the PCB-fixing openings 215, are M2, and a stainless steel material, having a diameter of 2 mm, is used as the pin 72. The PCB-fixing openings 215 are provided in the vicinity of the LD module 50 and the PD module 40 so that the packaging area of the PCB 30 will not be reduced (see FIG. 11). For the same reason, the pins 72 are so arranged that they pass in the vicinity of the LD module 50 and the PD module 40 (see FIG. 11). Although the pins 72 are fixed to the lower cover 210 by a press-fitting method which requires a short time and a low cost, the effects of the invention will not be lost even if the pins are fixed by adhesive bonding, welding or other means.

The electric connector 220, retained on the first area of the lower cover 210, is connected to electrical signal output terminals of a host computer or the like, and as shown in FIG. 26, this electric connector 220 includes the electric connector portion 224 for connection to the mating connector, the contact portion 223 for connection to the PCB 30, the connector-fixing openings 222 for fixing the electric connector 220 to the lower cover 210, and the lock screw openings 221 for the lock screws 70 used for locking connection to the mating connector. Connection to the mating connector (not shown) of the system is effected through the lock screws 70, and these screws are disposed at the first area.

In the optical fiber module of the invention, the electric connector 220 is fastened to the connector-fixing openings 214 in the lower cover 210 by the electric connector-fixing screws 71 passing respectively through the connector-fixing openings 222. With this construction, the high reliability can be obtained. As means for fixing the electric connector 220, adhesive bonding or other means can be used.

As described above, by fixing the electric connector 220 to the lower cover 210, stresses, acting on the PCB 30 when inserting and withdrawing the electric connector 220, are dispersed to the lower cover 210, and therefore the stresses, acting on the contact portion 223, are reduced, so that the high reliability can be achieved.

In the optical fiber module of the invention, as shown in FIG. 24 or FIG. 25, a constricted portion 208 is provided between the first and second areas of the upper cover 200, and a constricted portion 218 is provided between the first and second areas of the lower cover 210. With this construction, lock screw heads 70a of the lock screws 70 can be rotated at the constricted portions 208 and 218 as shown in FIG. 6, and the second areas can be effectively utilized for the PCB 30, and the small-size design of the optical fiber module can be achieved.

As shown in FIG. 6, the lock screws 70 need to pass respectively through openings formed in the upper cover 200 or the lower cover 210. However, in this embodiment, the upper cover 200 and the lower cover 210 are separated from each other at the center of the optical fiber module, and therefore as shown in FIGS. 24 and 25, lock screw recesses 216 are formed in the lower cover 210 while lock screw recesses 206 are formed in the upper cover 200, and with this construction the lock screws 70 can be easily attached. As shown in FIG. 26, M2.6, M3 or #4-40UNC is used as the lock screw 70, and the lock screws 70 are inserted respectively into the lock screw openings 221 from that side where the contact portion 223 is provided, and are fitted respectively into tapping screws in the mating connector (not shown). In this manner, the two connectors are locked together.

In this embodiment, a tool such as a screw driver is used as means for rotating the lock screw 70. The reasons are that the cost can be made low by using screws of an ordinary configuration as the lock screws 70, that since the diameter of the lock screw head 70a is not more than 4.5 mm, the width of the constricted portions 208 and 218 can be about 20 mm, so that the PCB 30 can have a width of about 17 mm, thereby increasing the area of the PCB 30, and that the larger width of the constricted portions 208 and 218 is preferred in view of the strength of the constricted portions 208 and 218 of the upper and lower covers 200 and 210.

In the optical fiber module of the invention, in order to increase the area of the PCB 30, the second area of each of the upper cover 200 and the lower cover 210 is larger than the first area thereof, and also is larger than the constricted portion 208, 218 (see FIGS. 24 and 25). Therefore, the axis of rotation of the screw driver or the like is inclined with respect to the axis of rotation of the lock screw 70, and these axes of rotation will not coincide with each other. However, if the misalignment between the two rotation axes is not more than about 20 degrees, the rotation for fastening purposes is possible, and therefore in this embodiment side walls of the upper cover 200 and the lower cover 210 are inclined as shown in FIGS. 24 and 25. For the above reason, the inclination angle may have any value in so far as it is not more than about 20 degrees, but it is preferred that the inclination angle be about 10 degrees to 20 degrees so as to achieve the small-size design of the optical fiber module. In this embodiment, the inclination angle is 15 degrees.

An inwardly-directed convex portion 201a (not shown) is formed on the second area of the upper cover 200, and an inwardly-directed convex portion 211a is formed on the second area of the lower cover 210 (see FIG. 24). In this embodiment, in order to prevent deformation of the upper cover 200 and the lower cover 210 due to thermal shrinkage during the molding of these covers, these covers have a uniform wall thickness. Therefore, a concave portion 202a is formed at the outer side of the convex portion 201a of the upper cover 200 as shown in FIG. 25, and similarly a concave portion (not shown) is formed at the outer side of the lower cover 210 corresponding to the convex portion 211a.

However, there are many cases where the thermal deformation does not cause any particular problem, and it should be noted that the wall thickness of the covers does not always need to be uniform.

With this construction, the upper cover 200 and the lower cover 210 can be reinforced. As shown in FIG. 8, the convex portions 201a and 211a are so disposed that the spacing of the semiconductor ICs (including the amplifier 35 and the LD driver 33 (not shown)) on the PCB 30 from the convex portion is narrowed, and therefore by inserting a thermally-conductive material 76, such as silicone resin, between the semiconductor ICs (including the amplifier 35 and the LD driver 33) and the convex portion 201a or the convex portion 211a to contact the convex portion 201a or the convex portion 211a with the semiconductor ICs (including the amplifier 35 and the LD driver 33), heat, generated from the semiconductor ICs (including the amplifier 35 and the LD driver 33), can be transferred to the upper cover 200 or the lower cover 210, and thus the upper cover 200 and the lower cover 210 can be used as a radiator, so that the operation of the PCB 30 can be stabilized.

In this embodiment, although the thermally-conductive material 76 is a silicone resin, it is to be noted that the effects of the invention will not be affected at all even if other material, such as copper, aluminum, zinc or an alloy thereof, is used. The upper cover 200 or the lower cover 210 can be held in direct contact with the semiconductor ICs so as to achieve a radiating effect.

When inserting and withdrawing the optical fiber module of the invention, the fingers can be engaged in the concave portion 202a (see FIG. 25) in the upper cover 200 and the concave portion 212a (not shown) in the lower cover 210, so that the optical fiber module can be quite easily handled. It will be readily appreciated that by locating the center of gravity of the optical fiber module of the invention in the vicinity of the second areas and particularly in the vicinity of the concave portions 202a and 212a, the handling performance can be further enhanced. Also, the concave portions 202a and 212a in the covers are suitably used as those portions for indicating the name of the product, and the indicating method may be any of the affixing of a seal, an integral molding when molding the upper cover 200 and the lower cover 210, and the marking after the molding of the upper cover 200 and the lower cover 210. As shown in FIG. 6, the optical connector portion 300 is adapted to be mounted at front end portions of the upper cover 200 and the lower cover 210. The optical connector portion 300 is constituted by the upper frame 10, the lower frame 20, the LD module 50 and the PD module 40.

As shown in FIG. 30, positioning openings 11, a cover screw opening 12 and pawls (not shown) for fitting engagement with the optical plug (not shown) are provided at the upper frame 10. As shown in FIG. 29, positioning openings 21, a cover screw opening 22 and PCB-fixing openings 23 are provided in the lower frame 20. The LD module 50 and the PD module 40 are positioned and fixed to the lower frame 20.

For effecting the insertion and withdrawal relative to the optical plug, resin-molded products, for example, of polycarbonate (PC) or polybutylene terephthalate (PBT) are suitable for the upper frame 10 and the lower frame 20, respectively.

As shown in FIGS. 7 and 8, the positioning openings 11 in the upper frame 10, as well as the positioning openings 21 in the lower frame 20, are fitted respectively on the pins 72 formed upright on the lower cover 210, so that these openings are used to position the upper frame 10, the lower frame 20 and the lower cover 210 relative to one another. The pins 72 also serve to absorb the stresses, produced when inserting and withdrawing the optical plug (not shown), and preferably a cylindrical surface of each positioning opening 11 in the upper frame 10, as well as a cylindrical surface of each positioning opening 21 in the lower frame 20 is vertical. Therefore, a draft at the time of molding the upper frame 10 and the lower frame 20 is 0.

The optical fiber module of the invention is of such a construction that the positioning of the lower frame 20 and the PCB 30 is effected also by the use of the pins 72 formed on the lower cover 210, as shown in FIG. 8, and as compared with the case where the positioning of the lower frame 20 and the positioning of the PCB 30 are effected independently of each other, not only the positioning mechanisms can be reduced but also the area of the PCB 30 can be increased. When fixing the PCB 30 to the lower cover 210, the PCB-fixing screws 73 extend respectively through the PCB-fixing openings 23 in the lower frame 20.

In the optical fiber module of the invention, by providing a ground around each opening 31a for fixing the PCB 30, not only the PCB-fixing screws 73 and the lower cover 210 can be grounded but also the upper cover 200 and the lower cover 210 can be grounded through cover screws 74, and the upper cover 200 and the lower cover 210 can be used as a shield as a whole. As means for electrically connecting the PCB 30 to the upper case 200 and the lower case 210, it may be proposed to use a method in which metal springs are provided on the PCB 30, and the electrical connection is obtained by the resilient force of the springs, and a method in which conductive wires are extended from the PCB 30, and are connected to the upper cover 200 and the lower cover 210. However, in either case, such construction must be provided separately from the fixing means for the PCB 30, and the number of steps increases, and the number of the component parts increases, and this is not desirable. The PCB-fixing screws 73 can achieve the fixing of the PCB 30 and the electrical connection between the PCB 30 and the lower cover 210 at the same time, and it is clear that these screws are effective in the saving of the PCB 30, the reduction of the number of the component parts and the steps.

In the optical fiber module of the invention, the upper frame 10 and the lower frame 20 except those portions thereof in the range of not more than about 2 mm from their front ends are covered with the upper cover 200 and the lower cover 210, as shown in FIG. 6. With this arrangement, when reversely inserting the optical plug (not shown) into the optical connector portion 300, the upper cover 200 and the lower cover 210 hold the upper frame 10 and the lower frame 20 therebetween so that the upper frame 10 and the lower frame 20 will not be opened in an upward-downward direction, thus disenabling the insertion. Therefore, the reverse insertion of the optical plug into the optical connector portion 300 is impossible, and the safer optical fiber module can be achieved.

In the final form, the upper cover 200 and the lower cover 210 are connected together in opposed relation to each other, and it may be proposed to use adhesive bonding or the like as connecting means, but in view of the productivity and the fact that the upper cover 200 and the lower cover 210 are used also as the shield members, the fastening is effected by the cover screws 74 (see FIG. 25) in this embodiment. Preferably, the fastening is effected at the end portions of the upper cover 200 and the lower cover 210, but since the fastening means such as cover-fastening openings must be provided at the first areas of the upper cover 200 and the lower cover 210, and must be provided clear of the electric connector 220, the width of the first areas must be increased, so that the small-size design can not be achieved. Therefore, the fastening means is provided at the second areas of the upper cover 200 and the lower cover 210 as shown in FIG. 25. Further, in order to achieve the stability, the productivity and the increased area of the PCB 30, the fastening is effected at three portions, and one of them is provided between the LD module 50 and the PD module 40, and the other two are provided in the vicinity of the connector. The three fastening portions are so arranged as to form an isosceles triangle, and the stresses, produced when attaching and detaching the optical plug (not shown), are dispersed ideally, thereby achieving the optical fiber module of high reliability. Reference numerals 209a and 209b denote cover-fastening openings in the upper cover 200, and reference numerals 219a and 219b denote cover-fastening openings in the lower cover 210.

M2 screws are used as the cover screws 74 and the PCB-fixing screws 73 in order to increase the packaging area of the PCB 30. The cover screws 74, passing respectively through the cover-fastening openings 209a and 209b and respectively through the cover-fastening openings 219a and 219b, are fastened by hexagon nuts 75b, respectively. A hexagonal hole 75a is formed in the surface side of each of the cover-fastening openings 209a, 209b, 219a and 219b so that the hexagon nut 75b will not freely rotate (see FIG. 25).

Projections 201b and 211b, formed respectively on the cover-fastening opening portions 209b and 219b of the upper cover 200 and the lower cover 210, are fitted respectively into recesses 212b and 202b, formed respectively in the cover-fastening opening portions 219b and 209b, when the upper cover 200 and the lower cover 210 are combined together, and these serve as a mechanism for positioning the upper cover 200 and the lower cover 210 with respect to each other (see FIGS. 24 and 25).

Even if the upper frame is molded integrally with the upper cover when the frames are made of a resin (PBT-PC) while the covers are made of aluminum (or an aluminum alloy) as described above, the effects of the invention will not be lost.

Here, the widths of the above-mentioned constricted portions and first areas can be defined as follows. The constricted portion 208, as well as the constricted portion 218, is disposed between the electric connector 220 at the first area and the optical connector portion 300 at the second area, and therefore the minimum value of the width of the constricted portions 208 and 218 is determined by the number of signal lines (not shown) of the PCB 30 which can pass, and by the width of the signal lines.

First, in this embodiment, the electric connector 220 is of the surface mounting-type, and 9 signal lines are used, and therefore about a half (4 to 5) of the signal lines need only to pass, and if the width of one signal line is 1.27 mm, then the minimum value of the width of the constricted portions 208 and 218 is about 10 mm.

Next, the maximum value of the width of the constricted portions 208 and 218 and the maximum value of the width of the first areas are determined by the diameter of the lock screw head 70a and the pitch of the lock screws 70.

Here, in the electric connector 220 of the surface mounting-type in this embodiment, the pitch of the lock screws 70 is 24.99 mm, and the diameter of the lock screw head 70a is 4.5 mm, and therefore the maximum value of the width of the first areas is about 30 mm. However, in view of the strength of the first areas, the maximum value of the width of the first areas is set to about 33 mm.

The maximum value of the width of the constricted portions 208 and 218 is about 20 mm. In view of the strength of the constricted portions 208 and 218, the maximum value of the width of the constricted portions 208 and 218 is set to 19.6 mm.

Therefore, the width ratio of the first area to the constricted portion 208, 218 is 1:0.3~0.6 which is a preferred design value.

Figure 12:
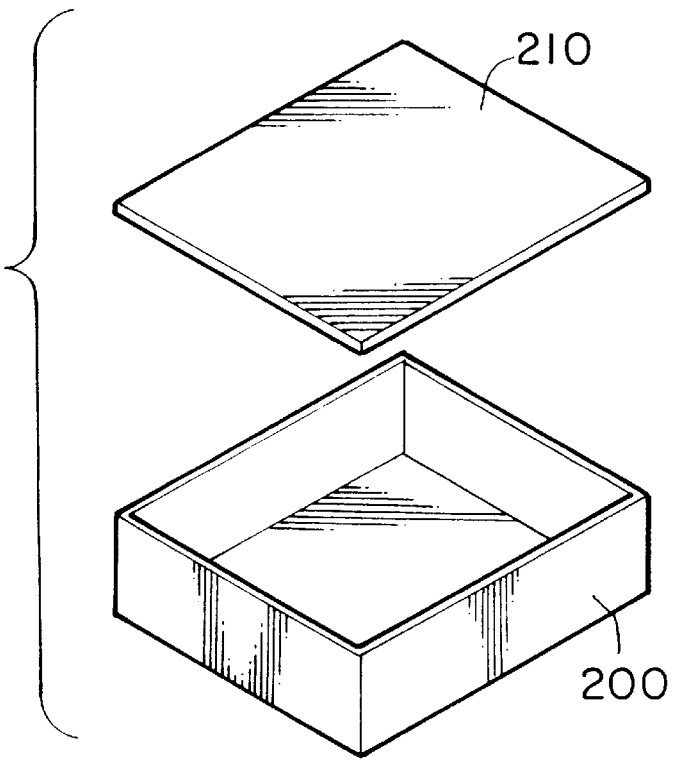
FIG. 12 is a conceptual view showing a 3rd embodiment of an optical fiber module of the invention.

FIG. 12 is a conceptual view showing a 3rd embodiment of an optical fiber module of the invention. As shown in this Figure, even if a cover structure of the optical fiber module of the invention has a bathtub construction in which a lower cover 210, formed by a curved surface or not less than two flat surfaces, and an upper cover 200 in the form of a flat plate are combined together to form a box body, the effects of the invention will not be lost. In this embodiment, although an aluminum alloy, which is an electrically-conductive material excellent in strength, is used, copper, zinc or an alloy thereof may be used.

Figure 13:
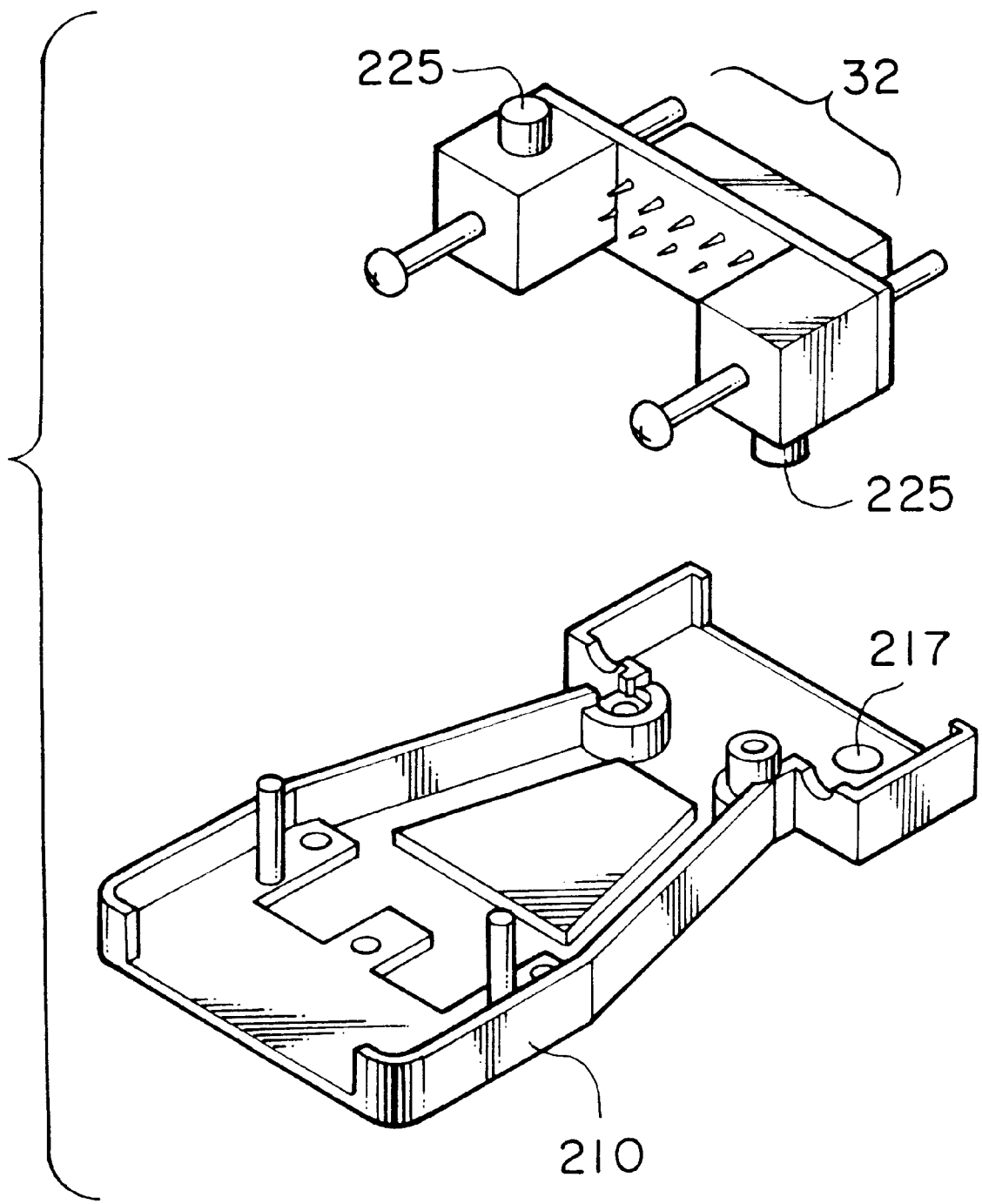
FIG. 13 is an exploded, perspective view showing a 4th embodiment of an optical fiber module of the invention.

FIG. 13 is an exploded, perspective view showing a 4th embodiment of an optical fiber module of the invention. Although the electric connector 220 is fixed to the lower cover 210 in the 2nd embodiment, it can be fixed to both of the upper cover 200 and the lower cover 210. In this embodiment, an opening (not shown) is formed in an upper cover 200, or an opening 217 is formed in a lower cover 210, and projections 225 are formed on an electric connector 32, and with this construction the electric connector 32 can be fixed using both of the upper cover 200 and the lower cover 210. Even if the electric connector 32 is replaced by the electric connector 220, it is clear that similar effects can be obtained.

There may be used fixing means in which similarly, an opening (not shown) is formed in the electric connector, and a projection for fitting in this opening is formed in the upper cover 200 or the lower cover 210.

Figure 14:
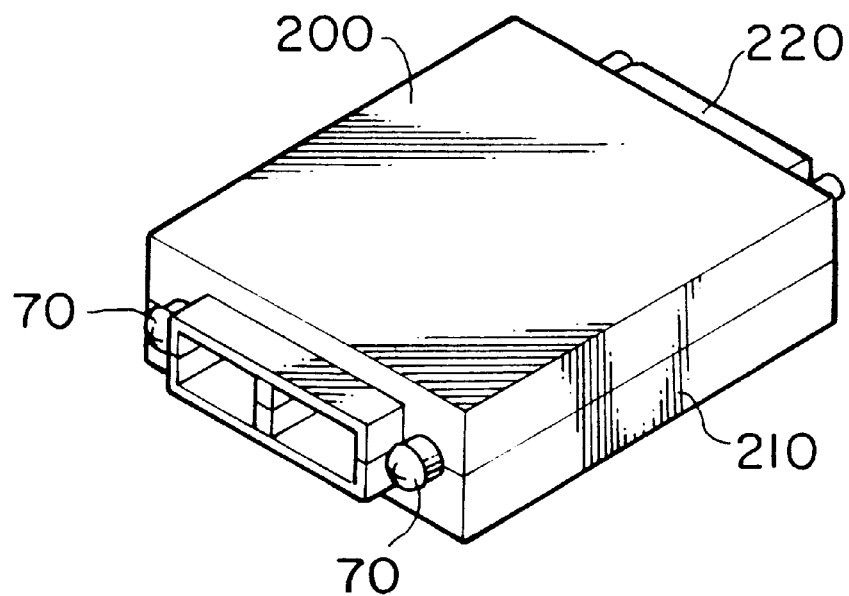
FIG. 14 is a perspective view showing a 5th embodiment of an optical fiber module of the invention.

FIG. 14 is a perspective view showing a 5th embodiment of an optical fiber module of the invention. In this embodiment, in order that an electric connector 220 and a mating connector (not shown) of a system can be locked together, there are used long lock screws 70 which extend through the optical fiber module from one end to the other end. In this case, although a width of a PCB 30 is limited since the distance between the lock screws 70 is set to 24.99 mm according to the standard of the electric connector 220, the optical fiber module, which can be easily attached to and detached from the system, can be achieved.

Figure 15:
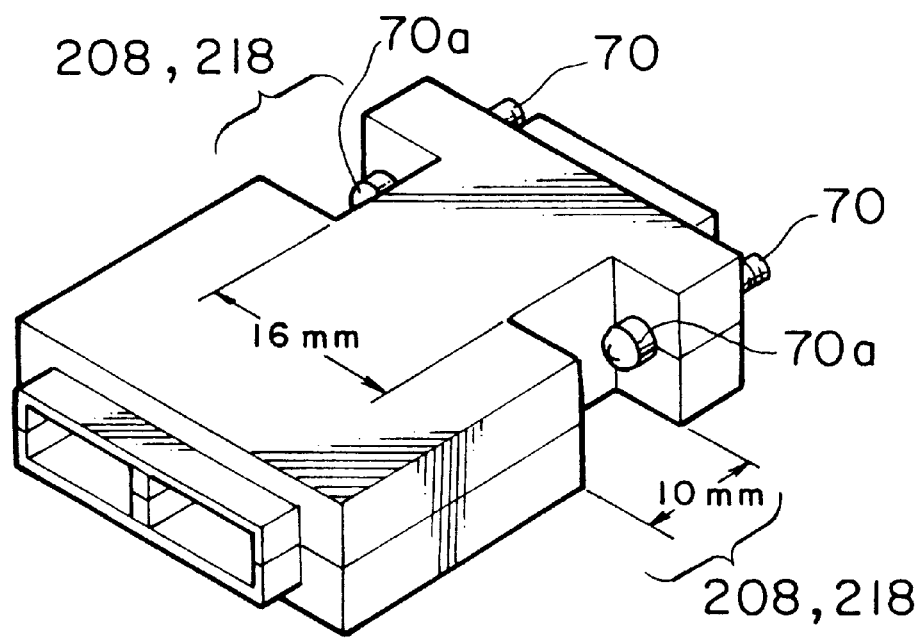
FIG. 15 is a perspective view showing a 6th embodiment of an optical fiber module of the invention.

FIG. 15 is a perspective view showing a 6th embodiment of an optical fiber module of the invention. This embodiment differs from the 2nd embodiment in that constricted portions 208 and 218 have a rectangular shape and that the need for a screw driver, serving as means for rotating the lock screws 70, is obviated. When rotating a lock screw head 70a directly by the fingers, the lock screw head 70a needs to have a diameter of about 8 mm so that it can be easily rotated by the fingers. Therefore, it is preferred that the width of the constricted portions 208 and 218 be not more than 16 mm.

In order that the lock screw head 70a can be rotated directly by the fingers, it is preferred that the length of the constricted portions 208 and 218 be not less than 10 mm. In this embodiment, the width of the constricted portions 208 and 218 is 16 mm, and the length of the constricted portions 208 and 218 is 15 mm, and with this construction there is achieved the optical fiber module which does not require a screw driver, and can be easily attached to and detached from the system.

Figure 16:
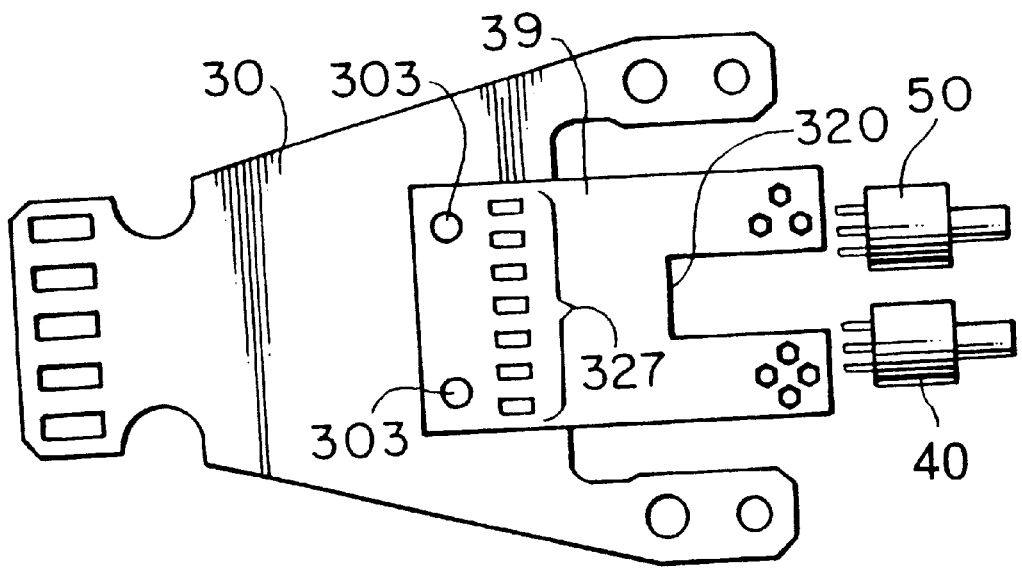
FIG. 16 is a plan view of a PCB used in a 7th embodiment of an optical fiber module of the invention.

FIG. 16 is a plan view of a PCB 30 used in a 7th embodiment of an optical fiber module of the invention. In this embodiment, instead of the small printed circuit board 37 used in the 2nd embodiment, a flexible printed circuit board (hereinafter referred to as "FPC") 39 is used. This FPC 39 has through holes corresponding in number to leads of an LD module 50 and a PD module 40, and has an FPC land 327 for achieving the connection to the PCB 30. The FPC 39 is a three-layer board, and a receiving signal of the PD module 40, and a transmitting signal of the LD module 50, are protected by a strong grounding layer. A slit 320 is formed in the FPC 39, and is disposed between the LD module 50 and the PD module 40, and good characteristics can be obtained even if the overall length of the LD module 50 is different from the overall length of the PD module 40. Here, if great importance is attached to an assembling efficiency, the overall length of the LD module is much varied plus or minus 1.5 mm. The reason is that a ferrule holder is positioned after a lens and an LD device are coarsely positioned. Therefore, to allow variations in the overall length of the LD module 50 leads to reduced assembling time for the LD module 50 and an increased non-defective rate. An output of a PD device of the PD module 40 is small, and therefore the shorter an output path of the PD module, the better. Therefore, by providing the slit 320 in the FPC 39, not only variations in the overall length of the LD module 50 can be absorbed but also a transmission environment for the PD module 40 can be enhanced. FPC openings 303 for positioning the FPC 39 with respect to a cover are formed in the FPC 39. By thus connecting the LD module 50 and the PD module 40 to the PCB 30 by the use of the FPC 39, the low-cost, high-reliability optical fiber module can be obtained.

In this embodiment, the FPC 39 is connected to the PCB 30 through the FPC land 327, but even if a connector or the like is provided on the PCB 30, and the FPC 39 is connected to the PCB 30 through this connector, the effects of the invention will not be lost. In this embodiment, the slit is formed in the single FPC, but even if separate FPCs are used respectively for the LD module 50 and the PD module 40, the effects of the invention will not be lost.

Figure 17:
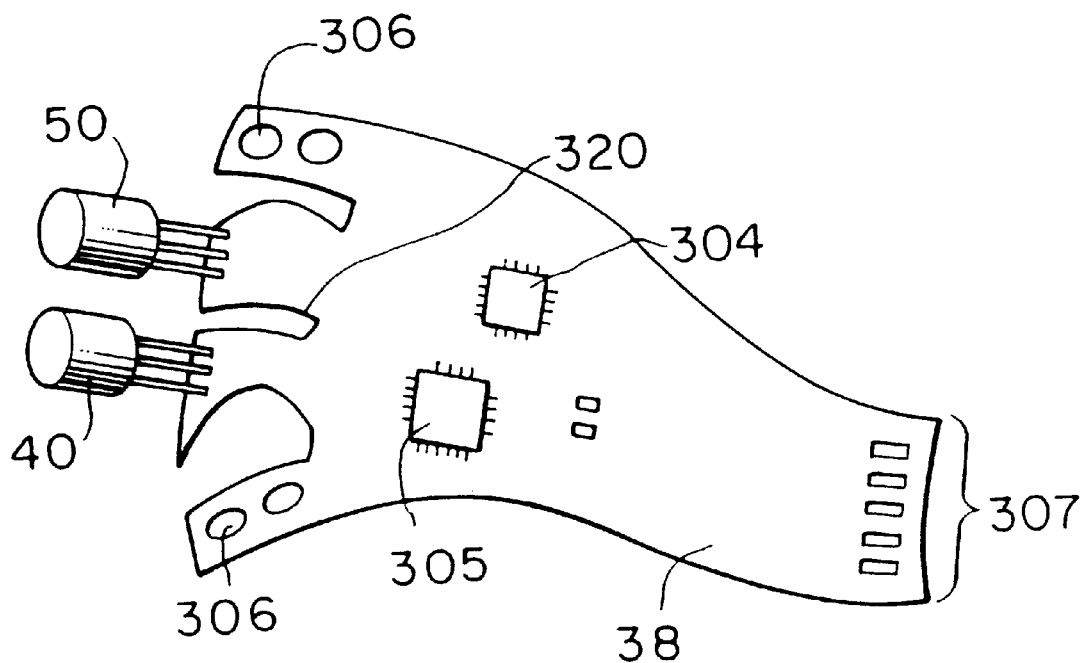
FIG. 17 is a perspective view of a main FPC used in an 8th embodiment of an optical fiber module of the invention.

FIG. 17 is a perspective view of a main FPC in an 8th embodiment of an optical fiber module of the invention. In this embodiment, an LD module 50 and a PD module 40 are connected directly to the main FPC 38, and a semiconductor IC 304 for PD, which is a bare chip, and a semiconductor IC 305 for LD, which is a bare chip, are mounted on the main FPC 38. This main FPC 38 has through holes corresponding in number to leads of the LD module 50 and the PD module 40, a land 307 for achieving the connection to an electric connector, and main FPC openings 306 for positioning the main FPC 38 with respect to a cover. The main FCP 38 is a multi-layer (three-layer) board so as to protect electrical signals from the LD module 50 and the PD module 40. A slit 320 is formed in that portion of the main FPC 38 to which the LD module 50 and the PD module 40 are connected, thereby reducing a load applied by the multi-layer board structure of the main FCP 38 (that is, a load acting on the LD module 50 and the PD module 40). Heat, generated from the semiconductor IC (bare chip) 304 for PD and the semiconductor IC (bare chip) 305 for LD, which generate a large amount of heat, may be radiated from the cover or other part, using a heat-transfer material, as shown in the 2nd embodiment.

By thus using the main FPC 38, stresses, produced when inserting and withdrawing the electric connector and when inserting and withdrawing an optical plug, can be avoided by the main FPC 38, so that there can be provided the optical fiber module which is highly reliable and more compact.

Figure 18:
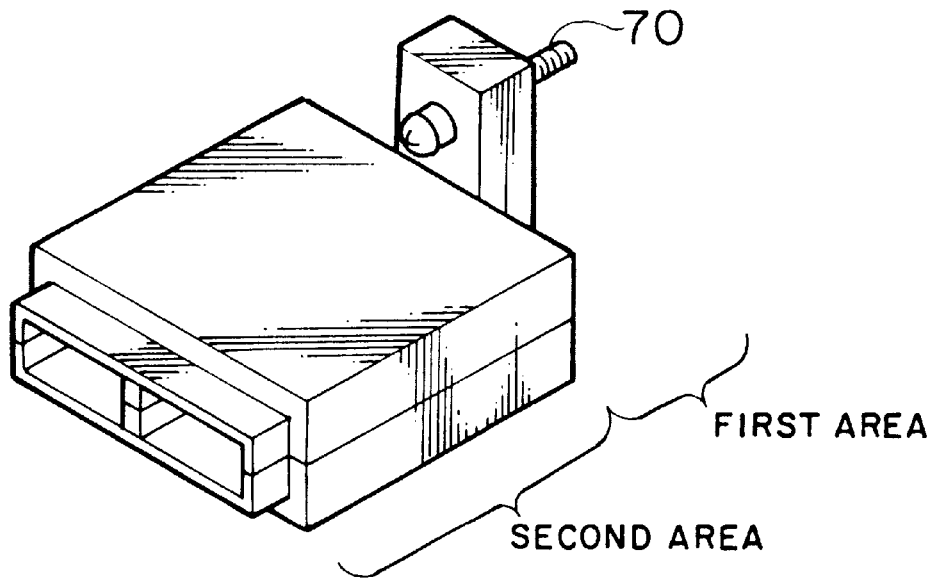
FIG. 18 is a perspective view showing a 9th embodiment of an optical fiber module of the invention.

FIG. 18 is a perspective view showing a 9th embodiment of an optical fiber module of the invention. Although the first area and the second area of each of the upper and lower covers 200 and 210 are parallel in the 2nd embodiment, a first area of each of upper and lower covers 200 and 210 can be disposed generally perpendicular to a second area as shown in FIG. 18. In this case, there can be provided the optical fiber module in which a lock screw 70 can be more easily fastened.

Figure 19:
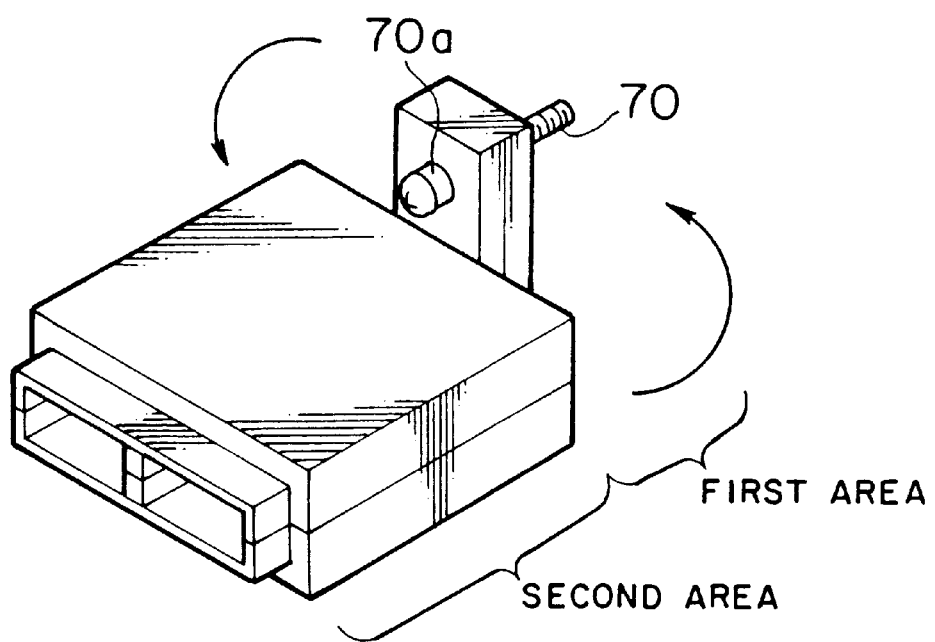
FIG. 19 is a perspective view showing a 10th embodiment of an optical fiber module of the invention.

FIG. 19 is a perspective view showing a 10th embodiment of an optical fiber module of the invention. More specifically, the 8th and 9th embodiments are applied, and when mounting the optical fiber module on a system, a first area of the optical fiber module is rotated about 90 degrees relative to a second area thereof, and after the optical fiber module is mounted on the system, the first area is inverted 90 degrees, and with this construction there can be provided the optical fiber module of a compact design in which a lock screw 70 can be easily fastened. When rotating the first area, a lock screw head 70a is embedded in a side surface of the first area so that it will not interfere with the second area.

Figure 20:
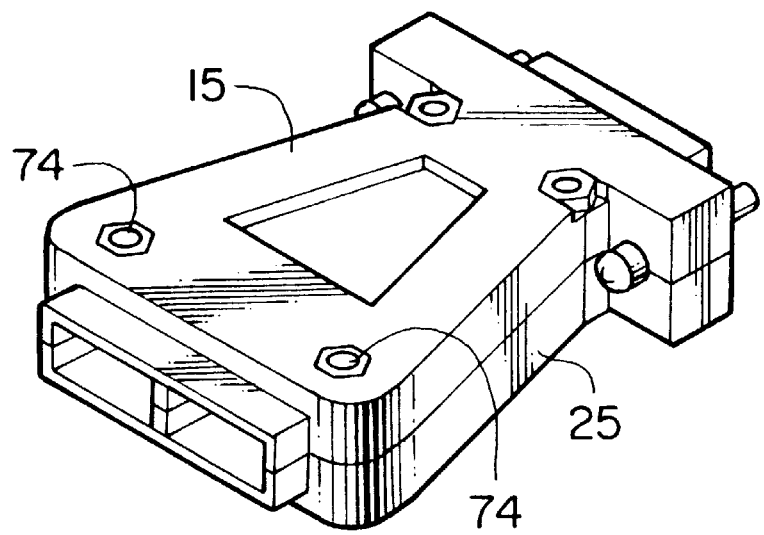
FIG. 20 is a perspective view showing a 11th embodiment of an optical fiber module of the invention.

FIG. 20 is a perspective view showing a 11th embodiment of an optical fiber module of the invention. In the optical fiber module of the invention, there are shown an upper cover frame 15, which is formed by combining the upper cover 200 and the upper frame 10 (shown in the 2nd embodiment), made of the same resin material (PC, PBT), into one part, and a lower cover frame 25 which is similarly formed by combining the lower cover 210 and the lower frame 20, made of the same resin material (PC, PBT), into one part. By thus combining the cover and the frame into one part, the cost of the optical fiber module can be more reduced. This 11th embodiment can be applied to the 1st to 10th embodiments so far described.

With respect to electromagnetic shielding and electrostatic shielding, an electrically-conductive film is formed on part or the whole of the surface of the upper and lower cover frames 15 and 25 which are the resin-molded products. A technique of applying the electrically-conductive film of metal, such as nickel and chromium, to the surface of the upper and lower cover frames 15 and 25, which are the resin-molded products, can be easily achieved using a plating treatment, vapor deposition or the like.

With respect to a reverse insertion prevention mechanism for the optical plug (not shown), the upper cover frame 15 and the lower cover frame 25 are fastened together by cover screws 74 in the vicinity of an optical connector.

Figure 21:
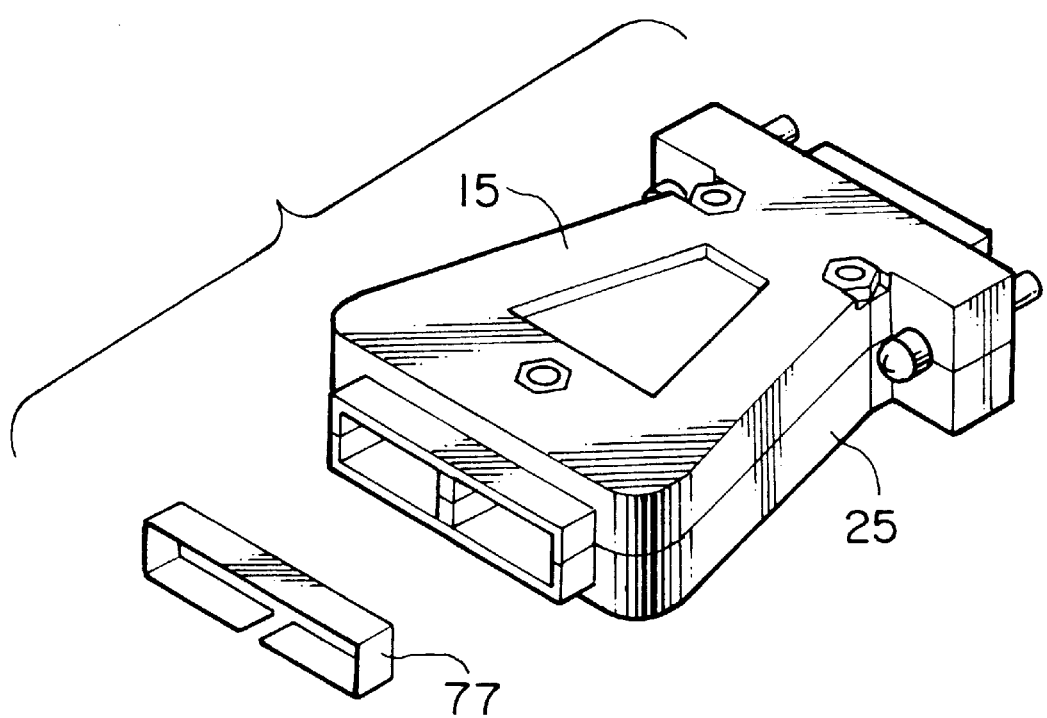
FIG. 21 is a perspective view showing a 12th embodiment of an optical fiber module of the invention.
Figure 22:
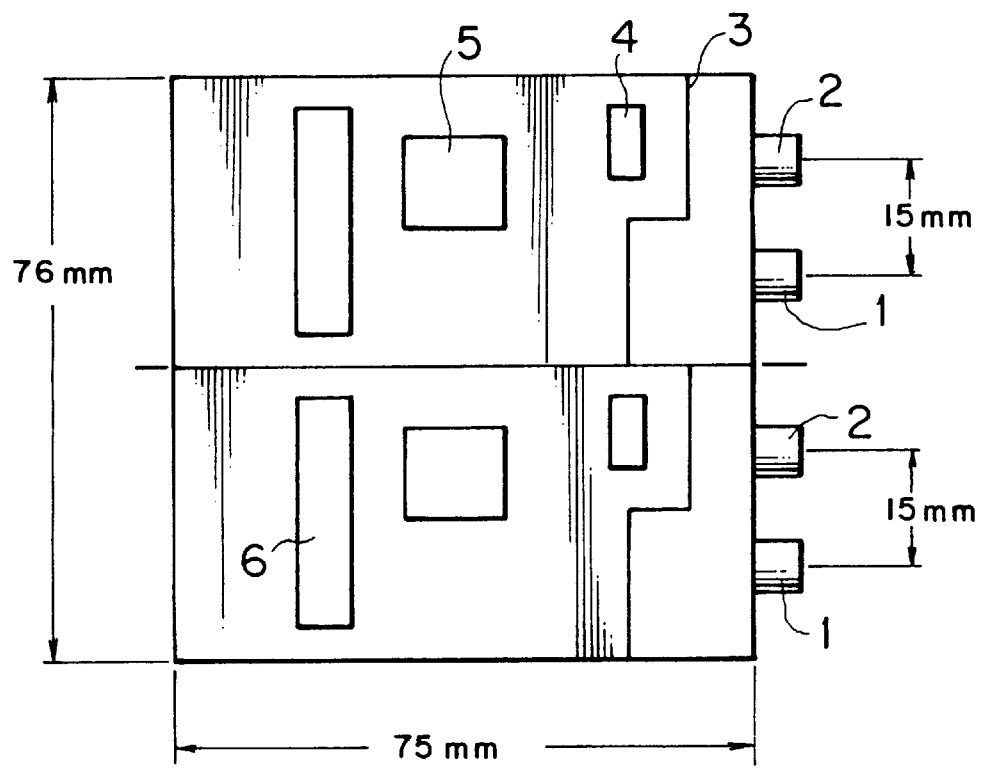
FIG. 22 is a plan view showing a conventional optical fiber module.
Figure 23:
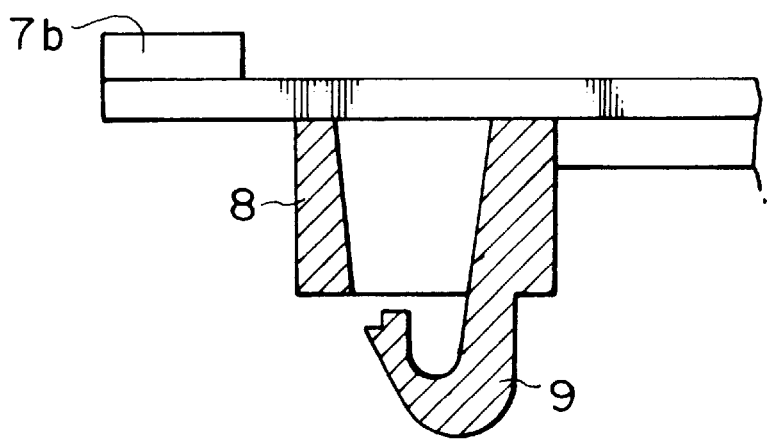
FIG. 23 is a cross-sectional view of a main portion of the conventional optical fiber module, showing a lower frame 7b.

FIG. 21 is a perspective view showing a 12th embodiment of an optical fiber module of the invention. In this embodiment, a metal band 77 for limiting the opening of the upper and lower cover frames 15 and 25 in the vicinity of the optical connector is used as a reverse insertion prevention mechanism for the optical plug (not shown).

In this embodiment, the metal band 77, comprising a metal strip having a sheet thickness of 0.3 mm, is used as the reverse insertion prevention mechanism for the optical plug, but even if a drawn part, produced by drawing a metal sheet, is used, the effects of the invention will not be lost.

The above-mentioned 1st to 12th embodiments can be applied not only to the optical fiber modules of the invention but also to conventional optical fiber modules of the type incorporated in a system.

Figure 31:
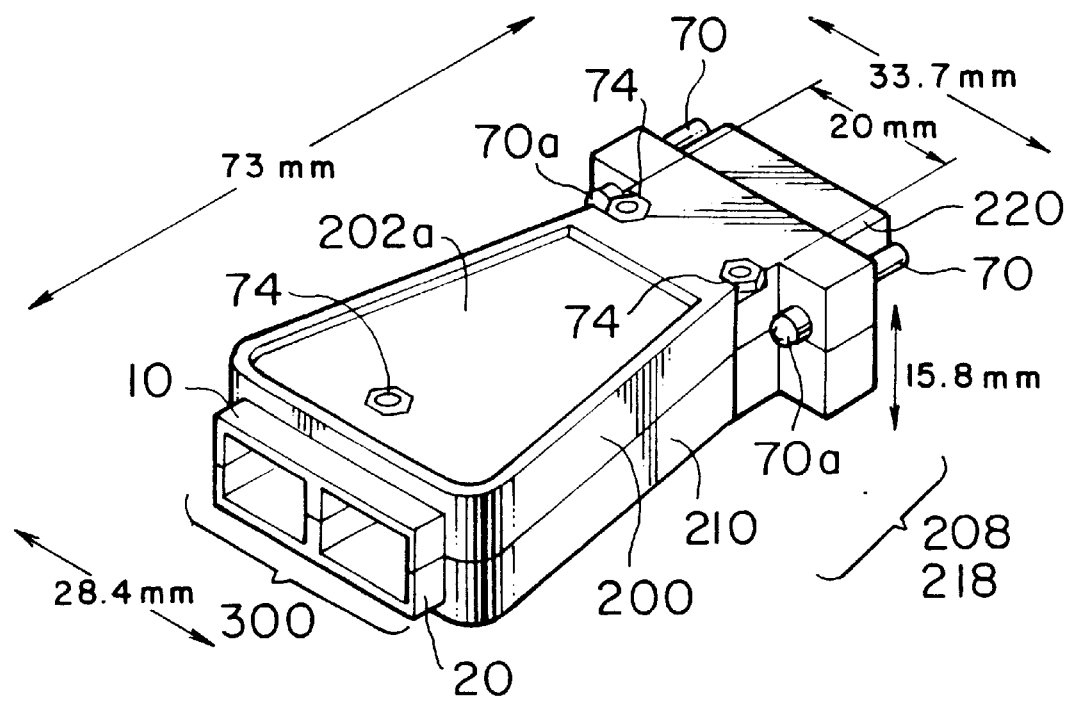
FIG. 31 is a perspective view showing a 13th embodiment of an optical fiber module of the invention.
Figure 32:
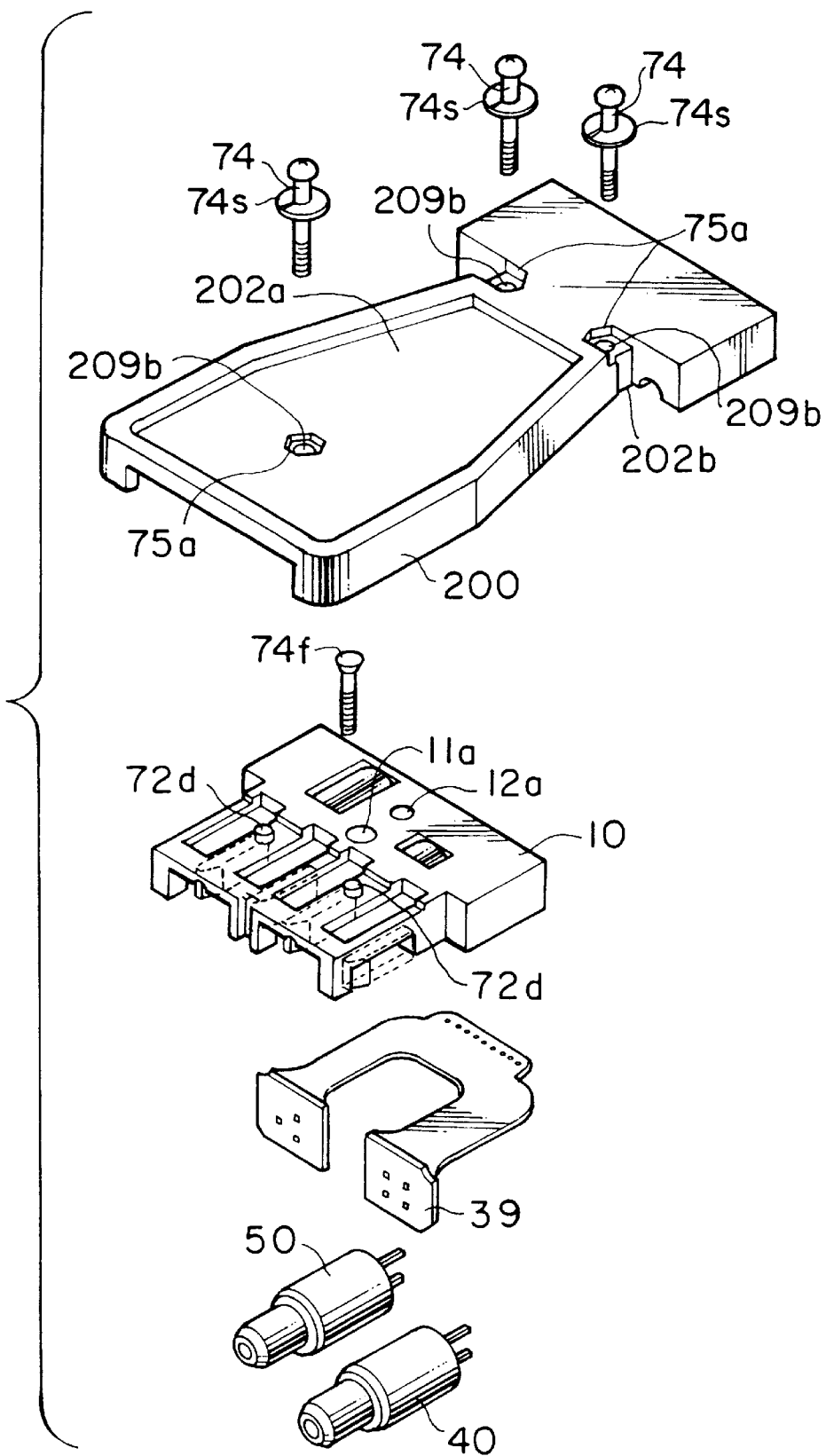
FIG. 32 is an exploded, perspective view showing the 13th embodiment of the optical fiber module of the invention.
Figure 33:
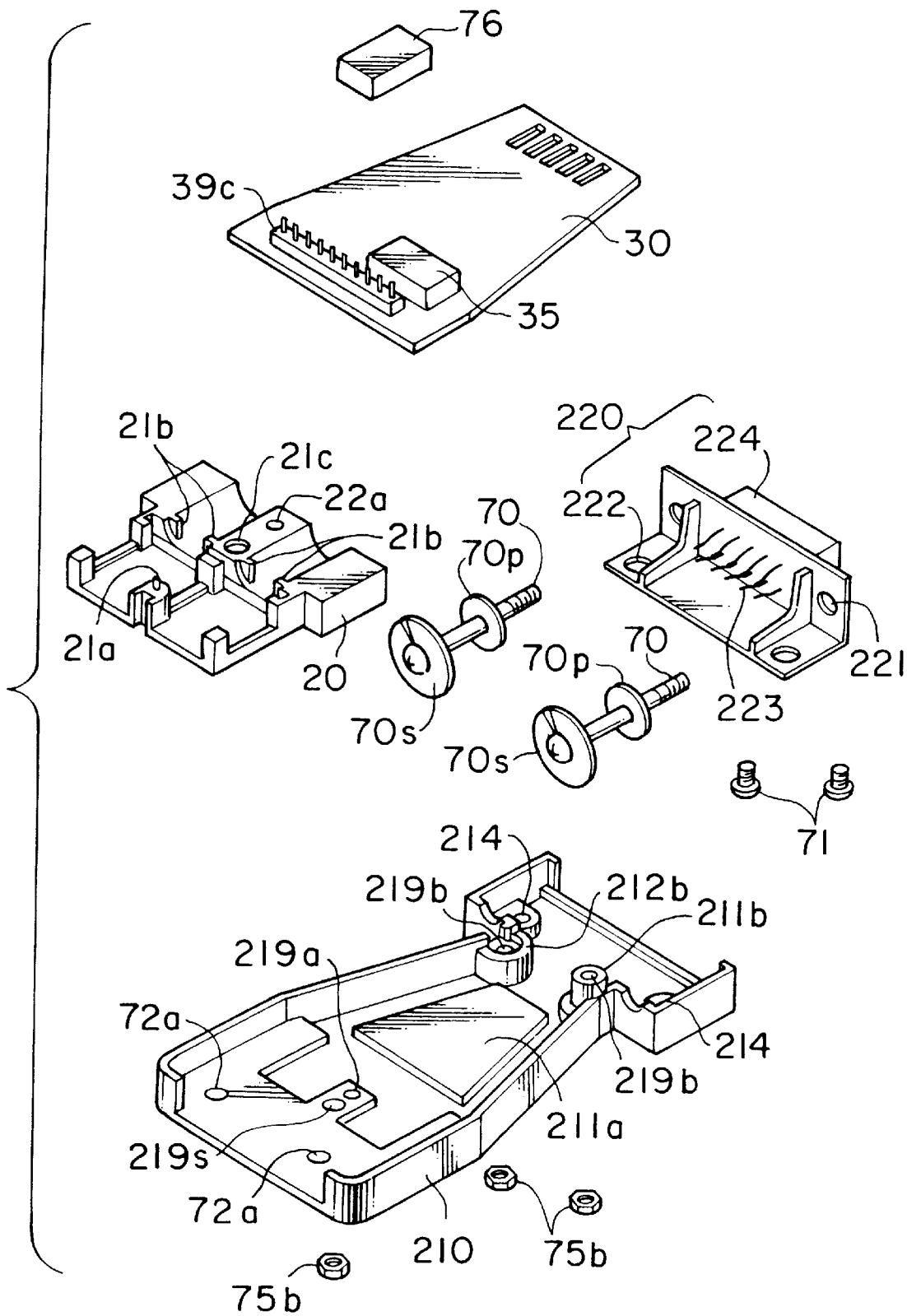
FIG. 33 is an exploded, perspective view showing the 13th embodiment of the optical fiber module of the invention.
Figure 34:
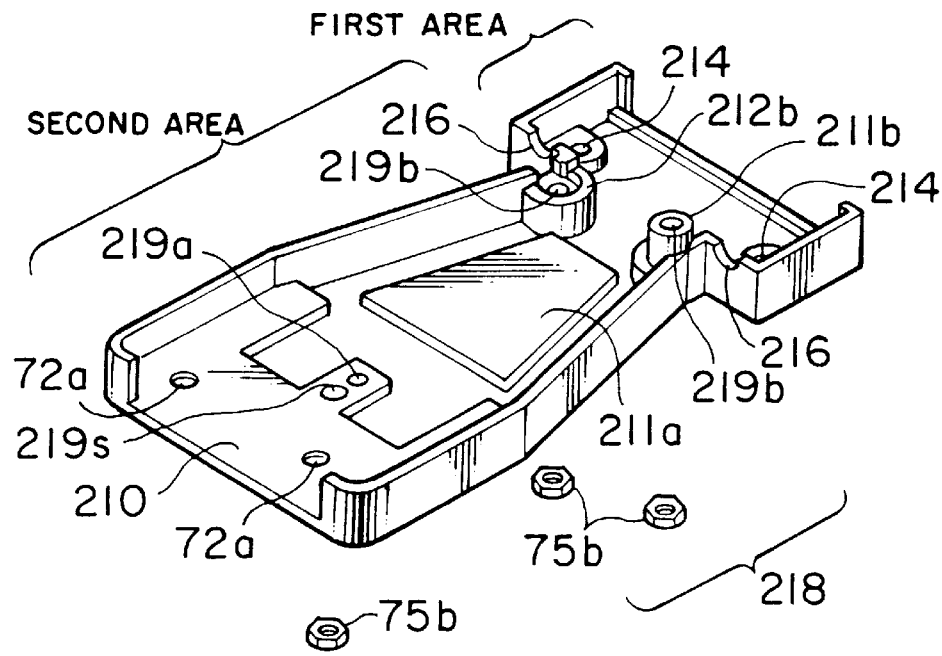
FIG. 34 is a perspective view showing a lower cover which is a constituent part of the 13th embodiment of the optical fiber module of the invention.
Figure 35:
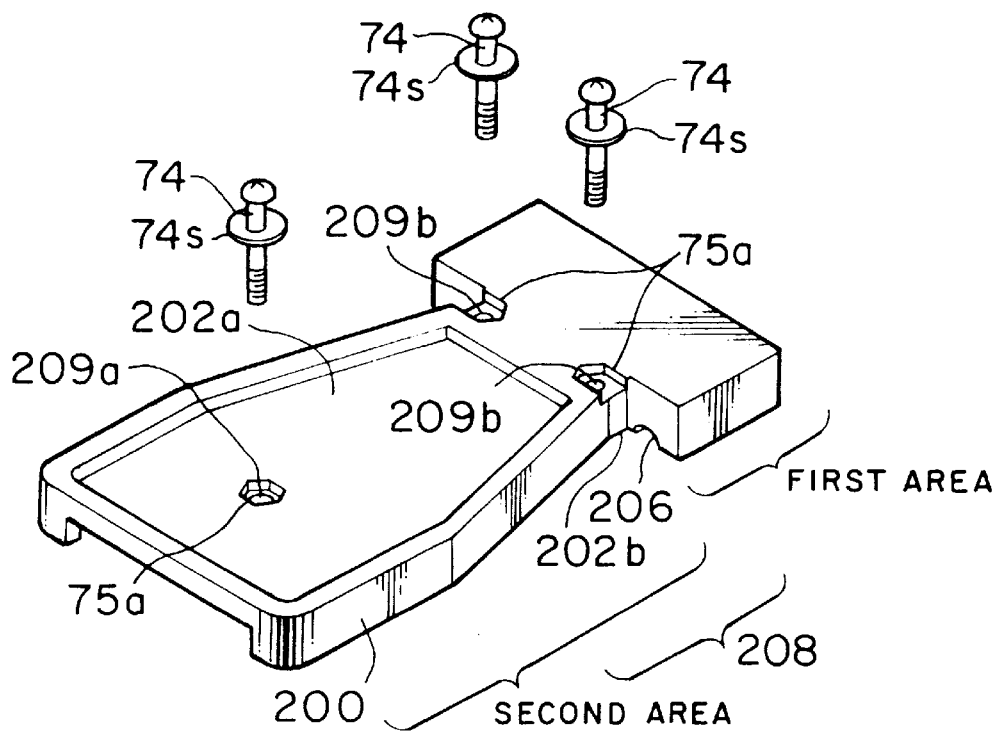
FIG. 35 is a perspective view showing an upper cover which is a constituent part of the 13th embodiment of the optical fiber module of the invention.
Figure 36:
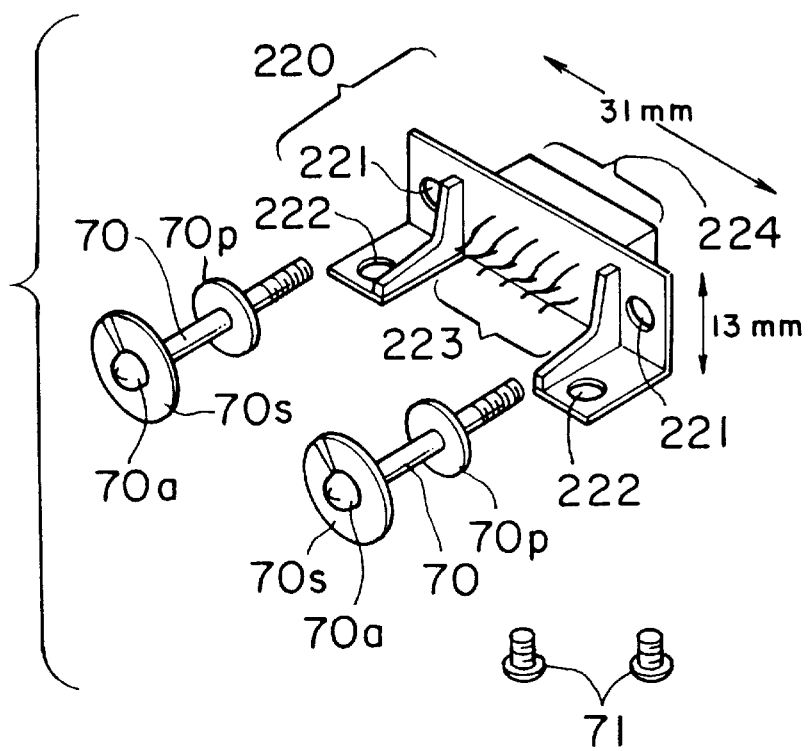
FIG. 36 is a perspective view showing an electric connector which is a constituent part of the 13th embodiment of the optical fiber module of the invention.
Figure 37:
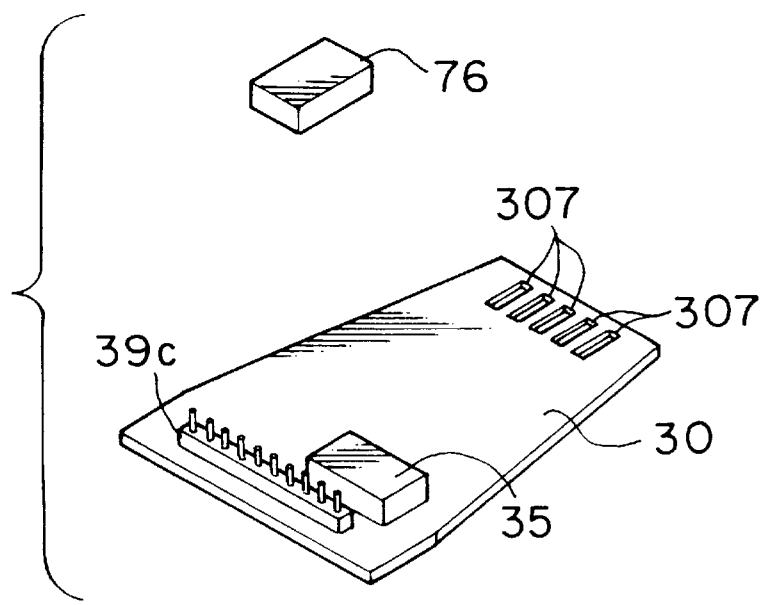
FIG. 37 is a perspective view showing a printed circuit board which is a constituent part of the 13th embodiment of the optical fiber module of the invention.
Figure 38:
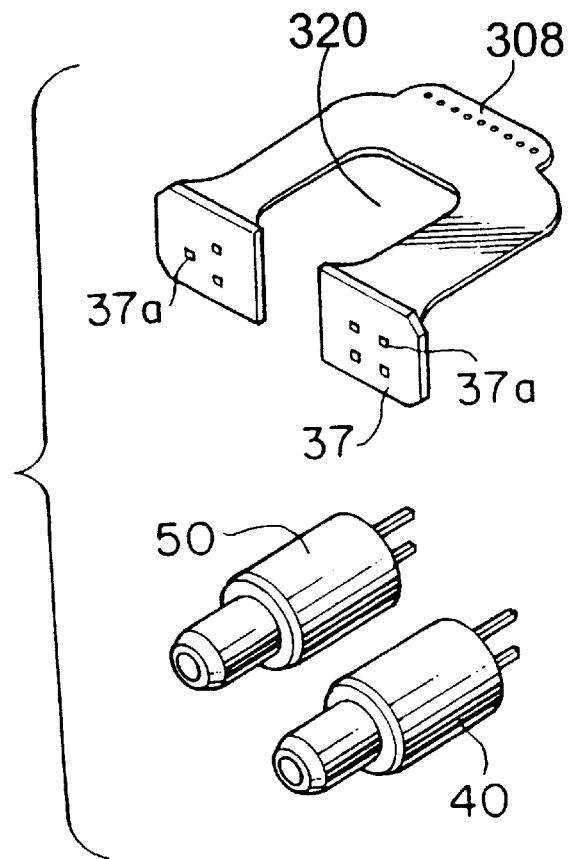
FIG. 38 is a perspective view showing an LD module and a PD module which are constituent parts of the 13th embodiment of the optical fiber module of the invention.
Figure 39:
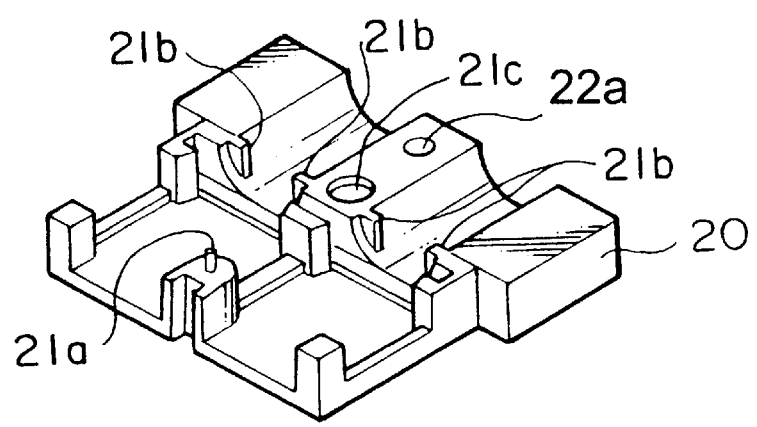
FIG. 39 is a perspective view showing a lower frame which is a constituent part of the 13th embodiment of the optical fiber module of the invention.
Figure 40:
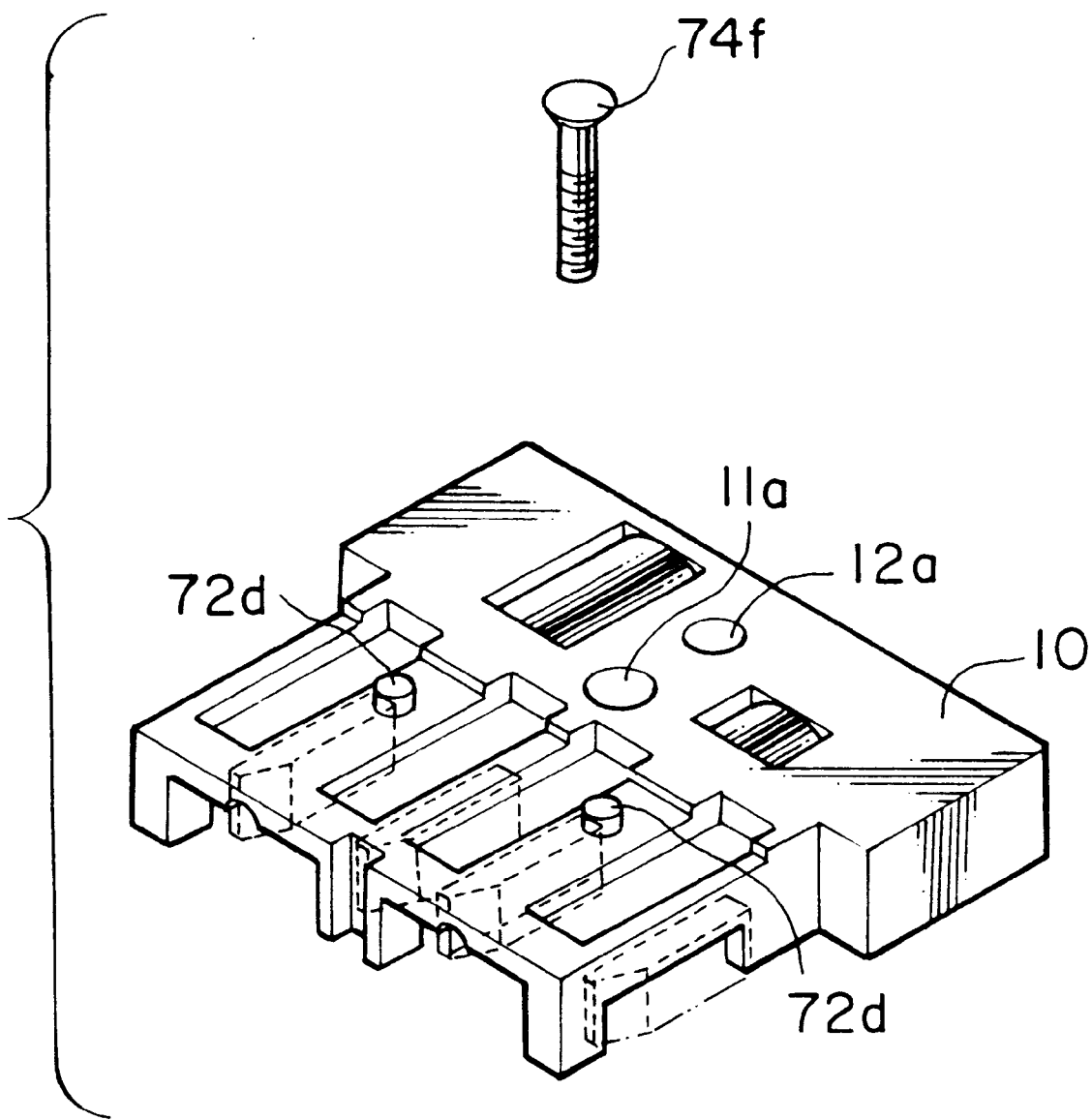
FIG. 40 is a perspective view showing an upper frame which is a constituent part of the 13th embodiment of the optical fiber module of the invention.
Figure 41:
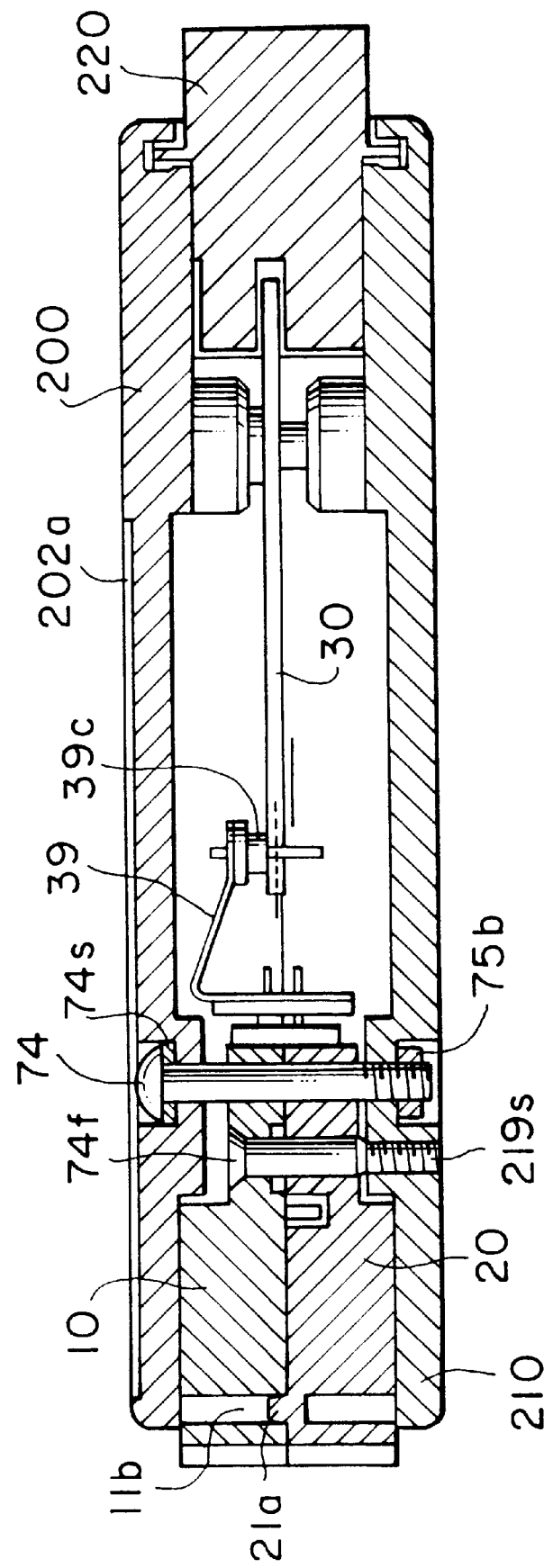
FIG. 41 is a cross-sectional view showing the 13th embodiment of the optical fiber module of the invention.
Figure 42:
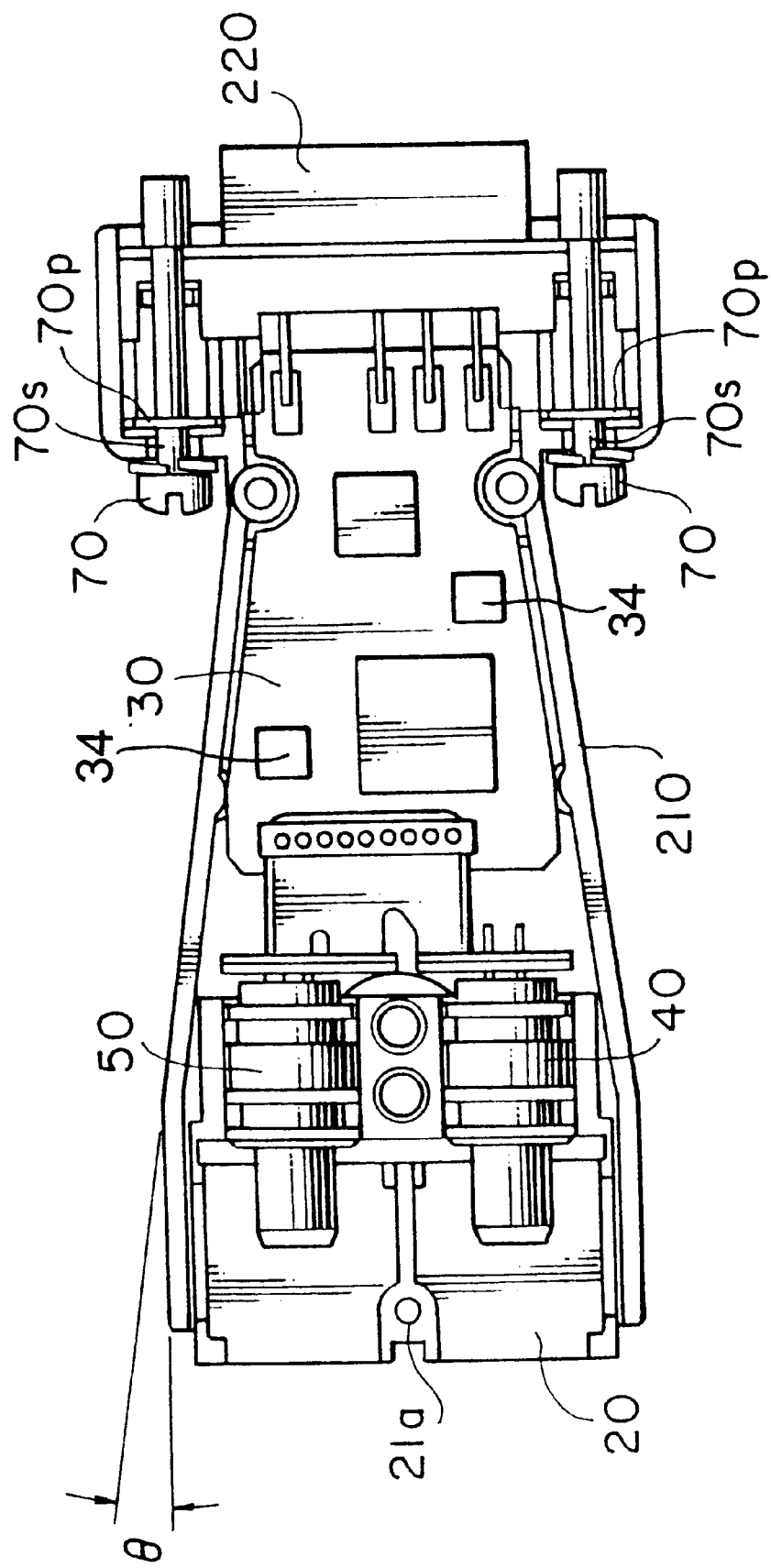
FIG. 42 is a plan view showing the 13th embodiment of the optical fiber module of the invention.
Figure 43:
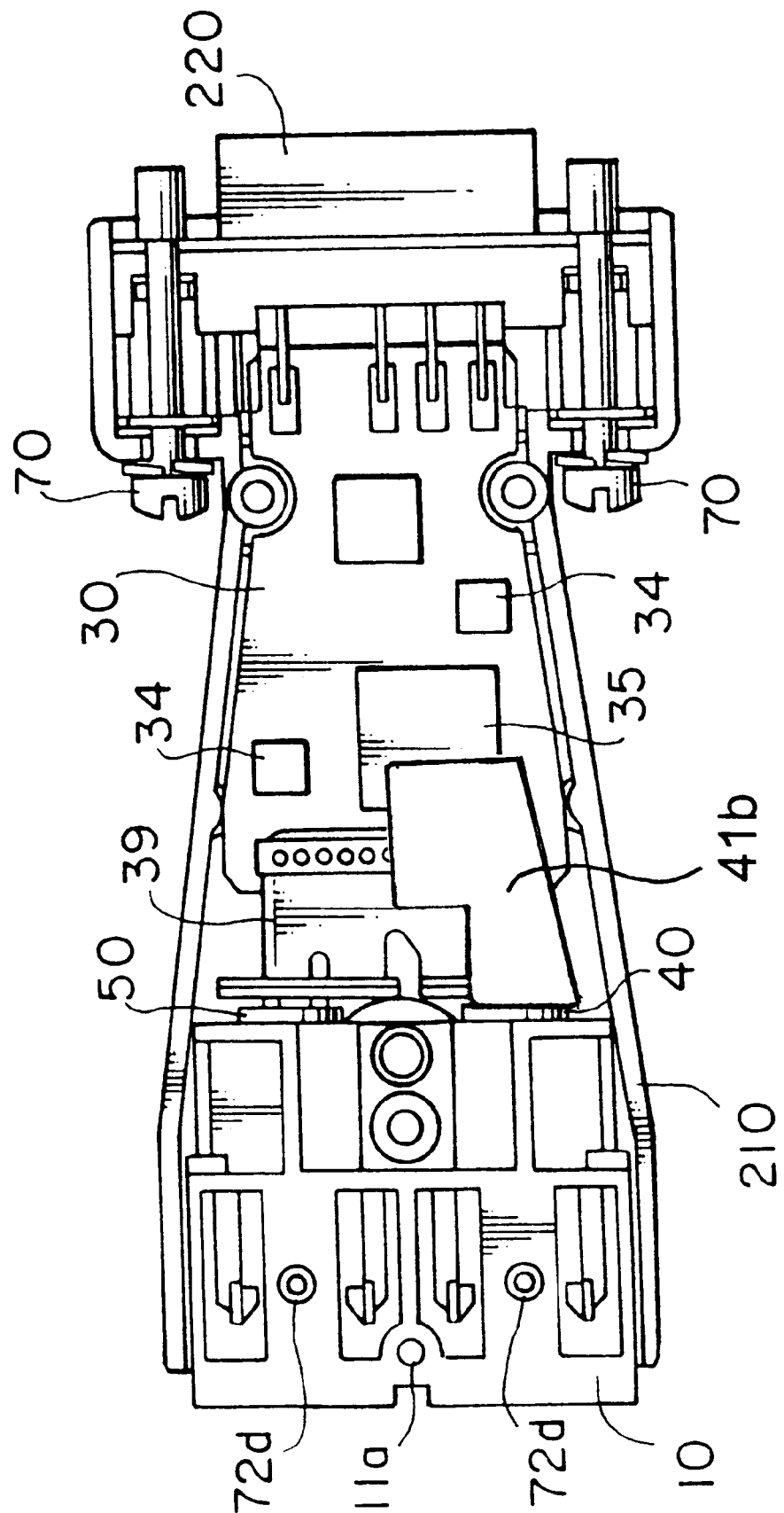
FIG. 43 is a plan view showing the 13th embodiment of the optical fiber module of the invention.

FIG. 31 is a perspective view showing a 13th embodiment of an optical fiber module of the invention, FIGS. 32 and 33 are exploded, perspective views thereof, FIG. 34 is a perspective view showing a lower cover which is a constituent part of the 13th embodiment of the optical fiber module of the invention, FIG. 35 is a perspective view showing an upper cover which is a constituent part of the 13th embodiment of the optical fiber module of the invention, FIG. 36 is a perspective view showing an electric connector which is a constituent part of the 13th embodiment of the optical fiber module of the invention, FIG. 37 is a perspective view showing a printed circuit board which is a constituent part of the 13th embodiment of the optical fiber module of the invention, FIG. 38 is a perspective view showing an LD module and a PD module which are constituent parts of the 13th embodiment of the optical fiber module of the invention, FIG. 39 is a perspective view showing a lower frame which is a constituent part of the 13th embodiment of the optical fiber module of the invention, FIG. 40 is a perspective view showing an upper frame which is a constituent part of the 13th embodiment of the optical fiber module of the invention, FIG. 41 is a cross-sectional view showing the 13th embodiment of the optical fiber module of the invention, and FIGS. 42 and 43 are plan views showing the 13th embodiment of the optical fiber module of the invention.

The major differences between this 13th embodiment and the second embodiment are a method of positioning the upper and lower frames with respect to the upper and lower covers and a method of fixing them. Therefore, the upper and lower frames and the upper and lower covers are different in construction from those of the 2nd embodiment, and although part of the description of the 2nd embodiment will be repeated, this embodiment will be described in detail.

The optical fiber module of this embodiment is connected to an electrical signal input-output connector (not shown), such as an extension slot in a host computer, and is used in this condition, and preferably, the thickness of the optical fiber module of the invention is not more than 25.4 mm since the interval between the extension slots in the host computer is 25.4 mm, and in view of the fact that these are arranged in an array-like manner when they are used, it is preferred from the viewpoint of handling that the module be as thin as possible. As shown in FIG. 36, the thickness of the electric connector 220 is about 13 mm, and the covers, retaining and fixing the electric connector 220, need to have a wall thickness of not less than about 1 mm, and in view of these, it is preferred that the thickness of the optical fiber module of the invention be about 15 mm to about 16 mm as shown in FIG. 31. From the viewpoint of a small-size design of the optical fiber module, it is also preferred that its width at the electric connector (220) side be small, and since the width of the electric connector 220 is about 31 mm as shown in FIG. 36, this width of the optical fiber module is about 34 mm in this embodiment as shown in FIG. 31, taking the thickness of the cover into consideration. If the width of the optical connector portion, constituted by the upper frame 10 and the lower frame 20, is 25.4 mm, and the width of a reinforcement portion, constituted by the upper and lower covers 200 and 210, is 1.7 mm, it is preferred that the width of the optical fiber module at the optical connector (300) side be about 28.4 mm. The length of the optical fiber module is not particularly limited since it is used outside the extension slot of the host computer, and although it is preferred that the length be large so that the area of the PCB 30 can be increased, it is preferred in view of the small-size design, the strength and easy use of the optical fiber module that the length be not more than about 80 mm. In this embodiment, in view of the foregoing, the thickness is 15.8 mm, the width at the optical connector (300) side is 28.4 mm, the width at the electric connector (220) side is 33.7 mm, and the length is 73 mm.

Here, the fact that the width at the optical connector (300) side is smaller than the width at the electric connector (220) side means that when the optical fiber module is to be attached to and detached from a computer or the like, these attaching and detaching operations can be effected quite easily. Namely, when rotating a lock screw 70 by a screw driver or the like, the efficiency of the operation is enhanced if the width at the optical connector (300) side is smaller than the width at the electric connector (220) side.

On the other hand, in the above-mentioned 2nd embodiment, the width at the optical connector (300) side is larger than the width at the electric connector (220) side, and therefore the space, enclosed by the upper and lower covers, is increased, and also the packaging area of the printed circuit board 30 is increased, and the degree of freedom of design of the optical fiber module is enhanced.

Therefore, from the viewpoint of the degree of freedom of design of the optical fiber module, it is preferred that the width at the optical connector (300) side be larger than the width at the electric connector (220) side, but it is to be noted that this embodiment does not limit the value of the width at the optical connector (300) side and the value of the width at the electric connector (220) side.

Here, it is to be noted that this embodiment does not limit the outside dimensions of the optical fiber module. Although the electric connector 220 is used in this embodiment, a connector of other configuration can, of course, be used.

Taking these into consideration, the embodiment will be described.

The upper cover, the lower cover, the upper frame, the lower frame, the PCB, a FPC, and the electric connector, which are main constituent parts of the optical fiber module of the invention, will be first described, and then an assembling method will be described.

FIG. 34 is a perspective view showing the lower cover 210, and FIG. 35 is a perspective view showing the upper cover 200. In the upper cover 200, a constricted portion 208 is provided between a first area and a second area, and in the lower cover 210, a constricted portion 218 is provided between a first area and a second area. This construction is provided so that a screw head 70a of the lock screw 70 can be rotated at the constricted portions 208 and 218, as shown in FIG. 31, and with this construction the second areas can be effectively used for the PCB 30, and the small-size design of the optical fiber module can be achieved.

In order to reduce the time required for the development of a mass-production mold and also to achieve the low-cost production, the upper cover 200 and the lower cover 210 have substantially the same shape as shown FIGS. 34 and 35, and a common mold can be used for the upper and lower covers. With respect to a material, the upper cover 200 and the lower cover 210 not only constitute the shell but also intend to achieve a shield effect against electromagnetic waves produced from the PCB 30 and so on, and an aluminum alloy, which is an electrically-conductive material having an excellent strength, is used, but copper, zinc or an alloy thereof may be used.

As shown in FIG. 34, connector-fixing openings 214 for fixing the electric connector 220 and lock screw recesses 216 are formed in the first area of the lower cover 210, and frame-positioning openings 72a for positioning the lower frame 20, a frame-fixing opening 219s for holding the lower frame 20 and the upper frame 10 together, a cover-fastening opening 219a, cover-fastening openings 219b, a projection 211b, a recess 212b, and a hexagonal hole (not particularly shown, but has the same shape as a hexagonal hole 75a in FIG. 32) are provided at the second area of the lower cover 210.

As shown in FIG. 35, a cover-fastening opening 209a, cover-fastening openings 209b, a projection 201b (not particularly shown, but has the same shape as the projection 211b in FIG. 33), a recess 202b, upper frame-positioning openings 72a (not shown), a hexagonal hole 75a, and lock screw recesses 206 are provided at the second area of the upper cover 200.

A counterbore (not shown) is formed at the outer side of each of the connector-fixing openings 214, and the electric connector 220 can be fixed by electric connector-fixing screws 71. The lock screw recesses 206 and the lock screw recesses 216 are provided so that each lock screw 70 can be rotated at the constricted portion 208 and the constricted portion 218 (see FIG. 31), and when the upper cover 200 and the lower cover 210 are combined together, these screw recesses form through holes for the lock screws. The frame-positioning openings 72a are fitted respectively on frame-positioning projections 72d (not shown), formed on the lower frame 20, to position the lower frame 20. The frame-positioning openings 72a are fitted respectively on frame-positioning projections 72d, formed on the upper frame 10 as shown in FIG. 40, to position the upper frame 10. The frame-fixing opening 219s is provided for retaining the lower frame 20 and the upper frame 10 on the lower cover 210, and in this embodiment these are retained by an upper and lower frame-fixing screw 74f as shown in FIG. 32, and this opening 219s is a tapping screw hole. The projection 211b and the recess 212b are adapted to be fitted relative to the recess 202b and the projection 201b, respectively, and are used for positioning purposes during the assembling. The cover-fastening opening 219a is aligned with the cover-fastening opening 209a, and the cover-fastening openings 219b are aligned with the cover-fastening openings 209b, respectively, and these openings are used for fixing the upper cover 200 and the lower cover 210 together through cover screws 74 and hexagon nuts 75b. The cover screws 74 and the hexagon nuts 75b are made of an electrically-conductive material such as stainless steel and soft steel. As a result, where the upper cover 200 and the lower cover 210 are utilized as electromagnetic and electrostatic shields, an electrical connection between the two can be easily and positively effected. The hexagonal hole 75a is provided at the outer side of each of the cover-fastening openings 209a, 209b, 219a and 219b, thereby achieving the effect of preventing the idling of the hexagon nuts 75b during the assembling. As shown in FIG. 34, in this embodiment, the projection 211b and the recess 212 have a circular shape, and are disposed coaxially with the cover-fastening openings 219a and 219b, respectively, and similarly the recess 202b and the projection 201b have a circular shape, and are disposed coaxially with the cover-fastening openings 209a and 209b, respectively, and therefore the internal space of the optical fiber module of the invention can be effectively used. The frame-fixing opening 219s, the cover-fixing opening 219a and the cover-fixing opening 209a are arranged between the LD module 50 and the PD module 40, and therefore the space in the upper cover 200 and the lower cover 210 can be effectively used, so that the small-size design of the optical fiber module of the invention is achieved. Namely, by arranging the positioning mechanisms and the fixing mechanisms for the upper and lower covers at the same positions, the printed circuit board, having the sufficient packaging area, and the optical fiber module, having an excellent strength, are achieved although it has the small size.

In this embodiment, although the circular projection 211b and the circular recess 212b are used for positioning the upper and lower covers, the invention is not limited to this shape, and any shape can be used in so far as they have a similar function.

With respect to the dimension of the constricted portions 208 and 218, the value of the minimum width is about 20 mm, and a tapering portion, having an angle of about 7 degrees, is formed over the constricted portion 208, 218 and part of the second area of each of the upper and lower covers disposed adjacent thereto. If the width of the first area is 1, the width ratio of the constricted portion 208, 218 to the first area is about 0.3 to about 0.7 which is a preferred design value.

Next, the reason why the value of the minimum width of the constricted portion 208, 218 is about 20 mm will be described.

Essentially, it is preferred to increase the width of the constricted portions 208 and 218 in order to secure the wide packaging area of the PCB 30 and also in view of the strength of the constricted portions 208 and 218 of the upper cover 200 and the lower cover 210. However, as shown in FIG. 31, the lock screws 70, when used, pass through the first area of the upper cover 200 or the lower cover 210. Therefore, the width of more than 24.99 mm, which is the pitch of the lock screws 70, can not be secured. Moreover, as shown in FIG. 36, the lock screws 70 are inserted respectively into lock screw openings 221 from that side where a contact portion 223 is provided, and are rotated to be fitted respectively into tapping screws (not shown) of the mating connector. Therefore, the lock screw 70 needs to be rotated, and the screw head 70a needs to be disposed at that portion where the constricted portions 208 and 218 are provided. In many cases, M2.6, M3 or #4-40UNC is used as the lock screw 70, and the diameter of the screw head 70a is about 4.5 mm in the case of an ordinary screw, and the diameter is about 6 mm in the case of a special screw with anti-slip means which is rotated directly with the fingers, and the diameter is about 3 mm in the case of a special screw rotated by a tool such as a screw driver. Therefore, the maximum width, which the constricted portion 208 and the constricted portion 218 can have, is about 22 mm.

Furthermore, the constricted portions 208 and 218 are disposed between the electric connector 220 at the first areas and the optical connector portion 300 which is constituted by the second areas of the upper and lower covers 10 and 20, the LD module 50 and the PD module 40, and therefore the minimum value of the width of the constricted portions 208 and 218 is determined by the number of signal lines (not shown) of the PCB 30 which can pass, and by the width of the signal lines First, in this embodiment, the electric connector 220 is of the surface mounting-type, and 9 signal lines are used, and therefore about a half (4 to 5) of the signal lines need to pass, and if the width of one signal line is 1.27 mm, then the minimum value of the width of the constricted portions 208 and 218 is about 10 mm.

Therefore, in the optical fiber module of the invention, the range of the width, which the constricted portions 208 and 218 can have, is from about 10 mm to about 22 mm.

The width of the first area of the cover can not be made smaller than 24.99 mm which is the pitch of the lock screws 70. Further, the diameter of a screw portion of the lock screw 70 is about 3 mm, and therefore the width of at least about 28 mm is necessary. The width of the ordinary electric connector 220 is about 32 mm, and if the thickness of the cover, covering the electric connector 220, is about 1 mm, the preferred maximum value is about 34 mm.

Therefore, in the optical fiber module of the invention, the width, which the first areas of the upper cover 200 and the lower cover 210 can have, is in the range of between about 28 mm and about 33 mm.

From the foregoing, if the width of the first area is 1, the width ratio of the constricted portion 208, 218 to the first area is about 0.3 to about 0.7 which is a preferred design value.

In this embodiment, in order to reduce the manufacturing cost, most inexpensive, ordinary screws are used as the lock screws. Therefore, the width of the constricted portion 208 and the constricted portion 218 is 19.6 mm, and since an ordinary connector is used as the electric connector, the width of the first area is 33.7 mm.

The angle $\theta$ of the tapering portion is determined by the easy handling of the screw driver, serving as means for rotating the lock screw 70, and the packaging area of the PCB 30.

As shown in FIG. 42, the PCB 30 is arranged at the second areas of the covers. Therefore, in order to increase the area of the PCB 30, it is preferred that the size of the second areas of the upper cover 200 and the lower cover 210 be large. The size of the second areas can be increased by increasing the overall length of the covers or by increasing the width of the second areas. From the viewpoint of use, it is preferred that the overall length of the optical fiber module of the invention be as short as possible, and therefore it is preferred to increase the width of the second areas. However, for rotating and fastening the lock screw 70, a tool, such as a screw driver, needs to be disposed outside the second areas so as to rotate the lock screw 70. With respect to the axis of rotation of the lock screw 70 and the axis of rotation of the tool such as a screw driver, if misalignment between the two axes of rotation is not more than about 20 degrees, the rotation and fastening can be effected. Therefore, it is preferred that the opposite sides of the second area be tapering and that the angle $\theta$ of the tapering portion be not more than 20 degrees.

Let's assume that the area of the PCB 30 is 1 if the angle $\theta$ of the tapering portion is 0 degree, using that side of the constricted portion, disposed adjacent to the electric connector 220, as a reference, and in this case if the angle $\theta$ of the tapering portion is set to 10 degrees, the area of the PCB 30 is increased about 5%. Similarly, let's assume that the area of the PCB 30 is 1 if the angle $\theta$ of the tapering portion is 0 degree, using that side of the constricted portion, disposed adjacent to the electric connector 220, as a reference, and in this case if the angle $\theta$ of the tapering portion is set to 5 degrees, the area of the PCB 30 is increased about 10%. Therefore, in view of the packaging area of the PCB 30, it is preferred that the angle $\theta$ of the tapering portion be not less than 10 degrees, but in view of the attachability of the optical fiber module, it is more preferred that the angle $\theta$ of the tapering portion be about 5 degrees.

In the 2nd embodiment, the angle θ of the tapering portion is about 15 degrees, so that the optical fiber module, having a high degree of freedom of design, is achieved. In this embodiment, the angle θ of the tapering portion is about 7 degrees, so that the optical fiber module, which can be more easily attached to a computer or the like, is achieved.

An inwardly-directed convex portion 201a (not shown) is formed on the second area of the upper cover 200, and an inwardly-directed convex portion 211a is formed on the second area of the lower cover 210 (see FIG. 34). In this embodiment, in order to prevent deformation of the upper cover 200 and the lower cover 210 due to thermal shrinkage during the molding of these covers, these covers have a uniform wall thickness. Therefore, a concave portion 202a is formed at the outer side of the convex portion 201a of the upper cover 200 as shown in FIG. 35, and similarly a concave portion (not shown) is formed at the outer side of the lower cover 210 corresponding to the convex portion 211a.

However, it is to be noted that if the thermal deformation does not cause any particular problem, the wall thickness of the covers does not always need to be uniform.

With this construction, the upper cover 200 and the lower cover 210 can be reinforced. As shown in FIG. 33, the convex portions 201a and 211a are so disposed that the spacing of the semiconductor ICs (including an amplifier 35 and an LD driver 33 (not shown)) on the PCB 30 from the convex portion is narrowed, and therefore by inserting a thermally-conductive material 76, such as silicone resin, between the semiconductor ICs (including the amplifier 35 and the LD driver 33) and the convex portion 201a or the convex portion 211a to contact the convex portion 201a or the convex portion 211a with the semiconductor ICs (including the amplifier 35 and the LD driver 33), heat, generated from the semiconductor ICs (including the amplifier 35 and the LD driver 33), can be transferred to the upper cover 200 or the lower cover 210, and thus the upper cover 200 and the lower cover 210 can be used as a radiator, so that the operation of the PCB 30 can be stabilized.

In this embodiment, although the thermally-conductive material 76 is a silicone resin, it is to be noted that the effects of the invention will not be affected at all even if other material, such as copper, aluminum, zinc or an alloy thereof, is used. The upper cover 200 or the lower cover 210 can be held in direct contact with the semiconductor ICs so as to achieve a radiating effect.

Of course, if the amount of heat, generated from the semiconductor ICs (including the amplifier 35 and the LD driver 33) is small, there is no need to add the thermally-conductive material 76.

When inserting and withdrawing the optical fiber module of the invention, the fingers can be engaged in the concave portion 202a (see FIG. 35) in the upper cover 200 and the concave portion 212a (not shown) in the lower cover 210, so that the optical fiber module can be quite easily handled. It will be readily appreciated that by locating the center of gravity of the optical fiber module of the invention in the vicinity of the second areas and particularly in the vicinity of the concave portion 202a or 212a, the handling performance can be further enhanced. Also, the concave portions 202a and 212a in the covers are suitably used as those portions for indicating the name of the product, and the indicating method may be any of the affixing of a seal, an integral molding when molding the upper cover 200 and the lower cover 210, and the marking after the molding of the upper cover 200 and the lower cover 210.

In the final form, the upper cover 200 and the lower cover 210 are connected together in opposed relation to each other, and it may be proposed to use adhesive bonding or the like as connecting means, but in view of the productivity and the fact that the upper cover 200 and the lower cover 210 are used also as the shield, the fastening is effected by the cover screws 74 (see FIG. 35) as described above. Preferably, the fastening is effected at the end portions of the upper cover 200 and the lower cover 210, but since the fastening means such as cover-fastening openings must be provided at the first areas of the upper cover 200 and the lower cover 210, and must provided clear of the electric connector 220, the width of the first areas must be increased, so that the small-size design can not be achieved. Therefore, the fastening means is provided at the second areas of the upper cover 200 and the lower cover 210 as shown in FIG. 35. Further, in order to achieve the stability, the productivity and the increased area of the PCB 30, the fastening is effected at three portions, and one of them is provided between the LD module 50 and the PD module 40, and the other two are provided in the vicinity of the connector. The three fastening portions are so arranged as to form an isosceles triangle, and stresses, produced when attaching and detaching the optical plug (not shown), are dispersed ideally, thereby achieving the optical fiber module of high reliability.

FIG. 39 is a perspective view showing the lower frame 20, and FIG. 40 is a perspective view showing the upper frame 10.

As shown in FIG. 40, a frame-fixing opening 11a, a cover screw opening 12a, an upper and lower frame-positioning opening (not shown), frame-positioning projections 72d and pawls (not shown) for fitting engagement with the optical plug (not shown) are provided at the upper frame 10.

As shown in FIG. 39, a frame-fixing opening 21c, a cover screw opening 22a, an upper and lower frame-positioning projection 21a, frame-positioning projections 72d (not shown) and module slits 21b are provided at the lower frame 20.

The frame-fixing opening 11a and the frame-fixing opening 21c are disposed coaxially with the frame-fixing opening 219s in the lower cover 210, and are used to fix the upper frame 10 and the lower frame 20 to the lower cover 210 by the upper and lower frame-fixing screw 74f inserted from the outer side of the upper frame 10. The cover screw opening 12a and the cover screw opening 22a are disposed coaxially with the cover-fixing opening 219a and the cover-fixing opening 209a, and the cover screw 74 is adapted to extend therethrough. The upper and lower frame-positioning opening (not shown) in the upper frame 10 and the upper and lower frame-positioning projection 21a in the lower frame 20 are arranged to be fitted together, and are used not only to position the upper and lower frames but also to prevent displacement of the upper and lower frames after the assembling. The upper and lower frame-positioning projection 21a is provided at a central portion of a front end portion of the lower frame 20, and the upper and lower frame-positioning opening (not shown) is provided in a central portion of a front end portion of the upper frame 10, and with this arrangement, the effect of preventing the displacement of the upper and lower frames can be obtained. A similar effect can be obtained even if the projection and the opening of the upper and lower frames are exchanged with each other.

The frame-positioning projections 72d are arranged to be fitted respectively in the upper frame-positioning openings 72a and the lower frame-positioning openings 72a, and are used to effect the positioning.

With respect to a material, for effecting the insertion and withdrawal relative to the optical plug, resin-molded products, for example, of polycarbonate (PC) or polybutylene terephthalate (PBT) are suitable for the upper frame 10 and the lower frame 20, respectively.

In the optical fiber module of the invention, the upper frame 10 and the lower frame 20 except those portions thereof in the range of not more than about 2 mm from their front ends are covered with the upper cover 200 and the lower cover 210, as shown in FIG. 31. With this arrangement, when reversely inserting the optical plug (not shown) into the optical connector portion 300, the upper cover 200 and the lower cover 210 hold the upper frame 10 and the lower frame 20 therebetween so that the upper frame 10 and the lower frame will not be opened in an upward-downward direction, thus disenabling the insertion. Therefore, the reverse insertion of the optical plug into the optical connector portion 300 is impossible, and the safer optical fiber module can be achieved.

Even if the upper frame is molded integrally with the upper cover when the frames are made of a resin (PBT-PC), and the covers are made of aluminum (or an aluminum alloy) as described above, the effects of the invention will not be lost.

FIG. 37 is a perspective view showing the PCB, and in order that a maximum packaging area can be obtained within the upper cover 200 and the lower cover 210, the PCB 30 has such a configuration that its peripheral edge extends along the inner peripheral surface of the upper cover 200 and the lower cover 210. An FPC connector 39c used for connection to an FPC 39, the LD driver 33 (comprising a semiconductor IC) for driving the LD module 50, a variable resistor 34 for adjusting driving current of the LD module 50 and so on, a variable resistor 34 for adjusting a detection level of a receiving signal from the PD module 40, the amplifier 35 and so on are mounted on the PCB 30, and the electric connector 220 (not shown) of the surface mounting-type is mounted on a land 307.

As shown in FIG. 42, by mounting the variable resistors 34 on an upper surface of the PCB 30, an adjusting process during the assembling of the optical fiber module can be made easy. Details of the adjusting process will be described later with reference to FIG. 43. This is due to the process of incorporating the PCB 30, and more specifically the electric connector 220 is beforehand mounted on the land 307 of the PCB 30, using an assembling adjustment jig, and in this condition the PCB 30 is incorporated into the lower cover 210, and is fixed by electric connector-fixing screws 71. Therefore, if the variable resistors 34 are mounted on the lower surface of the PCB 30, it is necessary to again remove the lower cover 210 when effecting the adjustment, and this leads to a poor operability. When the variable resistors 34 are mounted on the upper surface of the PCB 30, the adjustment can be effected in this condition, and the efficiency of the adjusting operation by the operator becomes high. Therefore, the enhanced efficiency of this adjusting operation achieves the low-cost optical fiber module.

The FPC 39 is provided for transmitting and receiving electrical signals of the LD module 50 and the PD module 40 relative to the PCB 30. As shown in FIG. 38, the FPC 39 has through holes 37a equal in number to leads of the LD module 50 and the PD module 40, through holes 308 for achieving the connection to the FPC connector 39c on the PCB 30, a chip resistor (not shown), a chip capacitor (not shown), and so on. The FPC 39 is a board comprising not less than two layers, and the receiving signal of the PD module 40 and the transmitting signal of the LD module are protected by a strong grounding layer. The FPC 39 has a slit 320 formed between the LD module 50 and the PD module 40, and even if the overall length of the LD module 50 is different from the overall length of the PD module 40, good characteristics can be obtained. Here, if great importance is attached to an assembling efficiency, the overall length of the LD module 50 is much varied plus or minus 1.5 mm. The reason is that a ferrule holder is positioned after a lens and an LD device are coarsely positioned. Therefore, to allow variations in the overall length of the LD module 50 leads to a reduced assembling time for the LD module 50 and an increased non-defective rate. An output of a PD device of the PD module 40 is small, and therefore the shorter an output path of the PD module, the better. Therefore, by providing the slit 320 in the FPC 39, not only variations in the overall length of the LD module 50 can be absorbed but also a transmission environment for the PD module 40 can be enhanced. By thus connecting the LD module 50 and the PD module 40 to the PCB 30 by the use of the FPC 39, the low-cost, high-reliability optical fiber module can be obtained. In this embodiment, the FPC 39 is connected to the PCB 30 through the FPC connector 39c, but even if a land or the like is provided on the PCB 30, and the FPC 39 is connected to the PCB 30 through this land, the effects of the invention will not be lost. In this embodiment, the slit is formed in the single FPC, but even if separate FPCs are used respectively for the LD module 50 and the PD module 40, the effects of the invention will not be lost.

Since the output of the PD device is small, electromagnetic shielding and electrostatic shielding of the transmission path up to the amplifier 35 is effected by a shield plate 41b (see FIG. 43).

FIG. 36 is a perspective view of the electric connector which is the constituent part of the 13th embodiment. The electric connector 220 is provided for connection to electric signal output terminals of a host computer or the like, and includes an electric connector portion 224 for connection to the mating connector, the contact portion 223 for connection to the PCB 30, connector-fixing openings 222 for fixing the electric connector 220 to the lower cover 210, and the lock screw openings 221 for the lock screws 70 used for locking connection to the mating connector. The lock screws 70 are used for fixing the electric connector to the mating connector (not shown) of the system. As shown in FIG. 36, a washer (polyslider) 70p for preventing the lock screw 70 from being disengaged from the optical fiber module, as well as a spring washer 70s for preventing the loosening of the lock screw 70 relative to a tapping screw in the mating connector, is mounted on the lock screw 70.

Here, the spring washer 70s not only prevents the loosening of the lock screw relative to the tapping screw in the mating connector, but also achieves the effect of obtaining positive grounding between the mating connector and the upper and lower covers. Particularly, many connectors, such as the electric connector 220, seldom have such a design that the grounding to the cover is taken into consideration, and the effect, achieved by the use of the spring washer 70s, is great.

Incidentally, the spring washers 70s may be used in the 2nd embodiment shown in FIG. 6, the 5th embodiment shown in FIG. 14, the 6th embodiment shown in FIG. 15, the 9th embodiment shown in FIG. 18, the 10th embodiment shown in FIG. 19, the 11th embodiment shown in FIG. 20 and a 15th embodiment (described later) shown in FIG. 45.

In the optical fiber module of the invention, the electric connector 220 is disposed at the first area of the lower cover 210, and is fastened to the connector-fixing openings 214 in the lower cover 210 by the electric connector-fixing screws 71 passing respectively through the connector-fixing openings 222. As a result, the load, acting on the electric connector 224, is dispersed to the lower cover 210, and hence is reduced, so that the high reliability with respect to the strength can be obtained. Adhesive bonding may be used as means for fixing the electric connector 220.

There exist many configurations for the electric connector 220, and in the optical fiber module of the invention, the surface mounting-type is used. By using the electric connector 220 of the surface mounting-type, the LD module 50, the PD module 40, the PCB 30 and the electric connector 220 can be disposed at the center position of the optical fiber module, so that the optical fiber module, having the excellent strength against more various external forces, can be achieved, and besides the upper cover 200 and the lower cover 210 can be formed into the same configuration, so that the inexpensive optical fiber module can be achieved, and further the thickness can be reduced, thereby achieving the small-size design of the optical fiber module.

Next, a method of assembling the optical fiber module of the invention will be described with reference to FIGS. 32 and 33. In the optical fiber module of the invention, the lower cover 210 is arranged on the hexagon nuts 75b, and the positioning projections (not particularly shown, but having the same configuration as that of the projections 72d on the upper frame 10 in FIG. 32) on the lower frame 20 are fitted respectively into the positioning openings 72a in the lower cover 210, thereby positioning the lower frame 20 with respect to the lower cover 210.

In order to increase the strength of fixing of the lower frame 10 to the lower cover 210, the lower frame 10 may be molded integrally with the lower cover 210.

The FPC connector 39c, the amplifier 35 and so on are beforehand mounted on the PCB 30, and the electric connector 220 is also mounted on the PCB 30. The PCB 30, having these parts mounted thereon, is fixed to the lower cover 210 by the electric connector-fixing screws 71. Namely, the electric connector-fixing screws 71 pass respectively through the connector-fixing openings 214 in the lower cover 210, and fix the electric connector 220 to the lower cover 210 at tapping portions provided respectively at the connector-fixing openings 222 in the electric connector 220.

The LD module 50 and the PD module 40, to which the FPC 39 is soldered, are positioned and fixed by the module slits 21b in the lower frame 20. The other end of the FPC 39 is soldered to the FPC connector 39c of the PCB 30.

The upper frame 10 is fixed by the upper and lower frame-fixing screws 74f. The positioning of the upper frame 10 and the lower frame 20 with respect to each other is effected by the module slits 21b in the lower frame 20 and the module slits (not particularly shown, but having the same configuration as that of the module slits 21b) in the upper frame 10 through the upper and lower frame-positioning projections 21a of the lower frame 20, a upper and lower frame-positioning opening 11b (see FIG. 41) in the upper frame 10, the LD module 50 and the PD module 40.

The condition so far obtained is shown in a plan view of FIG. 43. FIG. 43 is a plan view showing the 13th embodiment of the optical fiber module of the invention. In this condition, the process of adjusting the light-emitting power of the LD module 50 is started, and details thereof will be described later.

The upper cover 200 is fastened to the hexagon nuts 75b, using the cover-fixing screws 74 each having the spring washer 74s. The positioning of the upper and lower covers is effected by the frame-positioning projections 72d, formed on the upper frame 10, the frame-positioning openings (not particularly shown, but having the same configuration as that of the frame-positioning openings 72a formed in the lower cover 210), the projections 211b and the recess 202b provided at the lower cover 210.

With this construction in which the assembling can be effected in a stacked manner, it is clear that the optical fiber module of the invention can be easily assembled, and that only the low assembling cost is required. The fact that the assembling can be effected in a stacked manner means that the automatic assembling can be effected, and this makes it easy to achieve the optical fiber module of a lower cost. In this embodiment, although the parts are stacked sequentially on the lower cover 210, it is to be noted that the effects of the invention will not be affected at all even if the lower frame 20 (the upper frame 10 or the upper and lower frame), the LD module 50, the PD module 40, the PCB 30, the electric connector 220 and so on are beforehand combined together to provide a sub-assembly, and this sub-assembly is incorporated into the lower cover 210 or other part.

FIG. 41 is used for explaining the fixed conditions of the upper and lower covers and the upper and lower frames for better understanding. FIG. 41 is a cross-sectional view showing the 13th embodiment of the optical fiber module of the invention. In FIG. 41, the lower frame 20 and the upper frame 10 are positioned by the upper and lower frame-positioning projection 21a and the upper and lower frame-positioning recess 11b, and the upper and lower frames are fixed to the frame-fixing opening 219s by the upper and lower frame-fixing screw 74f. The lower cover 210 and the upper cover 200 are fixed to the hexagon nuts 75b by the cover-fixing screws 74 each having the spring washer 74s. In this embodiment, although a tapping is formed at the frame-fixing opening 219s, the frame-fixing opening 219s may be formed into a hole, and the upper and lower frame fixing-screw 74f may be a self-tapping screw. In this embodiment, the upper and lower covers are fixed to the hexagon nuts 75b by the use of the cover-fixing screws 74 each having the spring washer 74s, but instead of the hexagon nuts 74s, holes are formed in the lower cover 210, and each cover-fixing screw 74 may be a self-tapping screw.

The spring washer 74s not only achieves the loosening prevention effect relative to the hexagon nut 75b or the like, but also achieves the effect of obtaining the positive grounding between the upper and lower covers. If there is a gap or the like between the upper and lower covers particularly when the upper and lower covers are combined together, the fiber module is liable to be affected by harmful external electromagnetic waves. However, with the use of the spring washers 70s, a gap is hardly formed between the upper and lower covers, and also the grounding between the upper and lower covers can be positively obtained through the cover-fixing screws 74.

FIG. 43 is a plan view showing the 13th embodiment of the optical fiber module of the invention. As described above, the process of adjusting the light-emitting power of the LD module 50 is effected in the condition of FIG. 43. An adjustment board (not shown) is connected to the electric connector 220, and a measurement optical fiber (not shown) is connected to the distal end of the LD module 50. The variable resistor 34 on the PCB 30 is adjusted, and the light-emitting power, emitted from the LD module 50, is measured by an optical measurement system (not shown) via the optical fiber, and the light-emitting power, emitted from the LD module 50, is adjusted to a desired value.

Thus, by adjusting the light-emitting power of the LD module 50 (which is the most important to the optical fiber module) in the condition immediately before the finished product in which condition the upper cover 210, the lower frame 20, the upper frame 10, the LD module 50, the PD module 40, the PCB 30, the electric connector 220 and so on are assembled together, the optical fiber module of high reliability can be provided. Namely, the upper and lower frames, the LD module 50 and the PD module 40, which serve as an interface of an optical communication, are perfectly fixed to the lower cover 210, and also the electrical connector 220, serving as an interface of the electrical communication, is perfectly fixed to the lower cover 210, and therefore the basic characteristics of the optical fiber module of the invention are equal to those of the finished product.

Further, the upper cover 200 is finally attached, so that the optical fiber module of the invention is substantially completely shielded by the metal. Namely, the optical fiber module of the invention is substantially completely shielded from external harmful electromagnetic waves or electrostatic noises. Generally, the variable resistors 34 on the PCB 30 are adjusted by a commercially-available screw driver, and in the condition of the finished product, a hole or the like for adjusting purposes needs to be formed in the cover or the like. Harmful electromagnetic waves and the like give adverse effects on the optical fiber module through this hole. However, the optical fiber module of the invention is substantially completely shielded by the metal, and therefore the optical fiber module of high reliability can be easily provided.

Figure 44:
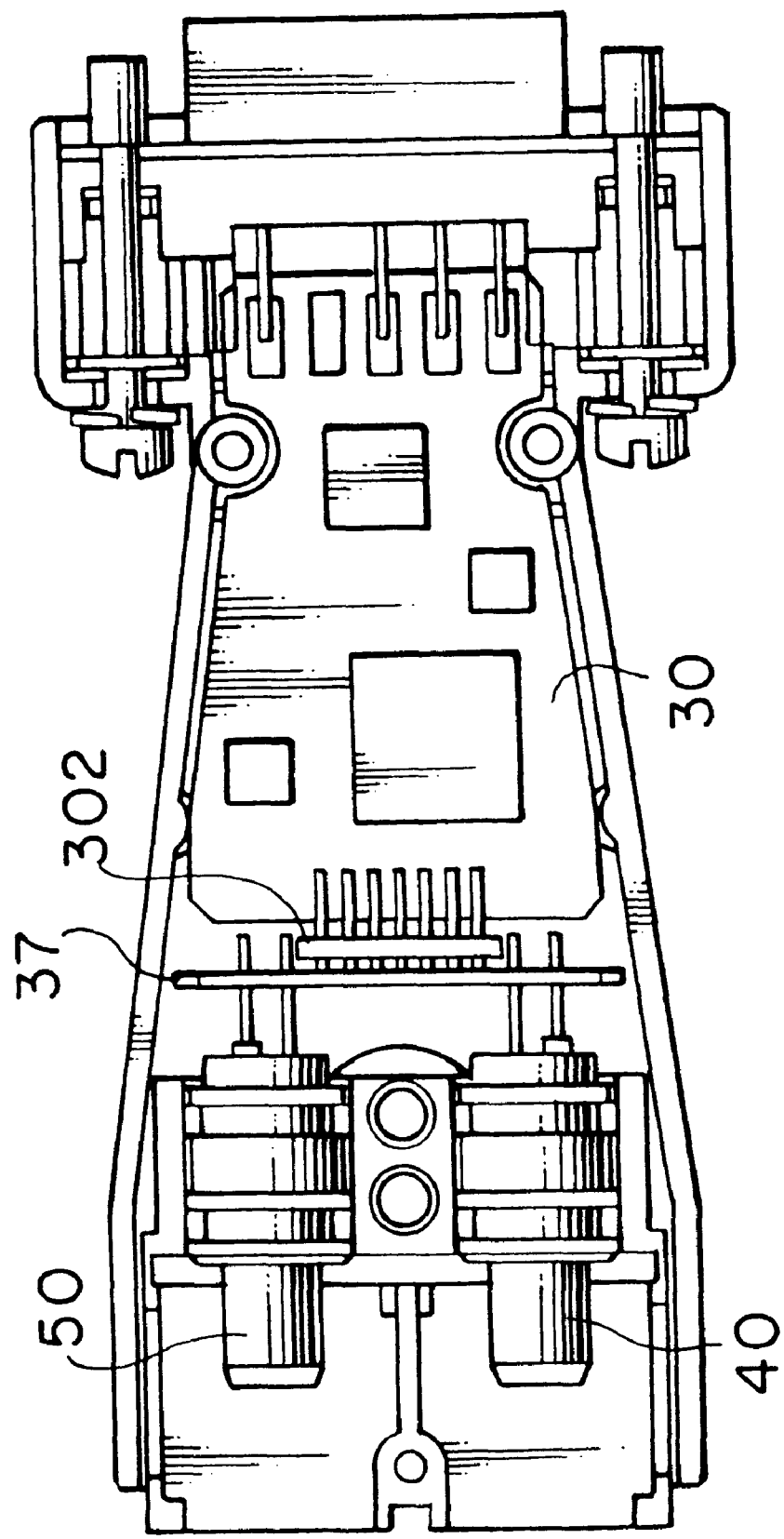
FIG. 44 is a plan view showing a 14th embodiment of an optical fiber module of the invention.

FIG. 44 is a plan view showing a 14th embodiment of an optical fiber module of the invention. This embodiment differs from the 13th embodiment in that the electrical connection of an LD module 50 and a PD module 40 to a PCB 30 is effected by a small printed circuit board 37 and a small connector 302, mounted on the small printed circuit board 37, instead of the FPC 39. With this construction, the effects of the invention will not be lost.

Figure 45:
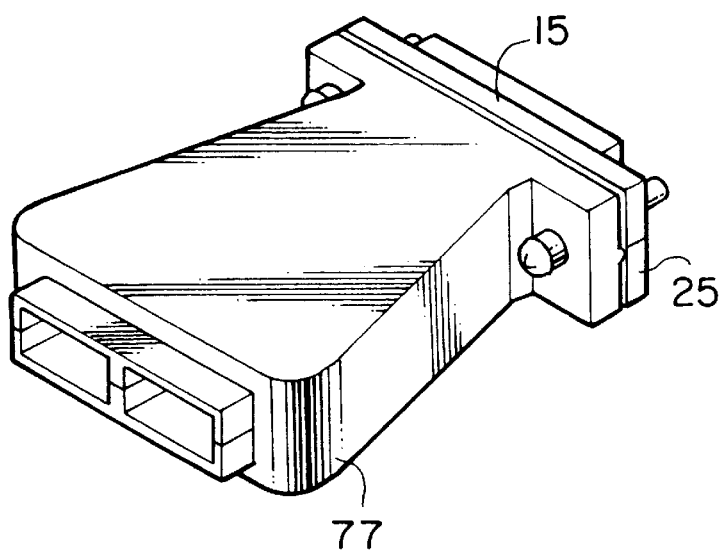
FIG. 45 is a perspective view showing a 15th embodiment of an optical fiber module of the invention.

FIG. 45 is a perspective view showing a 15th embodiment of an optical fiber module of the invention.

In the 12th embodiment of the optical fiber module of the invention shown in FIG. 21, there is shown the metal band 77 for limiting the opening of the upper and lower cover frames 15 and 25 in the vicinity of the optical connector. In this embodiment, there is used a metal band 77 which almost entirely covers the upper and lower cover frames 15 and 25. Namely, by using the metal band 77 which almost entirely covers the upper and lower cover frames 15 and 25, harmful external electromagnetic waves, electrostatic noises, unnecessary radiation, generated from the optical fiber module, and so on can be prevented.

Figure 46:
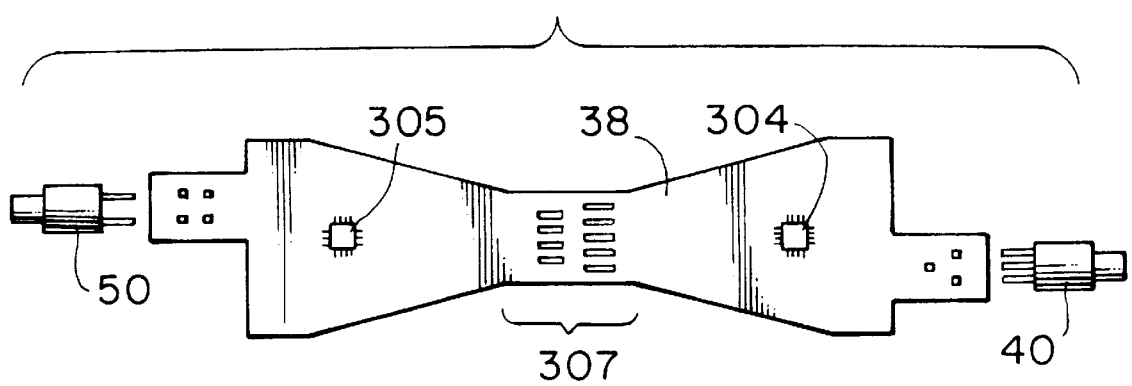
FIG. 46 is a perspective view of a main FPC used in a 16th embodiment of an optical fiber module of the invention.

FIG. 46 is a perspective view showing a main FPC used in a 16th embodiment of an optical fiber module of the invention. In the 8th embodiment shown in FIG. 17, the LD module 50 and the PD module 40 are provided on the distal end of the main FPC 38, and the land 307 for the electric connector is provided at the other end of the main FPC 38. In this embodiment, a land 307 for the electric connector is provided at a central portion of the main FPC 38, and an LD semiconductor IC 305 for the LD module 50 is provided on one end portion of the main FPC 38, and a PD semiconductor IC 304 for the PD module 40 is provided on the other end portion. With this arrangement, an electric circuit of a LD light-emitting system is separated from an electric circuit of a PD light-receiving system, and therefore the electric signal of the transmitting system from the electric connector to the LD module 50 is separated from the electric signal of the receiving system from the PD module to the electric connector, so that the quality of the transmitting and receiving signals can be enhanced.

Further, the packaging area of the main FPC 38 may be increased by folding the main FPC 38 at its central portion.

Therefore, by using this embodiment, there can be provided the optical fiber module of a compact construction in which stresses due to the insertion and withdrawal of the electric connector and the insertion and withdrawal of the optical plug, are avoided, and besides there can be provided the optical fiber module of high reliability in which the quality of the transmitting and receiving signals is high.

The above-mentioned LD modules are not limited to these, and instead of the LD, an LED (light-emitting diode) or the like may be used.

It is to be noted that the above-mentioned 1st to 16th embodiments can be applied not only to the optical fiber module of the invention but also to a conventional optical fiber module of the type incorporated in the system.

Figure 48:
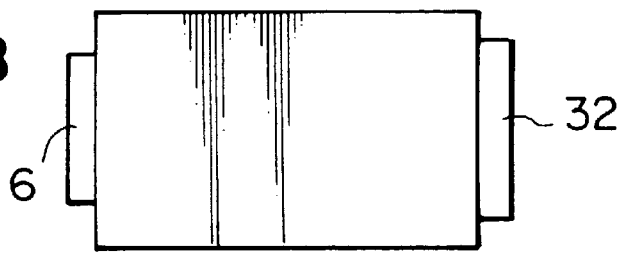
FIG. 48 is a plan view showing a 17th embodiment of an optical fiber module of the invention.
Figure 49:
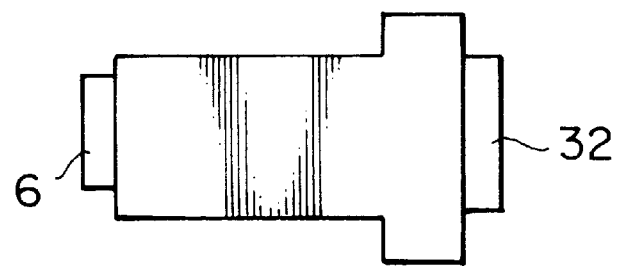
FIG. 49 is a plan view showing an 18th embodiment of an optical fiber module of the invention.
Figure 50:
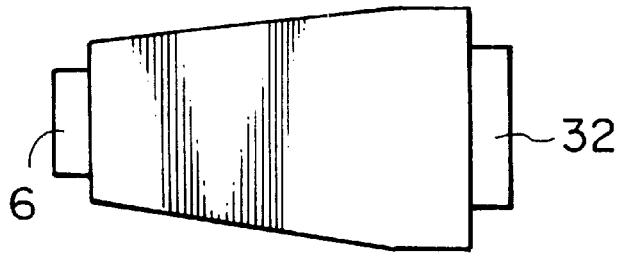
FIG. 50 is a plan view showing a 19th embodiment of an optical fiber module of the invention.

In the above-mentioned 1st to 16th embodiments, mainly, those examples, in which the D-Sub miniature connector is used as the electric connector, have been described, but the present invention is not limited to the D-Sub miniature connector. For example, FIG. 48 is a plan view showing a 17th embodiment of the invention. The 17th embodiment has a connector 6 at that side remote an electric connector 32. This is an optical fiber module of a generally rectangular shape. Similarly, FIG. 49 is a plan view showing an 18th embodiment of the invention. The 18th embodiment is an optical fiber module in which that side, having an electric connector 32, has a T-shape. Further, although not shown, there may be provided an optical fiber module in which that side, having the optical connector 6, has a T-shape. Similarly, FIG. 50 is a plan view showing a 19th embodiment of the invention. The 19th embodiment is an optical module of a trapezoidal shape having a lower side defined by that side having an electric connector 32. Further, although not shown, there may be provided an optical fiber module of a trapezoidal shape having a lower side defined by that side having the optical connector 6.

In the embodiments of the invention, although the transmission signal is serial data, it may be parallel data.

As described above, in the optical fiber modules of the invention,

1) It is not necessary to incorporate a mother board having the optical fiber module mounted thereon, and besides even if modules for electrical signals are mounted on the system, a heretofore-used electric cable can be easily and economically changed to an optical cable capable of achieving the low-noise transmission and the long-distance transmission.

2) The optical connector portion of the optical module is fixed by the upper and lower covers, and therefore the reverse insertion of the optical plug is impossible, and any problem with respect to the function and the safety is eliminated.

3) By the material and configuration of the covers, the structure is so formed as to withstand the inserting and withdrawing forces and external forces, and the use of the optical fiber module alone is achieved.

4) The covers also serve as the shield members, and therefore even if the optical module is operated alone outside an extension slot, the problem with respect to unnecessary radiation and others is eliminated.

5) Radiation of heat from the semiconductor ICs, mounted on the PCB, is transferred to the cover through the thermally-conductive material, thereby achieving the optical module of high reliability.

6) By fixing the electric connector directly to the cover or the frame, the load, produced when inserting and withdrawing the electric connector, and the concentration of stresses on the contact portion of the electric connector and the land portion of the PCB are avoided, thereby achieving the optical module of high reliability.

7) The process of adjusting the light-emitting power of the LD, which is harmful to the human body and particularly to the eyes, is effected immediately before the finished product, and therefore an opening for adjusting purposes does not need to be provided in the cover or other portion of the optical fiber module. Therefore, external electromagnetic waves or the like will not intrude, so that the optical fiber module of high reliability is achieved.

What is claimed is:

1. An optical fiber module comprising:

an electric connector for being connected to an external system;

a laser diode (hereinafter abbreviated as "LD") semiconductor IC for converting LD data, fed from the external system, into an LD electrical signal;

an LD module for converting said LD electrical signal into an LD optical signal;

a photodiode (hereinafter abbreviated as "PD") module for converting a PD optical signal into a PD electrical signal;

a PD semiconductor IC for converting said PD electrical signal into PD data;

a printed circuit board provided with said electric connector, said LD semiconductor IC and said PD semiconductor IC;

shield means for electrically shielding said PD electrical signal;

a cover containing said printed circuit board, said LD module and said PD module; and an optical connector for being insertably and withdrawably fitted relative to an optical plug for transmitting and receiving said LD optical signal and said PD optical signal;

wherein a constricted portion is provided between a first area of said cover containing said electric connector, and a second area of said cover containing said optical connector; and wherein an arrangement direction of said constricted portion, said first area and said second area is about the same as a direction of a connection of said electric connector to the external system.

2. An optical fiber module according to claim 1, in which said constricted portion has a generally rectangular shape.

3. An optical fiber module according to claim 1, in which as a result of providing the constricted portion, at least one of two portions of said cover, corresponding respectively to the first and second areas, has an angle, and said angle is between not less than 10 degrees and not more than 20 degrees.

4. An optical fiber module according to claim 1, in which through holes are formed in the first area, and screws are inserted respectively into said through holes to thereby connect said optical fiber module to the external system.

5. An optical fiber module according to claim 1, in which the center of gravity is located at said second area.

6. An optical fiber module comprising:

an electric connector for being connected to an external system;

an LD semiconductor IC for converting LD data, fed from the external system, into an LD electrical signal;

an LD module for converting said LD electrical signal into an LD optical signal;

a PD module for converting a PD optical signal into a PD electrical signal;

a PD semiconductor IC for converting said PD electrical signal into PD data;

a printed circuit board provided with said electric connector, said LD semiconductor IC and said PD semiconductor IC;

shield means for electrically shielding said PD electrical signal;

a cover containing said printed circuit board, said LD module and said PD module; and an optical connector for being insertably and withdrawably fitted relative to an optical plug for transmitting and receiving said LD optical signal and said PD optical signal;

wherein said printed circuit board is a main flexible printed circuit board which is foldable at a central portion, said central portion comprising a land for said electric connector.

7. An optical fiber module according to claim 6, wherein said LD semiconductor IC is provided on one end portion of said main flexible printed circuit board and said PD semiconductor IC is provided on another end portion of said main flexible circuit board.

8. An optical fiber module comprising:

an electric connector for being connected to an external system;

an LD semiconductor IC for converting LD data, fed from the external system, into an LD electrical signal;

an LD module for converting said LD electrical signal into an LD optical signal;

a PD module for converting a PD optical signal into a PD electrical signal;

a PD semiconductor IC for converting said PD electrical signal into PD data;

a printed circuit board provided with said electric connector, said LD semiconductor IC and said PD semiconductor IC;

shield means for electrically shielding said PD electrical signal;

a cover containing said printed circuit board, said LD module and said PD module; and an optical connector for being insertably and withdrawably fitted relative to an optical plug for transmitting and receiving said LD optical signal and said PD optical signal;

wherein a first area of said cover containing said electric connector and a second area of said cover containing said optical connector are arranged such that their widthwise directions form an angle of about 90 degrees.

9. An optical fiber module according to claim 8, in which said first area and said second area are angularly movable.

10. An optical fiber module according to claim 8, wherein said first area and said second area are angularly movable and a lock screw head is embedded in a side surface of the first area.

* * * * *

UNITED STATES PATENT AND TRADEMARK OFFICE
CERTIFICATE OF CORRECTION

PATENT NO. : 6,164,838
DATED : December 26, 2000
INVENTOR(S) : Kazuyuki MIYA et al.

It is certified that error appears in the above-identified patent and that said Letters Patent are hereby corrected as shown below:

Item [73], Assignee, please change "Matushita" to --Matsushita--

Signed and Sealed this

First Day of May, 2001

Attest:

NICHOLAS P. GODICI

*Attesting Officer*   *Acting Director of the United States Patent and Trademark Office*